United States Patent
Sugiyama et al.

(10) Patent No.: US 7,256,379 B2
(45) Date of Patent: Aug. 14, 2007

(54) OPTICAL SENSING DEVICE

(75) Inventors: Yukinobu Sugiyama, Hamamatsu (JP); Seiichiro Mizuno, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 10/543,016

(22) PCT Filed: Jan. 22, 2004

(86) PCT No.: PCT/JP2004/000537

§ 371 (c)(1),
(2), (4) Date: Feb. 15, 2006

(87) PCT Pub. No.: WO2004/065900

PCT Pub. Date: Aug. 5, 2004

(65) Prior Publication Data

US 2006/0261245 A1    Nov. 23, 2006

(30) Foreign Application Priority Data

Jan. 24, 2003  (JP) .............................. 2003-016693

(51) Int. Cl.
*H01L 27/00* (2006.01)
(52) U.S. Cl. ..................... 250/208.1; 348/302; 257/291
(58) Field of Classification Search ............ 250/208.1, 250/208.2, 214 R; 348/294, 297, 302–303; 257/291–292, 443
See application file for complete search history.

(56) References Cited

U.S. PATENT DOCUMENTS

| 4,490,037 | A | 12/1984 | Anagnostopoulos et al. ... 356/1 |
| 5,703,639 | A | 12/1997 | Farrier et al. ............... 348/241 |
| 5,886,343 | A | 3/1999 | Miyawaki et al. ....... 250/208.1 |
| 6,091,449 | A | 7/2000 | Matsunaga et al. ......... 348/308 |
| 6,757,627 | B2 * | 6/2004 | Mizuno ...................... 702/65 |
| 2002/0029122 | A1 | 3/2002 | Mizuno ..................... 702/107 |

FOREIGN PATENT DOCUMENTS

| JP | 1-167769 | 7/1989 |
| JP | 5-29594 | 2/1993 |
| JP | 6-5832 | 1/1994 |
| WO | 03/055201 | 7/2003 |

* cited by examiner

*Primary Examiner*—Kevin Pyo
(74) *Attorney, Agent, or Firm*—Drinker Biddle & Reath LLP

(57) ABSTRACT

A first integrating circuit 23 converts and outputs electric currents, which are successively input from first groups of photosensitive portions via first switches 21, into and as a voltage. A first CDS circuit 24 outputs a voltage that is in accordance with the variation amount of the voltage from the first integrating circuit 23. A first A/D conversion circuit 25 successively inputs the voltage from the first CDS circuit 24 and converts and outputs the voltage into and as digital values. A first digital memory 26 stores the digital values, which, among the digital values output from the first A/D conversion circuit 25, corresponds to a first period, and the digital values corresponding likewise to a second period and outputs the stored digital values to a first difference operational circuit 27. The first difference operational circuit 27 determines the differences between the digital values corresponding to the first period and the digital values corresponding to the second period that are output from the first digital memory 26 and outputs digital values corresponding to the differences.

7 Claims, 30 Drawing Sheets

Φ$_{Hst1}$

Φ$_{H1}$

Φ$_{H2}$

Φ$_{Hreset}$ shift($H_1$)

shift($H_2$)

shift($H_{M-1}$)

shift($H_M$)

OUTPUT OF THE FIRST INTEGRATING CIRCUIT

Fig.14A  Φ$_{Vst1}$
Fig.14B  Φ$_{V1}$
Fig.14C  Φ$_{V2}$
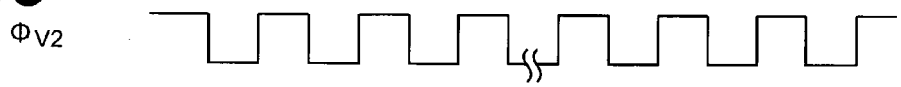
Fig.14D  Φ$_{Vreset}$
Fig.14E  shift(V$_1$)
Fig.14F  shift(V$_2$)
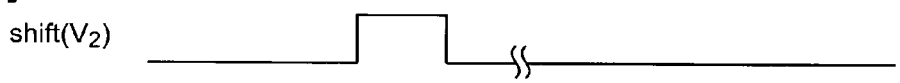
Fig.14G  shift(V$_{N-1}$)
Fig.14H  shift(V$_N$)
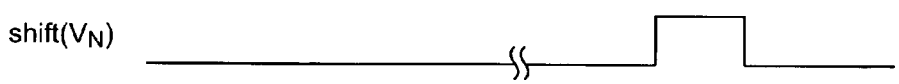
Fig.14I  OUTPUT OF THE SECOND INTEGRATING CIRCUIT

Fig.15A ΦHst1
Fig.15B ΦHst2
Fig.15C LED
Fig.15D OUTPUT O THE FIRST A/D CONVERSION CIRCUIT
Fig.15E OUTPUT OF THE FIRST DIFFERENCE OPERATIONAL CIRCUIT
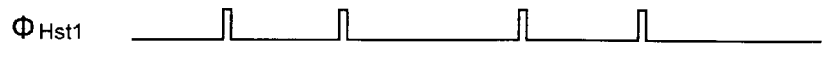
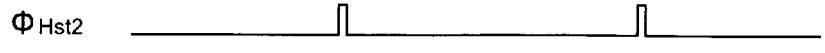
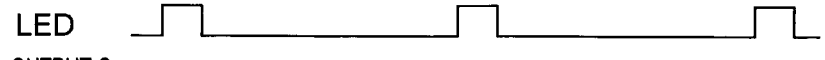
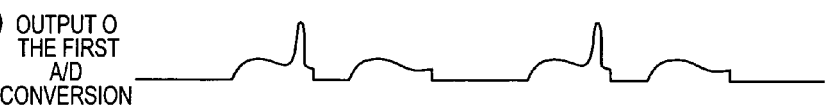
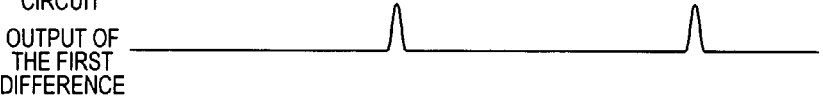
Fig.16A ΦVst1
Fig.16B ΦVst2
Fig.16C LED
Fig.16D OUTPUT OF THE SECOND A/D CONVERSION CIRCUIT
Fig.16E OUTPUT OF THE SECOND DIFFERENCE OPERATIONAL CIRCUIT
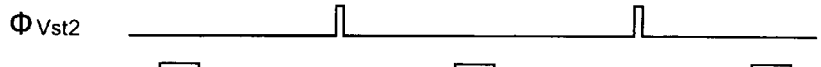
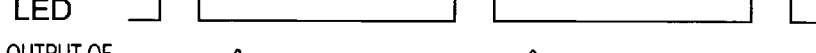

OPTICAL SENSING DEVICE

This application claims the benefit of a national stage PCT/JP04/00537 filed on Jan. 22, 2004.

TECHNICAL FIELD

The present invention relates to a photodetector for detecting a two-dimensional position where light is incident.

BACKGROUND ART

Generally, in a known photodetector, image data obtained by imaging is taken into an image memory and then two-dimensional positions are detected after image processing, by the use of a solid-state image sensing device such as a MOS image sensor (see for example, Patent Document 1).

[Patent Document 1] Japanese Published Unexamined Patent Application No. H01-167769

DISCLOSURE OF THE INVENTION

In the above-described known art, however, an image memory is required for storing the obtained image data, which causes a complicated structure of the device. Besides, since two-dimensional positions are detected by an operation process after storing the image data into the image memory, a detecting process of the two-dimensional positions takes time.

The present invention has been made in view of the above points, and an object thereof is to provide a photodetector that enables high speed and simplification of composition to be realized in regard to a two-dimensional position detection process.

In order to achieve the above object, the present invention provides in a photodetector, having a photosensitive region, in which pixels are arrayed two-dimensionally, and being used with a light source that illuminates light onto an object, wherein a single pixel is arranged by adjacently positioning on the same plane a plurality of photosensitive portions, each outputting a current that is in accordance with an intensity of light incident thereon and, in each plurality of pixels that are aligned in a first direction of the two-dimensional array, one photosensitive portion among the plurality of photosensitive portions making up each corresponding pixel is electrically connected to the same photosensitive portion of each of the other corresponding pixels and, in each plurality of pixels that are aligned in a second direction of the two-dimensional array, another photosensitive portion among the plurality of photosensitive portions making up each corresponding pixel is electrically connected to the same photosensitive portion of each of the other corresponding pixels, the photodetector comprising: a first signal processing circuit, detecting a luminance profile in the second direction based on differences between outputs, corresponding to charges accumulated in first groups of the photosensitive portions that are electrically connected across the pluralities of pixels aligned in the first direction over a first period wherein the light is illuminated onto the object by the light source, and outputs, corresponding to charges accumulated in the first groups of the photosensitive portions over a second period wherein the light is not illuminated onto the object by the light source; and a second signal processing circuit, detecting a luminance profile in the first direction based on differences between outputs, corresponding to charges accumulated in second groups of the photosensitive portions that are electrically connected across the pluralities of pixels aligned in the second direction over the first period, and outputs, corresponding to charges accumulated in the second groups of the photosensitive portions over the second period.

With the present invention's photodetector, light which is incident to a single pixel is detected by each of the plurality of photosensitive portions that configure the pixel, and electric current corresponding to the light intensity sensed by each photosensitive portion is outputted. Since the first groups of the photosensitive portions are electrically connected across each plurality of pixels aligned in the first direction of the two-dimensional array, the electric currents from the first groups of the photosensitive portions are sent in the first direction. Also, since the second groups of the photosensitive portions are electrically connected across each plurality of pixels aligned in the second direction of the two-dimensional array, the electric currents from the second groups of the photosensitive portions are sent in the second direction. Since the electric currents from the second groups of the photosensitive portions, which are electrically connected across each plurality of pixels aligned in the first direction of the two-dimensional array, are sent in the first direction and the electric currents from the second groups of the photosensitive portions, which are electrically connected across each plurality of pixels aligned in the second direction of the two-dimensional array, are sent in the second direction, a luminance profile in the first direction and a luminance profile in the second direction can be obtained independently of each other. As a result, the two-dimensional position of the incident light can be detected at high speed by an extremely simple composition wherein a plurality of photosensitive portions are disposed in a single pixel.

Also with the present invention, by means of the first signal processing circuit, the luminance profile in the second direction is detected based on differences between the outputs, corresponding to the charges accumulated in the first groups of the photosensitive portions over the first period, and the outputs, corresponding to the charges accumulated in the first groups of the photosensitive portions over the second period. Thus even if background light which is incident to the photosensitive region, the luminance profile in the second direction can be detected in a state in which the background light components are eliminated. Also, by means of the second signal processing circuit, the luminance profile in the first direction is detected based on differences between the outputs, corresponding to the charges accumulated in the second groups of the photosensitive portions over the first period, and the outputs, corresponding to the charges accumulated in the second groups of the photosensitive portions over the second period. Thus even if background light which is incident to the photosensitive region, the luminance profile in the first direction can be detected in a state in which the background light components are eliminated. The two-dimensional position of the incident light can thus be detected with extremely high precision.

Preferably, the first signal processing circuit comprises: a first shift register for successively reading, in the second direction, the electric currents from the first groups of the photosensitive portions; a first integrating circuit, successively inputting the electric currents from the respective first groups of the photosensitive portions that are read successively by the first shift register and converting and outputting the electric currents into and as a voltage; a first CDS (Correlated Double Sampling) circuit, outputting a voltage corresponding to the variation amount of the voltage from the first integrating circuit; a first A/D conversion circuit, converting the voltage from the first CDS circuit into digital values and outputting the digital values; and a first difference operational circuit, determining, based on the digital values output from the first A/D conversion circuit, differences between digital values corresponding to the first period and digital values corresponding to the second period; and the second signal processing circuit comprises: a second shift register for successively reading, in the first direction, the electric currents from the second groups of the photosensitive portions; a second integrating circuit, successively inputting the electric currents from the respective second groups of the photosensitive portions that are read successively by the second shift register and converting and outputting the electric currents into and as a voltage; a second CDS circuit, outputting a voltage corresponding to the variation amount of the voltage from the second integrating circuit; a second A/D conversion circuit, converting the voltage from the second CDS circuit into digital values and outputting the digital values; and a second difference operational circuit, determining, based on the digital values output from the second A/D conversion circuit, differences between digital values corresponding to the first period and digital values corresponding to the second period. With such a composition, even if the first integrating circuit and the second integrating circuit respectively have noise fluctuations that differ according to the integrating operation, the noise errors are eliminated by the first CDS circuit and the second CDS circuit. As a result, the luminance profile in the first direction and the luminance profile in the second direction can be obtained at high precision. Also, since electric currents are read out successively from the first and second groups of the photosensitive portions respectively by means of the first and second shift registers and are then subject to A/D conversion and difference determination, the first and second signal processing circuits can be made simple in composition and low in cost.

Also preferably, the first signal processing circuit further comprises: a first digital memory, disposed between the first A/D conversion circuit and the first difference operational circuit and storing the digital values corresponding to the first period and the digital values corresponding to the second period and outputting the stored digital values to the first difference operational circuit; and the second signal processing circuit further comprises: a second digital memory, disposed between the second A/D conversion circuit and the second difference operational circuit and storing the digital values corresponding to the first period and the digital values corresponding to the second period and outputting the stored digital values to the second difference operational circuit. With this composition, computation of the differences in the digital values corresponding to the first period and the digital values corresponding to the second period can be performed appropriately and definitely in the first and second difference operational circuits.

Also preferably, the first signal processing circuit comprises: first integrating circuits, provided in correspondence to the first groups of the photosensitive portions and each converting and outputting the electric currents from the corresponding first groups of the photosensitive portions into and as a voltage; first CDS circuits, disposed in correspondence to the first integrating circuits and each in turn comprising a first coupling capacitance element and a first amplifier, disposed in that order between an output terminal and an input terminal that inputs the voltage from the corresponding first integrating circuit, a first integrating capacitance element, disposed in parallel between the input and the output of the first amplifier, and a first switching element, making charges of an amount corresponding to the variation amount of the voltage be accumulated in the first integrating capacitance element; second CDS circuits, disposed in correspondence to the first integrating circuits and each in turn comprising a second coupling capacitance element and a second amplifier, disposed in that order between an output terminal and an input terminal that inputs the voltage from the corresponding first integrating circuit, a second integrating capacitance element, having a capacitance value equal to the capacitance value of the first integrating capacitance element and disposed in parallel between the input and the output of the second amplifier, and a second switching element, making charges of an amount corresponding to the variation amount of the voltage be accumulated in the second integrating capacitance element; and first difference operational circuits, disposed in correspondence to the first CDS circuits and the second CDS circuits and each determining a difference in the amounts of charges respectively accumulated in the first integrating capacitance element of the corresponding first CDS circuit and the second integrating capacitance element of the corresponding second CDS circuit and outputting a voltage that is in accordance with the difference; and the second signal processing circuit comprises: second integrating circuits, provided in correspondence to the second groups of the photosensitive portions and each converting and outputting the electric currents from the second corresponding group of the photosensitive portions as a voltage; third CDS circuits, disposed in correspondence to the second integrating circuits and each in turn comprising a third coupling capacitance element and a third amplifier, disposed in that order between an output terminal and an input terminal that inputs the voltage from the corresponding second integrating circuit, a third integrating capacitance element, disposed in parallel between the input and the output of the third amplifier, and a third switching element, making charges of an amount corresponding to the variation amount of the voltage be accumulated in the third integrating capacitance element; fourth CDS circuits, disposed in correspondence to the second integrating circuit and each in turn comprising a fourth coupling capacitance element and a fourth amplifier, disposed in that order between an output terminal and an input terminal that inputs the voltage from the corresponding second integrating circuit, a fourth integrating capacitance element, having a capacitance value equal to the capacitance value of the third integrating capacitance element and disposed in parallel between the input and the output of the fourth amplifier, and a fourth switching element, making charges of an amount corresponding to the variation amount of the voltage be accumulated in the fourth integrating capacitance element; and second difference operational circuits, disposed in correspondence to the third CDS circuits and the fourth CDS circuits and each determining a difference in the amounts of charges respectively accumulated in the third integrating capacitance element of the corresponding third CDS circuit and the fourth integrating capacitance element of the corresponding fourth CDS circuit and outputting a voltage that is in accordance with the difference. With such a composition, since a first difference operational circuit is provided in accordance with each first group of the photosensitive portions and a second difference operational circuit is disposed in accordance with each second group of the photosensitive portions, the luminance profiles in the first and second directions can be obtained at high speed. Also, even if the first integrating circuits and the second integrating circuits respectively have noise fluctuations that differ according to integrating operation, the noise errors are eliminated by the first to fourth CDS circuits. Also, since charges that are in accordance with the signal light components from the light source and the background light components are accumulated in the first and third integrating capacitance elements of the first and third CDS circuits during the first period, charges that are in accordance with the background light components are accumulated in the second and fourth integrating capacitance elements of the second and fourth CDS circuits during the second period, and differences between the two are determined by the first and second difference operational circuits, the voltages from the first and second difference operational circuits will correspond to just the signal light components from the light source. The S/N ratio of luminance profile detection will thus be excellent even if the intensities of the light made incident on the photosensitive region, in other words, the above-mentioned voltages are low in value.

Also preferably, the first signal processing circuit further comprises: first sample-and-hold circuits, provided in correspondence to the first difference operational circuits and each holding and then outputting the voltage from the corresponding first difference operational circuit; and a first A/D conversion circuit, successively inputting the voltages from the respective first sample-and-hold circuits, converting the voltages into digital values, and outputting the digital values; and the second signal processing circuit further comprises: second sample-and-hold circuits, provided in correspondence to the second difference operational circuits and each holding and then outputting the voltage from the corresponding second difference operational circuit; and a second A/D conversion circuit, successively inputting the voltage from the respective second sample-and-hold circuits, converting the voltage into digital values, and outputting the digital values. With this composition, the luminance profiles in the first and second directions can be output as digital values.

Also preferably, the first signal processing circuit comprises: first charge accumulation circuits, provided in correspondence to the respective first groups of the photosensitive portions and each comprising a first capacitance element and a second capacitance element, disposed in parallel between an output terminal and an input terminal that inputs the electric currents from the corresponding first group of the photosensitive portions, and accumulating charges in the first capacitance element in accordance with the electric currents corresponding to the charges accumulated during the first period in the corresponding first group of the photosensitive portions and accumulating charges in the second capacitance element in accordance with the electric currents corresponding to the charges accumulated during the second period in the corresponding first group of the photosensitive portions; and a first difference operational circuit, determining the differences between the charge amounts accumulated respectively in the first capacitance elements and the second capacitance elements of the first charge accumulation circuits and outputting a voltage that is in accordance with the differences; and the second signal processing circuit comprises: second charge accumulation circuits, provided in correspondence to the respective second groups of the photosensitive portions and each comprising a third capacitance element and a fourth capacitance element, disposed in parallel between an output terminal and an input terminal that inputs the electric currents from the corresponding second group of the photosensitive portions, and accumulating charges in the third capacitance element in accordance with the electric currents corresponding to the charges accumulated during the first period in the corresponding second group of the photosensitive portions and accumulating charges in the fourth capacitance element in accordance with the electric currents corresponding to the charges accumulated during the second period in the corresponding second group of the photosensitive portions; and a second difference operational circuit, determining the differences between the charge amounts accumulated respectively in the third capacitance elements and the fourth capacitance elements of the second charge accumulation circuits and outputting a voltage that is in accordance with the differences. With this composition, by each first charge accumulating circuit, charges are accumulated in the first capacitance element in accordance with the electric currents corresponding to the charges accumulated in the first period in the corresponding first group of the photosensitive portions, charges are accumulated in the second capacitance element in accordance with the electric currents corresponding to the charges accumulated in the second period in the corresponding first group of the photosensitive portions, and, by the first difference operational circuit, the differences, between the amounts of charges accumulated respectively in the first capacitance elements and second capacitance elements, are determined and a voltage corresponding to the differences is output. Also, by each second charge accumulating circuit, charges are accumulated in the third capacitance element in accordance with the electric currents corresponding to the charges accumulated in the first period in the corresponding second group of the photosensitive portions, charges are accumulated in the fourth capacitance element in accordance with the electric currents corresponding to the charges accumulated in the second period in the corresponding second group of the photosensitive portions, and, by the second difference operational circuit, the differences, between the amounts of charges accumulated respectively in the third capacitance elements and the fourth capacitance elements, are determined and a voltage corresponding to the differences is output. The first and second signal processing circuits can thus be made simple in composition and low in cost.

Also, preferably the first signal processing circuit furthermore comprises: a first integrating circuit, successively inputting, from the first capacitance elements and the second capacitance elements, electric currents corresponding to the charges accumulated in the corresponding first capacitance elements and second capacitance elements and converting the electric currents into a voltage and outputting the voltage to the first difference operational circuit; and a first A/D conversion circuit, successively inputting the voltage from the first difference operational circuit, converting the voltage into digital values, and outputting the digital values; and the second signal processing circuit furthermore comprises: a second integrating circuit, successively inputting, from the third capacitance elements and the fourth capacitance elements, electric currents corresponding to the charges accumulated in the corresponding third capacitance elements and fourth capacitance elements and converting the electric currents into a voltage and outputting the voltage to the second difference operational circuit; and a second A/D conversion circuit, successively inputting the voltage from the second difference operational circuit, converting the voltage into digital values, and outputting the digital values. With this composition, the luminance profiles in the first and second directions can be output as digital values.

The present invention provides in a photodetector, having a photosensitive region, in which pixels are arrayed two-dimensionally, and being used with a light source that illuminates light onto an object, wherein a single pixel is arranged by adjacently positioning on the same plane a plurality of photosensitive portions, each outputting a current that is in accordance with an intensity of light incident thereon and, in each plurality of pixels that are aligned in a first direction of the two-dimensional array, one photosensitive portion among the plurality of photosensitive portions making up each corresponding pixel is electrically connected to the same photosensitive portion of each of the other corresponding pixels and, in each plurality of pixels that are aligned in a second direction of the two-dimensional array, another photosensitive portion among the plurality of photosensitive portions making up each corresponding pixel is electrically connected to the same photosensitive portion of each of the other corresponding pixels, the photodetector comprising: first eliminating circuits, being provided in correspondence to the respective first groups of the photosensitive portions, which are electrically connected across each the plurality of pixels aligned in the first direction, and each eliminating a electric current, which is output from the corresponding first group of the photosensitive portions in a second period wherein the light is not illuminated onto the object by the light source, from a electric current, which is output from the corresponding first group of the photosensitive portions in a first period wherein the light is illuminated onto the object by the light source, and outputting the electric current resulting from the elimination; first integrating circuits, being provided in correspondence to the first eliminating circuits and each accumulating charges in accordance with the electric current from the corresponding first eliminating circuit and outputting a voltage that is in accordance with the amount of the accumulated charges; second eliminating circuits, being provided in correspondence to the respective second groups of the photosensitive portions, which are electrically connected across each the plurality of pixels aligned in the second direction, and each eliminating an electric current, which is output from the corresponding second group of the photosensitive portions in the second period, from an electric current, which is output from the corresponding second group of the photosensitive portions in the first period, and outputting the electric current resulting from the elimination; and second integrating circuits, being provided in correspondence to the second eliminating circuits and each accumulating charges in accordance with the electric current from the corresponding second eliminating circuit and outputting a voltage that is in accordance with the amount of the accumulated charges.

With the present invention's photodetector, light which is incident to a single pixel is detected by each of the plurality of photosensitive portions making up that pixel, and a current that is in accordance with the light intensity is output by each photosensitive portion. Since the first groups of the photosensitive portions are electrically connected across each plurality of pixels aligned in the first direction of the two-dimensional array, the electric currents from the first groups of the photosensitive portions are sent in the first direction. Also, since the second groups of the photosensitive portions are electrically connected across each plurality of pixels aligned in the second direction of the two-dimensional array, the electric currents from the second groups of the photosensitive portions are sent in the second direction. Since the electric currents from the first groups of the photosensitive portions, which are electrically connected across each plurality of pixels aligned in the first direction of the two-dimensional array, are sent in the first direction and the electric currents from the second groups of the photosensitive portions, which are electrically connected across each plurality of pixels aligned in the second direction of the two-dimensional array, are sent in the second direction, a luminance profile in the first direction and a luminance profile in the second direction can be obtained independently of each other. As a result, the two-dimensional position of the incident light can be detected at high speed by an extremely simple composition wherein a plurality of photosensitive portions are disposed in a single pixel.

Also with the present invention, by means of the first eliminating circuits, the electric currents from the first groups of the photosensitive portions in the second period are eliminated from the electric currents from the first groups of the photosensitive portions in the first period. Thus even if background light which is incident to the photosensitive region, the luminance profile in the second direction can be detected in a state in which the background light components are eliminated. Also, by means of the second eliminating circuits, the electric currents from the second groups of the photosensitive portions in the above-mentioned second period are eliminated from the electric currents from the second groups of the photosensitive portions in the first period. Thus even if background light which is incident to the photosensitive region, the luminance profile in the first direction can be detected in a state in which the background light components are eliminated. The two-dimensional position of the incident light can thus be detected with extremely high precision.

Also preferably, each of the first eliminating circuit comprises: a first MOS transistor, having a source terminal connected to the corresponding first group of the photosensitive portions and a drain terminal that is grounded; a first capacitance element, having one terminal connected to a gate terminal of the first MOS transistor and another terminal that is grounded; and a first switching element, having one terminal connected to the gate terminal of the first MOS transistor and another terminal connected to the output of the corresponding first integrating circuit; and each second eliminating circuit comprises: a second MOS transistor, having a source terminal connected to the corresponding second group of the photosensitive portions and a drain terminal that is grounded; a second capacitance element, having one terminal connected to a gate terminal of the second MOS transistor and another terminal that is grounded; and a second switching element, having one terminal connected to the gate terminal of the second MOS transistor and another terminal connected to the output of the corresponding second integrating circuit. By this composition, the above-described first and second eliminating circuits can be arranged simply and at low cost.

Preferably, first difference operational circuits, provided in correspondence to the first integrating circuits and each holding, from among the voltages from the corresponding first integrating circuit, the voltage corresponding to the second period and outputting a voltage that is in accordance with the difference with respect to the voltage, which, among the voltages from the corresponding first integrating circuit, corresponds to the first period; first sample-and-hold circuits, provided in correspondence to the first difference operational circuits and each holding and outputting the voltage from the corresponding first difference operational circuit; a first A/D conversion circuit, successively inputting the voltages from the respective first sample-and-hold circuits, converting the voltages into digital values, and outputting the digital values; second difference operational circuits, provided in correspondence to the second integrating circuits and each holding, from among the voltages from the corresponding second integrating circuit, the voltage corresponding to the second period and outputting a voltage that is in accordance with the difference with respect to the voltage, which, among the voltages from the corresponding second integrating circuit, corresponds to the first period; second sample-and-hold circuits, provided in correspondence to the second difference operational circuits and each holding and then outputting the voltage from the corresponding second difference operational circuit; and a second A/D conversion circuit, successively inputting the voltages from the respective second sample-and-hold circuits, converting the voltages into digital values, and outputting the digital values. With this composition, the luminance profile in the first direction and the luminance profile in the second direction can be obtained at even higher precision. Also, the luminance profiles in the first and second directions can be output as digital values.

BRIEF DESCRIPTION OF THE DRAWINGS

FIG. 14A is a graph showing the variation with time of a start signal that is input into a second shift register.

FIG. 14B is a graph showing the variation with time of a signal that is input into the second shift register.

FIG. 14C is a graph showing the variation with time of a signal that is input into the second shift register.

FIG. 14D is a graph showing the variation with time of a reset signal that is input into a second integrating circuit.

FIG. 14E is a graph showing the variation with time of a signal that is output from the second shift register.

FIG. 14F is a graph showing the variation with time of a signal that is output from the second shift register.

FIG. 14G is a graph showing the variation with time of a signal that is output from the second shift register.

FIG. 14H is a graph showing the variation with time of a signal that is output from the second shift register.

FIG. 14I is a graph showing the variation with time of a voltage that is output from the second integrating circuit.

FIG. 15A is a graph showing the variation with time of a start signal that is input into the first shift register and a first A/D conversion circuit.

FIG. 15B is a graph showing the variation with time of a start signal that is input into a first difference operational circuit.

FIG. 15C is a graph showing the variation with time of a control signal LED that is output from a timing control circuit.

FIG. 15D is a graph showing the variation with time of an output of the first A/D conversion circuit.

FIG. 15E is a graph showing the variation with time of an output of the first difference operational circuit.

FIG. 16A is a graph showing the variation with time of a start signal that is input into the second shift register and a second A/D conversion circuit.

FIG. 16B is a graph showing the variation with time of a start signal that is input into a second difference operational circuit.

FIG. 16C is a graph showing the variation with time of a control signal LED that is output from a timing control circuit.

FIG. 16D is a graph showing the variation with time of an output of the second A/D conversion circuit.

FIG. 16E is a graph showing the variation with time of an output of the second difference operational circuit.

BEST MODES FOR CARRYING OUT THE INVENTION

Photodetectors of embodiments of the present invention shall now be described with reference to the drawings. In the description, the same symbol shall be used for the same elements or elements having the same function and redundant description shall be omitted. In the following, each of parameters M and N shall be an integer no less than 2. Also, unless stated otherwise, parameter m shall be an arbitrary integer no less than 1 and no more than M, and parameter n shall be an arbitrary integer no less than 1 and no more than N.

FIRST EMBODIMENT

Figure 1:
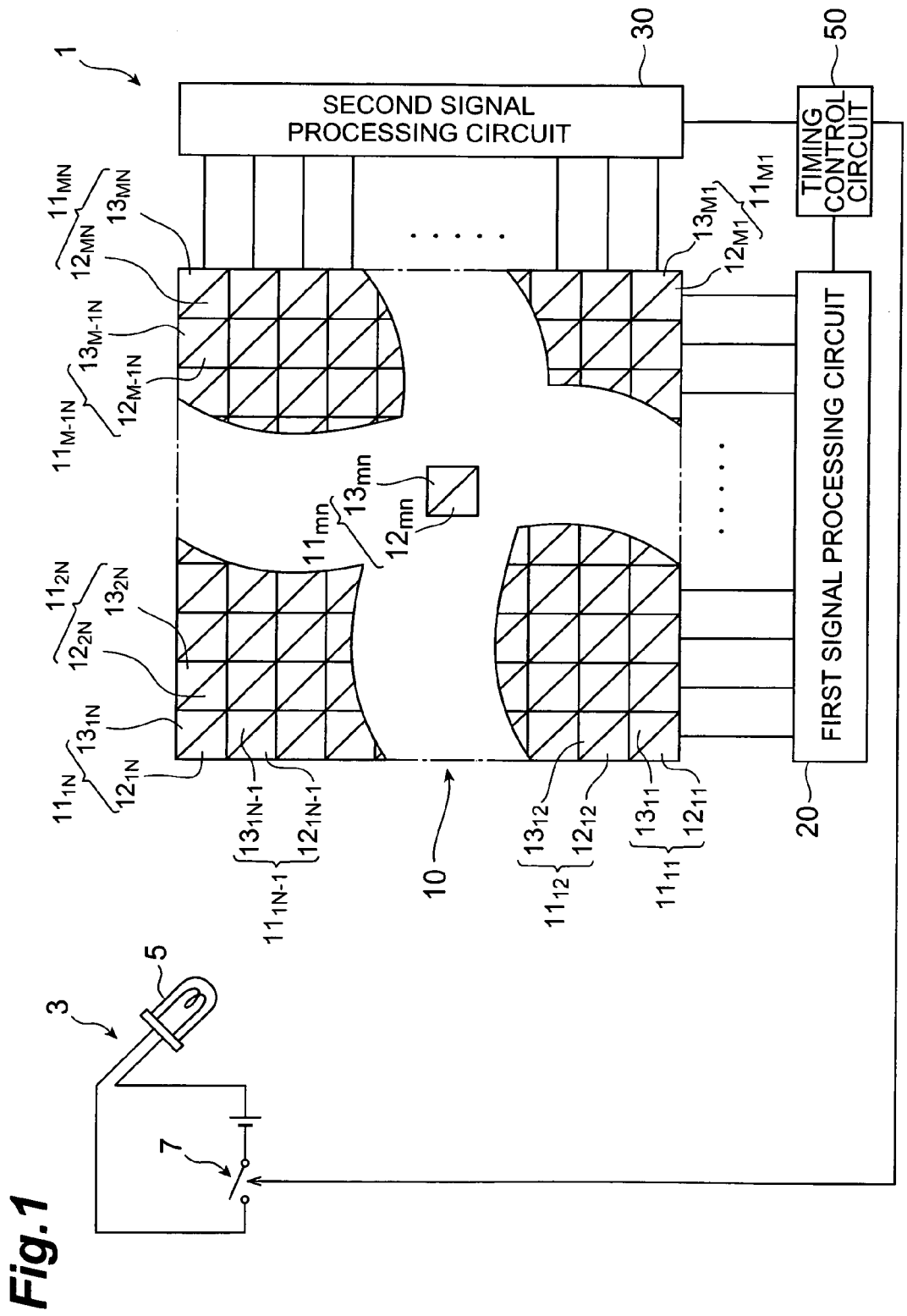
FIG. 1 is a conceptual composition diagram of a photodetector of a first embodiment.

FIG. 1 is a conceptual composition diagram of a photodetector of a first embodiment. As shown in FIG. 1, photodetector 1 of the present embodiment has a photosensitive region 10, a first signal processing circuit 20, a second signal processing circuit 30, and a timing control circuit 50 and is used with a light source 3 that illuminates light onto an object. Photodetector 1 detects incidence positions, for example, of direct light or reflected light of spot light that is illuminated onto the object from a light emitting element (LED, semiconductor laser, etc.) 5 of light source 3. Light source 3 has a switch 7, which is opened and closed by a control signal from timing control circuit 50, and light emitting element 5 is lit by the closing of switch 7.

In photosensitive region 10, pixels $11_{mn}$ are arrayed two-dimensionally in M columns and N rows. One pixel is arranged by adjacently positioning, on the same plane, a photosensitive portion $12_{mn}$ (first photosensitive portion) and a photosensitive portion $13_{mn}$ (second photosensitive portion), each outputting a current that is in accordance with the intensity of light incident thereon. Thus in photosensitive region 10, photosensitive portions $12_{mn}$ and photosensitive portions $13_{mn}$ are arrayed in a two-dimensionally mixed manner on the same plane.

Across each of the pluralities of pixels $11_{11}$ to $11_{1N}$, $11_{21}$ to $11_{2N}$, ..., $11_{M1}$ to $11_{MN}$, aligned in a first direction in the two-dimensional array, one photosensitive portion $12_{mn}$ among the plurality of photosensitive portions $12_{mn}$ and $13_{mn}$ making up each corresponding pixel $11_{mn}$ is electrically connected to the same photosensitive portion $12_{mn}$ of each of the other corresponding pixels (that is, for example, the photosensitive portions $12_{11}$ to $12_{1N}$ are electrically connected to each other). Also across each of the pluralities of pixels $11_{11}$ to $11_{M1}$, $11_{12}$ to $11_{M2}$, ..., $11_{1N}$ to $11_{MN}$, aligned in a second direction in the two-dimensional array, the other photosensitive portion $13_{mn}$ among the plurality of photosensitive portions $12_{mn}$ and $13_{mn}$ making up each corresponding pixel $11_{mn}$ is electrically connected to the same photosensitive portion $13_{mn}$ of each of the other corresponding pixels (that is, for example, the photosensitive portions $13_{11}$ to $13_{M1}$ are electrically connected to each other).

Figure 2:
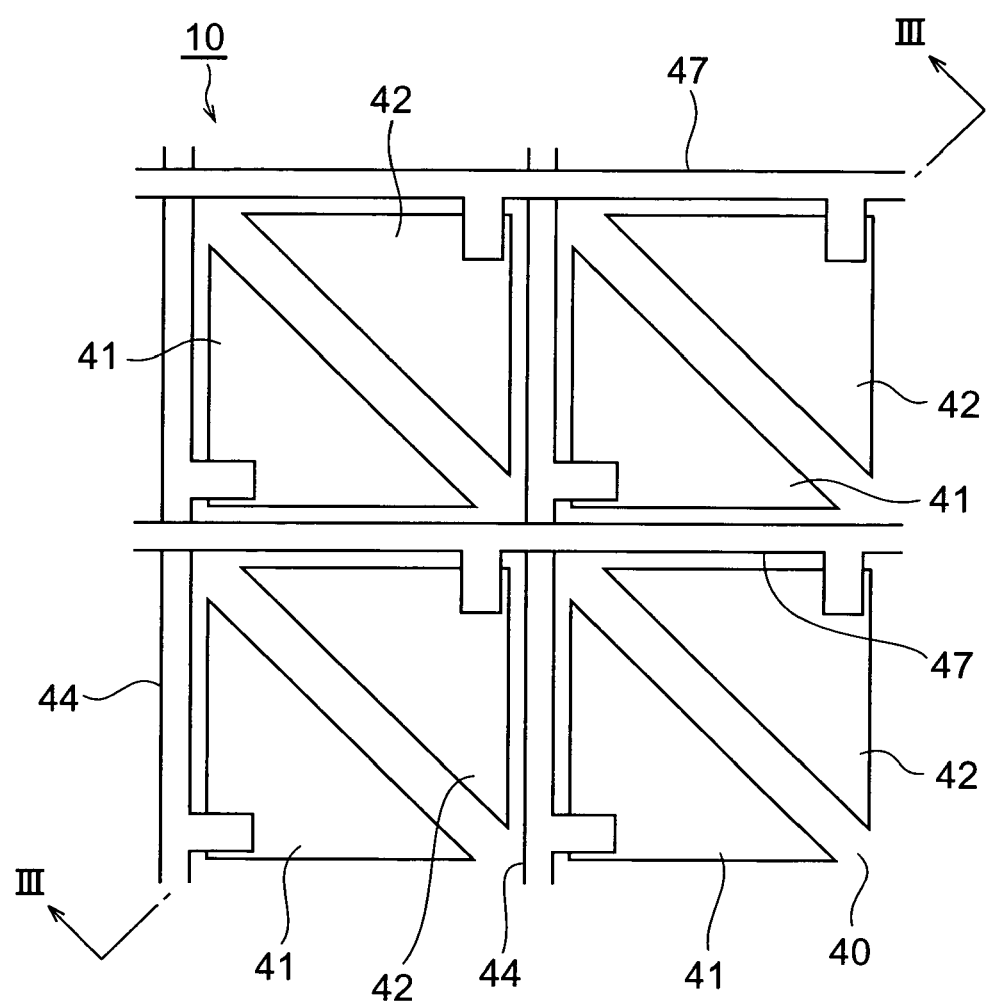
FIG. 2 is an enlarged plan view of the principal parts of an example of a photosensitive region included in the photodetector of the first embodiment.
Figure 3:
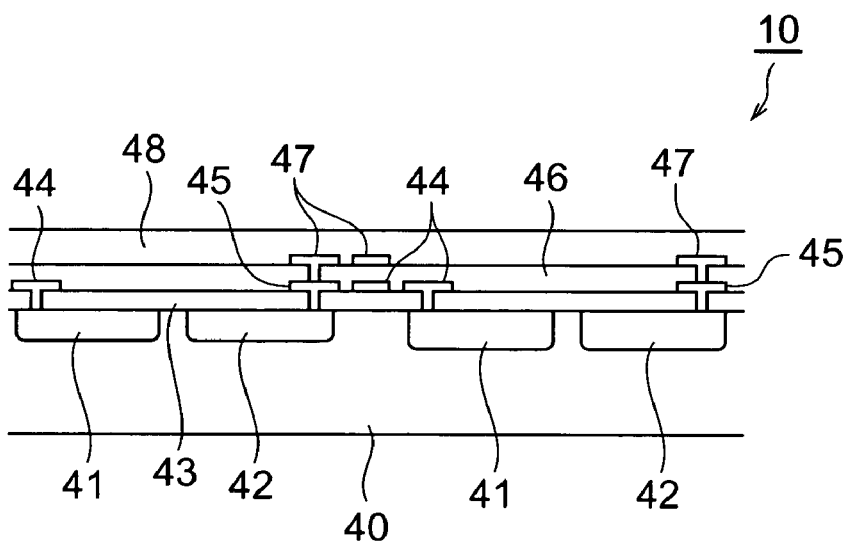
FIG. 3 is a sectional view taken along line III-III of FIG. 2.

The composition of photosensitive region 10 shall now be described based on FIG. 2 and FIG. 3. FIG. 2 is an enlarged plan view of the principal parts of an example of the photosensitive region included in the photodetector, and FIG. 3 is a sectional view taken along line III-III of FIG. 2. In FIG. 2, the illustration of a protective layer 48 is omitted.

Photosensitive region 10 comprises a semiconductor substrate 40, formed of a P-type (first conductive type) semiconductor, and N-type (second conductive type) semiconductor regions 41 and 42, formed on the top surface of semiconductor substrate 40. Photosensitive portions $12_{mn}$ and $13_{mn}$ are thus arranged as photodiodes comprising semiconductor substrate 40 and sets of second conductive type semiconductor regions 41 and 42. As shown in FIG. 2, each of second conductive type semiconductor regions 41 and 42 has a substantially triangular shape as viewed from the light-incident direction, and in a single pixel, the two regions 41 and 42 are formed with one side of each being mutually adjacent. Semiconductor substrate 40 is set to the ground potential. Photosensitive region 10 may instead comprise a semiconductor substrate, formed of an N-type semiconductor, and P-type semiconductor regions, formed on the top surface of the semiconductor substrate. As can be understood from FIG. 2, regions 41 (photosensitive portions $12_{mn}$) and regions 42 (photosensitive portions $13_{mn}$) are aligned alternately in the first direction and the second direction. Regions 41 (photosensitive portions $12_{mn}$) and regions 42 (photosensitive portions $13_{mn}$) are also aligned alternately in a third direction and a fourth direction that intersect the first direction and the second direction (for example, at an angle of 45°).

A first insulating layer 43 is formed on semiconductor substrate 40 and regions 41 and 42, and via contact holes formed in this first insulating layer 43, first wirings 44 are electrically connected to the one regions 41. Also via contact holes formed in first insulating layer 43, electrodes 45 are electrically connected to the other regions 42.

A second insulating layer 46 is formed on first insulating layer 43, and via contact holes formed in this second insulating layer 46, second wirings 47 are electrically connected to electrodes 45. The other regions 42 are thus electrically connected to second wirings 47 via electrodes 45.

A protective layer 48 is formed on second insulating layer 46. First insulating layer 43, second insulating layer 46, and protective layer 48 are formed of $SiO_2$ or SiN, etc. First wirings 44, electrodes 45, and second wirings 47 are formed of Al or other metal.

Each of first wirings 44 electrically connects the regions 41 in the respective pixels $11_{mn}$ across the first direction and is disposed so as to extend between pixels $11_{mn}$ in the first direction. By thus connecting the one regions 41 in the respective pixels $11_{mn}$ by first wirings 44, the photosensitive portions $12_{mn}$ (for example, the photosensitive portions $12_{11}$ to $12_{1N}$) are electrically connected to each other across each of the pluralities of pixels $11_{11}$ to $11_{1N}$, $11_{21}$ to $11_{2N}$, ..., $11_{M1}$ to $11_{MN}$ that are aligned in the first direction in the two-dimensional array, thus forming long photosensitive units that extend in the first direction in photosensitive region 10. M columns of these long photosensitive units that extend in the first direction are thus formed.

Each of second wirings 47 electrically connects the other regions 42 in the respective pixels $11_{mn}$ across the second direction and is disposed so as to extend between pixels $11_{mn}$ in the second direction. By thus connecting the other regions 42 in the respective pixels $11_{mn}$ by second wirings 47, the photosensitive portions $13_{mn}$ (for example, the photosensitive portions $13_{11}$ to $13_{M1}$) are electrically connected to each other across each of the pluralities of pixels $11_{11}$ to $11_{M1}$, $11_{12}$ to $11_{M2}$, ..., $11_{1N}$ to $11_{MN}$ that are aligned in the second direction in the two-dimensional array, thus forming long photosensitive units that extend in the second direction in photosensitive region 10. N rows of these long photosensitive units that extend in the second direction are thus formed.

In photosensitive region 10, the above-mentioned M columns of long photosensitive units that extend in the first direction and the N rows of long photosensitive units that extend in the second direction are formed on the same plane.

The shapes of regions 41 and 42 are not limited to the substantially triangular shapes shown in FIG. 2 and may be other shapes as shown in FIG. 4 to FIG. 8.

Figure 4:
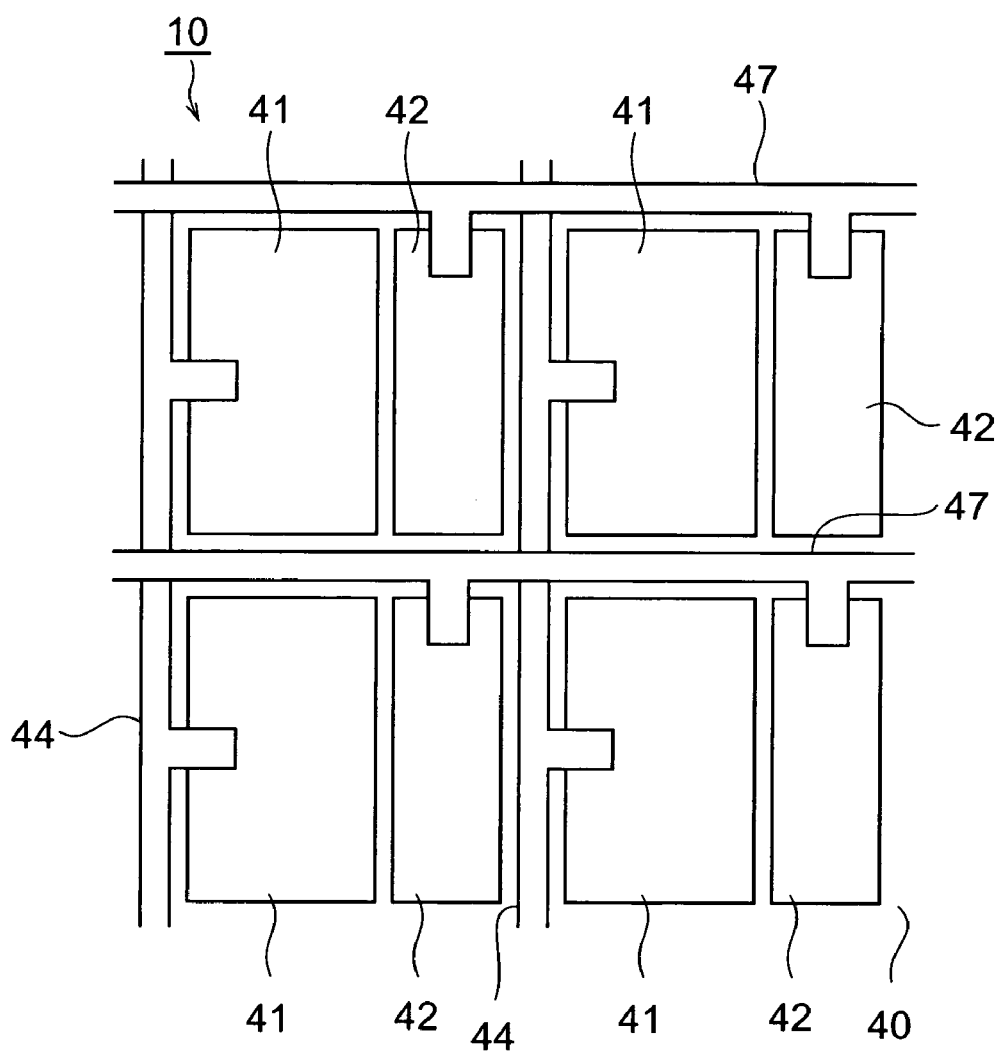
FIG. 4 is an enlarged plan view of the principal parts of an example of a photosensitive region included in the photodetector of the first embodiment.

The second conductive type semiconductor regions (photosensitive portions) shown in FIG. 4 have rectangular shapes as viewed from the light-incident direction, and in a single pixel, the two regions 41 and 42 are formed with the long sides of each being mutually adjacent. Regions 41 (photosensitive portions $12_{mn}$) and regions 42 (photosensitive portions $13_{mn}$) are aligned alternately in the second direction. As shown in FIG. 4, even though in each pixel, the second conductive semiconductor regions of the first direction and the second direction differ in area, it is sufficient that in each direction, the areas are fixed among the pixels. That is, it is sufficient that the total areas of the mutually connected photosensitive regions be the same for all wirings that extend in the same direction.

Figure 5:
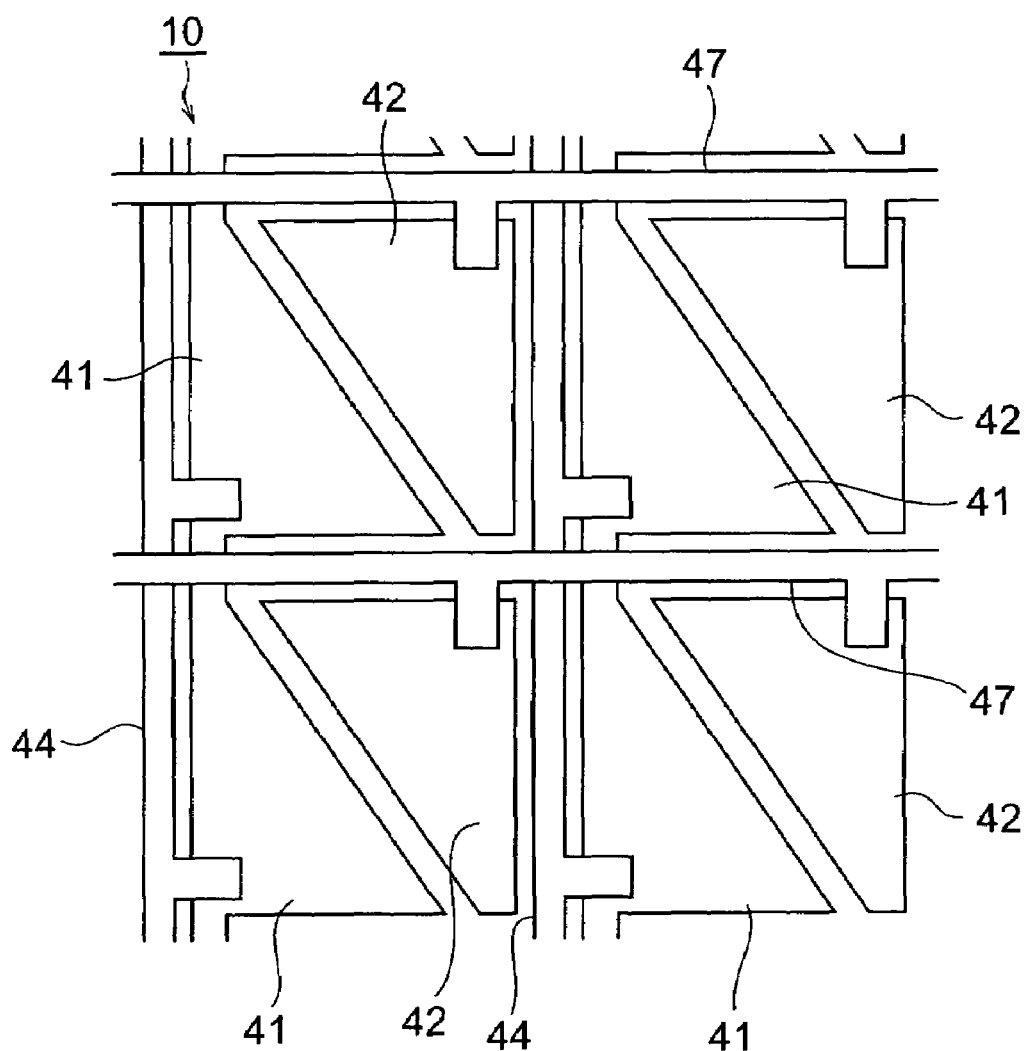
FIG. 5 is an enlarged plan view of the principal parts of an example of a photosensitive region included in the photodetector of the first embodiment.

With the second conductive type semiconductor regions (photosensitive portions) shown in FIG. 5, the one regions 41, each with a substantially triangular shape, are formed to be continuous in the first direction. Each of the regions 42 has a substantially triangular shape and is formed independently of the others across pixels $11_{mn}$. Regions 41 (photosensitive portions $12_{mn}$) and regions 42 (photosensitive portions $13_{mn}$) are aligned alternately in the second direction. Though in the case where the regions 41 are formed to be continuous in the first direction, the provision of first wirings 44 is not necessarily required, since the reading speed may drop in accompaniment with an increase in serial resistance, the respective regions 41 are preferably connected electrically by first wirings 44.

Figure 6:
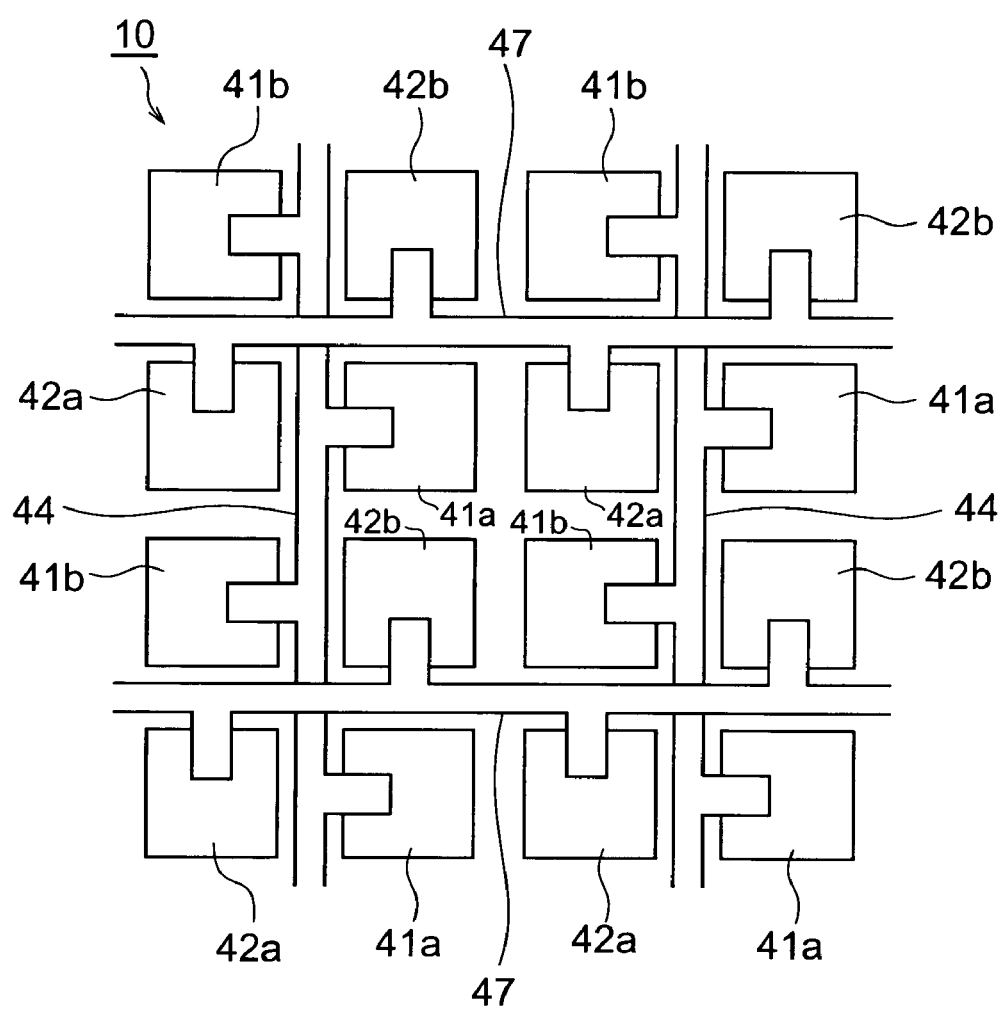
FIG. 6 is an enlarged plan view of the principal parts of an example of a photosensitive region included in the photodetector of the first embodiment.

With the second conductive type semiconductor regions (photosensitive portions) shown in FIG. 6, each pixel comprises the four regions 41a, 41b, 42a, and 42b and diagonally positioned regions are electrically connected as a pair by a first wiring 44 or a second wiring 47. Regions 41 (photosensitive portions $12_{mn}$) and regions 42 (photosensitive portions $13_{mn}$) are aligned alternately in the first direction and the second direction. Regions 41 (photosensitive portions $12_{mn}$) and regions 42 (photosensitive portions $13_{mn}$) are also aligned alternately in a third direction and a fourth direction.

Figure 7:
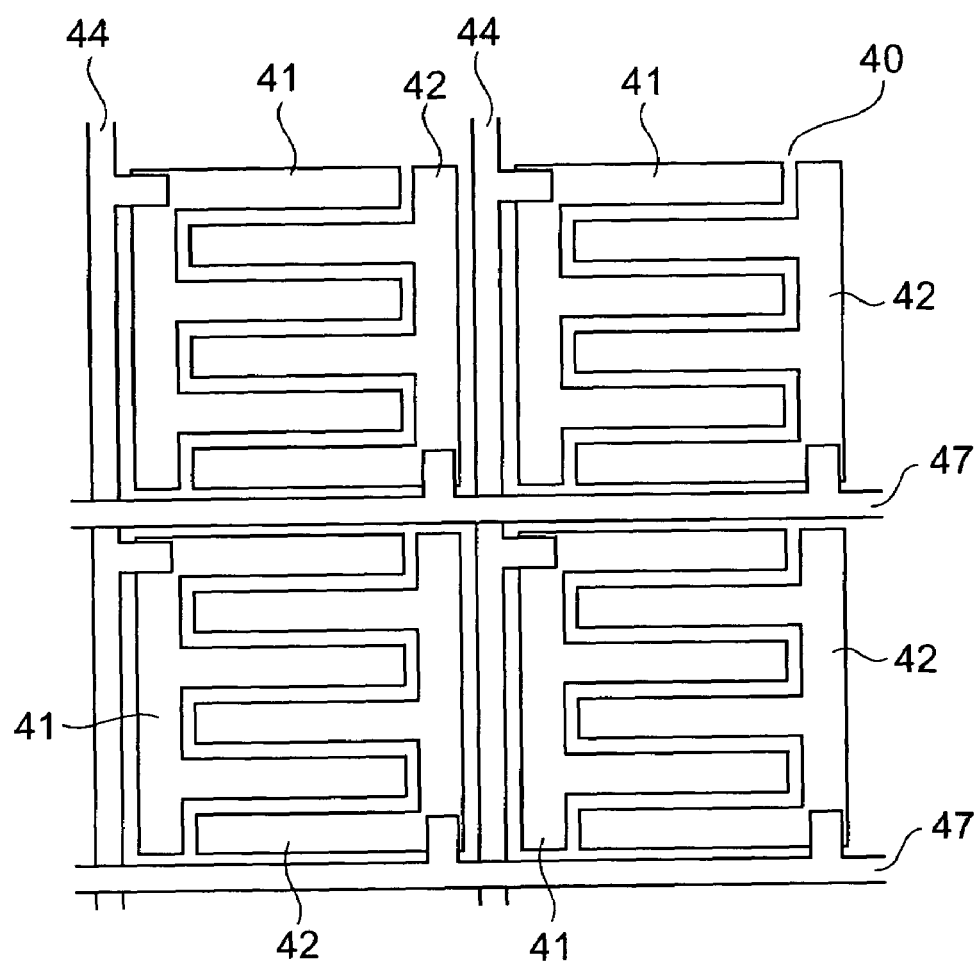
FIG. 7 is an enlarged plan view of the principal parts of an example of a photosensitive region included in the photodetector of the first embodiment.

With the second conductive semiconductor regions (photosensitive portions), shown in FIG. 7, two pectinate regions 41 and 42 are formed in a mutually engaged manner.

Figure 8:
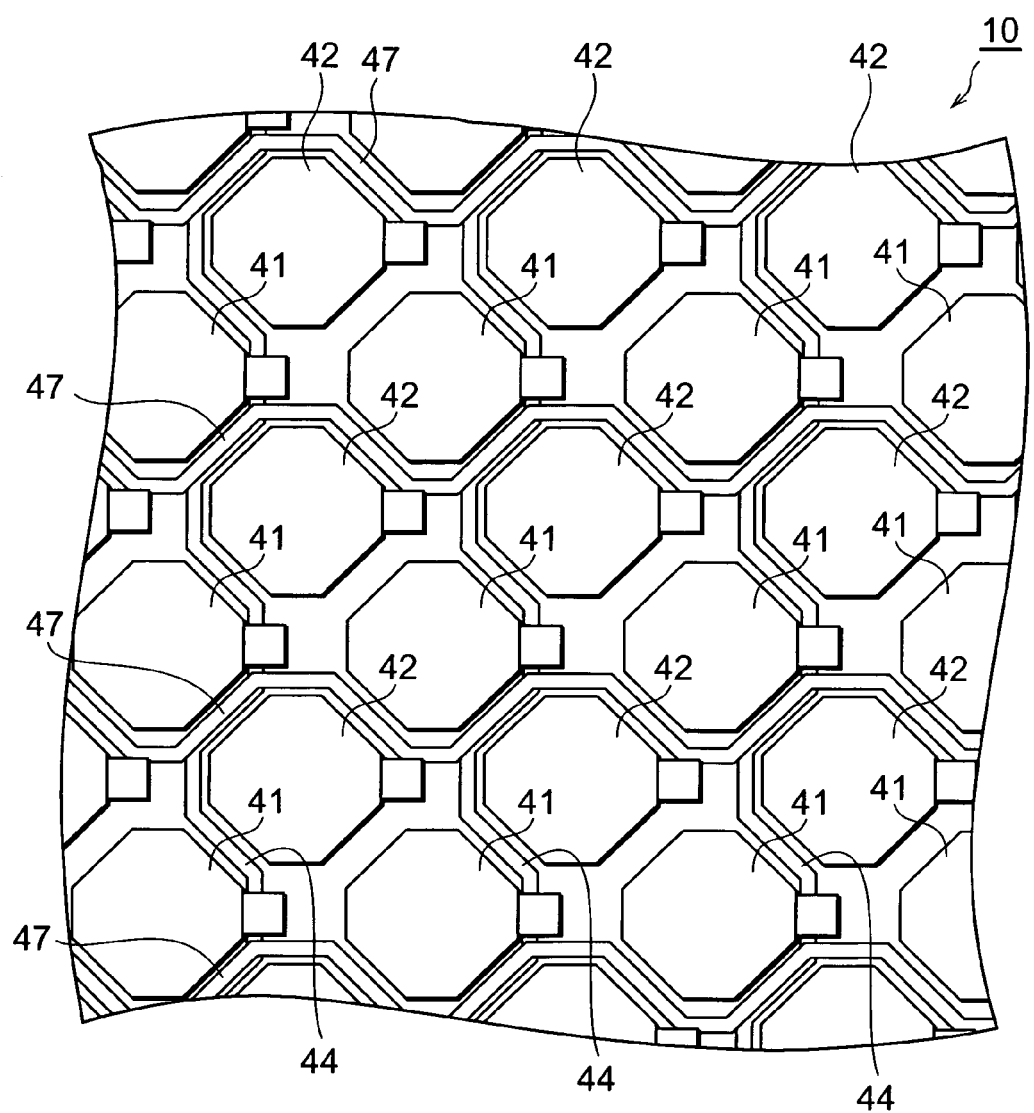
FIG. 8 is an enlarged plan view of the principal parts of an example of a photosensitive region included in the photodetector of the first embodiment.

Each of the second conductive type semiconductor regions (photosensitive portions) shown in FIG. 8 has a polygonal shape (for example, an octagonal shape) with no less than four sides as viewed from the light-incident direction, and in a single pixel, the regions are formed with one side of each being mutually adjacent. In a single pixel, a region 41 and a region 42 are positioned along a third direction that intersects the first direction and the second direction and, as viewed from the light-incident direction, are arrayed in honeycomb-like manner. Regions 41 (photosensitive portions $12_{mn}$) and regions 42 (photosensitive portions $13_{mn}$) are thus aligned alternately in the third direction and a fourth direction.

Figure 9:
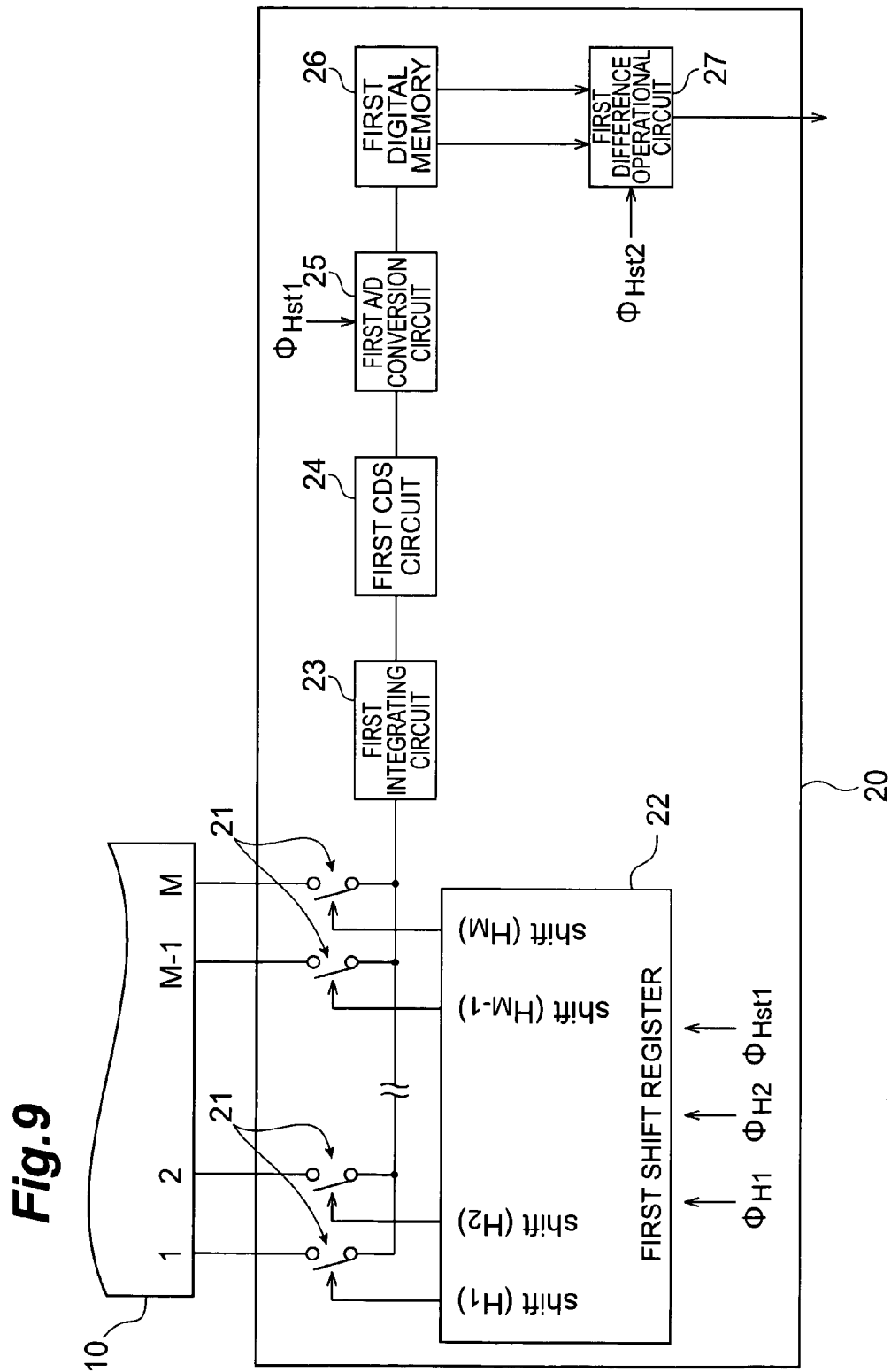
FIG. 9 is a schematic composition diagram of a first signal processing circuit included in the photodetector of the first embodiment.
Figure 10:
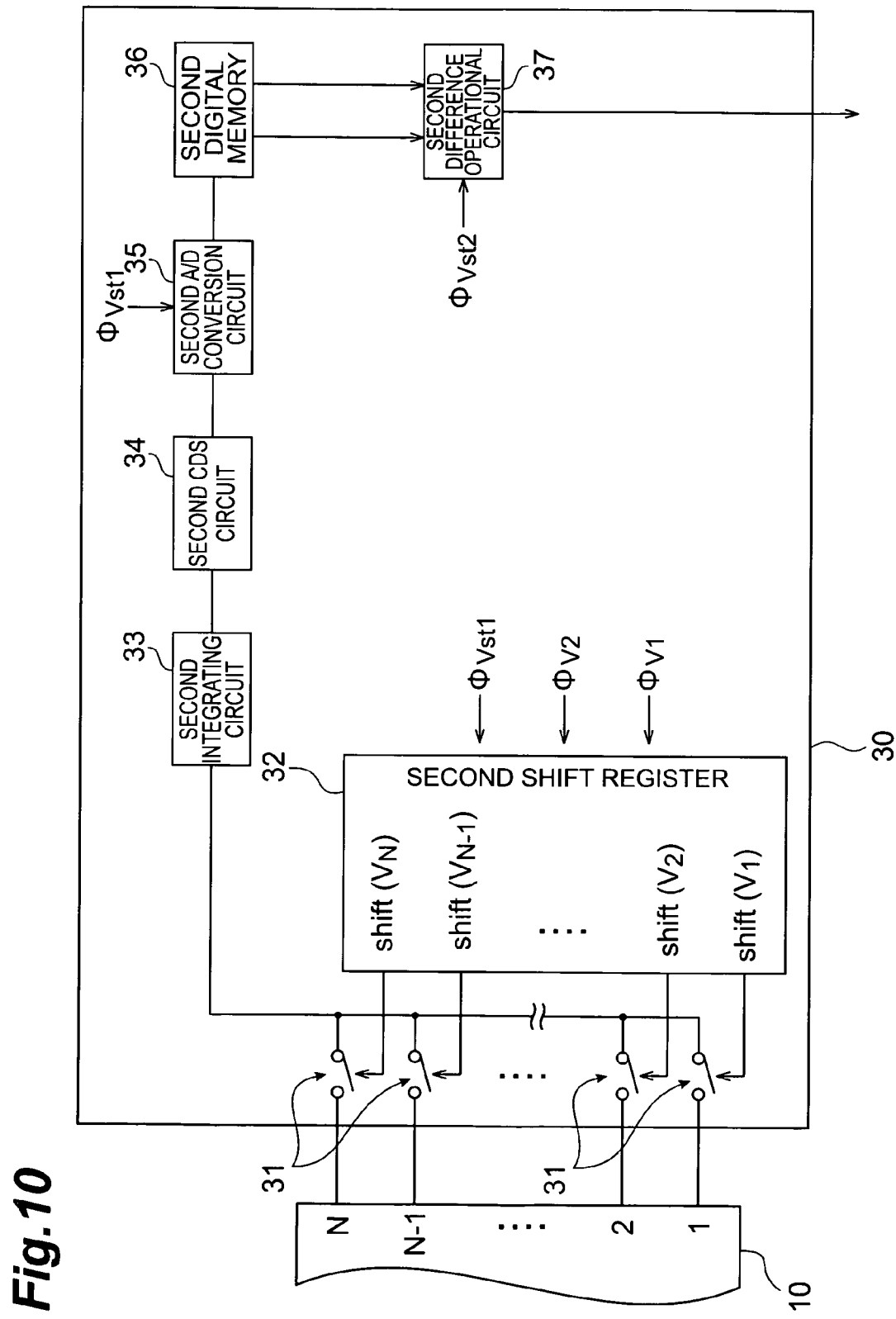
FIG. 10 is a schematic composition diagram of a second signal processing circuit included in the photodetector of the first embodiment.

The compositions of first signal processing circuit 20 and second signal processing circuit 30 shall now be described based on FIG. 9 and FIG. 10. FIG. 9 is a schematic composition diagram of the first signal processing circuit, and FIG. 10 is a schematic composition diagram of the second signal processing circuit.

First signal processing circuit 20 detects a luminance profile in the second direction based on the differences between outputs, corresponding to charges accumulated in the first groups of the photosensitive portions $12_{mn}$ that are electrically connected across the pluralities of pixels $11_{11}$ to $11_{1N}$, $11_{21}$ to $11_{2N}$, ..., $11_{M1}$ to $11_{MN}$ aligned in the first direction (the M columns of long photosensitive units that extend in the first direction and comprise the second conductive type semiconductor regions 41) during a first period in which spot light is illuminated by light source 3 onto the object, and outputs, corresponding to charges accumulated in the first groups of the photosensitive portions $12_{mn}$ during a second period in which spot light is not illuminated by light source 3 onto the object. As shown in FIG. 9, first signal processing circuit 20 comprises first switches 21, disposed in correspondence to the first groups of the photosensitive portions $12_{mn}$ that are electrically connected across the pluralities of pixels $11_{11}$ to $11_{1N}$, $11_{21}$ to $11_{2N}$, ..., $11_{M1}$ to $11_{MN}$ aligned in the first direction, a first shift register 22 for successively reading, in the second direction, the electric currents from the first groups of the photosensitive portions $12_{mn}$ that are electrically connected across the pluralities of pixels $11_{11}$ to $11_{1N}$, $11_{21}$ to $11_{2N}$, ..., $11_{M1}$ to $11_{MN}$ aligned in the first direction, and a first integrating circuit 23, successively inputting the electric currents from the respective first groups of the photosensitive portions $12_{mn}$ that are read successively by first shift register 22 and converting and outputting these electric currents as a voltage. First signal processing circuit 20 also has a first CDS circuit 24, a first A/D conversion circuit 25, a first digital memory 26, and a first difference operational circuit 27.

First switches 21 are closed successively by being controlled by signals shift($H_m$), which are output from first shift register 22. By closing first switches 21, the charges that are accumulated in the first groups of the photosensitive portions $12_{mn}$ that are electrically connected across the pluralities of pixels $11_{11}$ to $11_{1N}$, $11_{21}$ to $11_{2N}$, ..., $11_{M1}$ to $11_{MN}$ aligned in the first direction become electric currents that are output via first wirings 44 and first switches 21 to first integrating circuit 23. First shift register 22 is controlled in operation and closes first switches 21 successively in accordance with signals $\phi_{H1}$, $\phi_{H2}$, and $\phi_{Hst1}$, which are output from timing control circuit 50.

Figure 11:
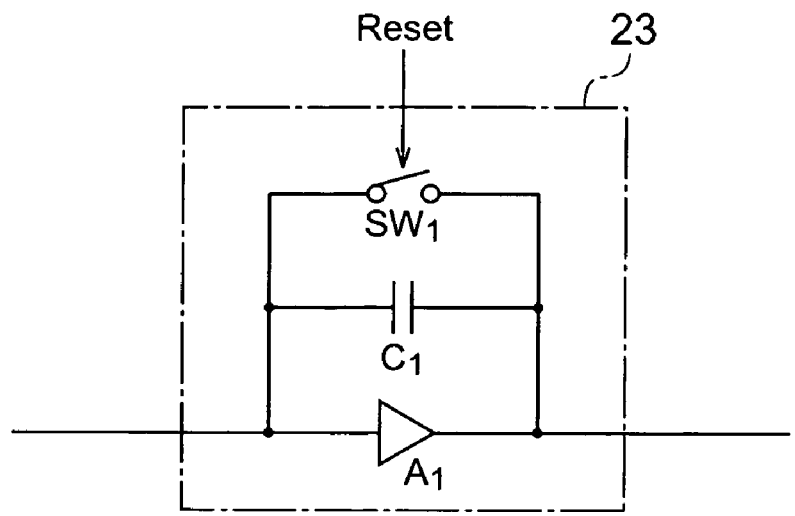
FIG. 11 is a circuit diagram of a first integrating circuit included in the first signal processing circuit.

As shown in FIG. 11, first integrating circuit 23 comprises an amp $A_1$, inputting the electric currents from the first groups of the photosensitive portions $12_{mn}$, which are electrically connected across the pluralities of pixels $11_{11}$ to $11_{1N}$, $11_{21}$ to $11_{2N}$, ..., $11_{M1}$ to $11_{MN}$ aligned in the first direction, and amplifying the charges of the input electric currents, a capacitor $C_1$, having one terminal connected to the input terminal of amp $A_1$ and having the other terminal connected to the output terminal of amp $A_1$, and a switch $SW_1$, having one terminal connected to the input terminal of amp $A_1$, having the other terminal connected to the output terminal of amp $A_1$, being put in the "ON" state when a reset signal $\phi_{Hreset}$ (not shown), output from timing control circuit 50 is High, and being put in the "OFF" state when reset signal $\phi_{Hreset}$, is Low.

When switch $SW_1$ is in the "ON" state, first integrating circuit 23 discharges and initializes capacitor $C_1$. On the other hand, when switch $SW_1$ is in the "OFF" state, first integrating circuit 23 accumulates, in capacitor $C_1$, the charges input in the input terminal from the first groups of the photosensitive portions $12_{mn}$ that are electrically connected across the pluralities of pixels $11_{11}$ to $11_{1N}$, $11_{21}$ to $11_{2N}$, . . . , $11_{M1}$ to $11_{MN}$ aligned in the first direction and outputs, from the output terminal, a voltage that is in accordance with the accumulated charges.

The operations of first switch 21, first shift register 22, and first integrating circuit 23 shall now be described based on FIG. 13A to FIG. 13I. FIG. 13A to FIG. 13I are timing charts for describing the operations of the first switch, the first shift register, and the first integrating circuit in the first signal processing circuit.

When start signal $\phi_{Hst1}$ is input from timing control circuit 50 into first shift register 22 (see FIG. 13A), signals shift ($H_m$), each having a pulse width corresponding to the period between the rising edge of signal $\phi_{H2}$ to the trailing edge of signal $\phi_{H1}$, are output successively (see FIGS. 13B, 13C, and 13E to 13H). When a signal shift($H_m$) is output from first shift register 22 to a corresponding first switch 21, the corresponding first switch 21 closes successively and the charges accumulated in the corresponding first group of the photosensitive portions $12_{mn}$ become output successively as electric currents to first integrating circuit 23.

Figure 13A:
FIG. 13A is a graph showing the variation with time of a start signal that is input into a first shift register.
Figure 13B:
FIG. 13B is a graph showing the variation with time of a signal that is input into the first shift register.
Figure 13C:
FIG. 13C is a graph showing the variation with time of a signal that is input into the first shift register.
Figure 13D:
FIG. 13D is a graph showing the variation with time of a reset signal that is input into the first integrating circuit.
Figure 13E:
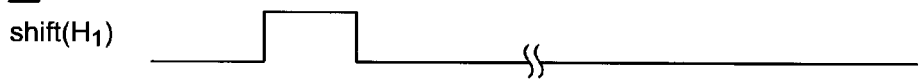
FIG. 13E is a graph showing the variation with time of a signal that is output from the first shift register.
Figure 13F:
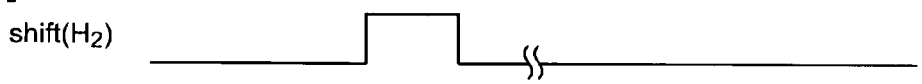
FIG. 13F is a graph showing the variation with time of a signal that is output from the first shift register.
Figure 13G:
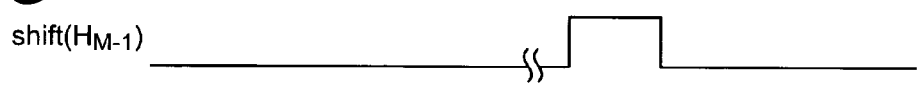
FIG. 13G is a graph showing the variation with time of a signal that is output from the first shift register.
Figure 13H:
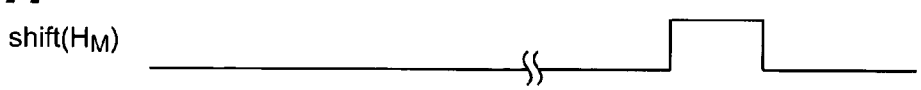
FIG. 13H is a graph showing the variation with time of a signal that is output from the first shift register.
Figure 13I:
FIG. 13I is a graph showing the variation with time of a voltage that is output from the first integrating circuit.

Reset signal $\phi_{Hreset}$ from timing control circuit 50 is input into first integrating circuit 23 (see FIG. 13D). During the period in which reset signal $\phi_{Hreset}$ is in the "OFF" state, the charges accumulated in the corresponding group of the photosensitive portions $12_{mn}$ are accumulated in capacitor $C_1$ and a voltage, which is in accordance with the amount of the accumulated charges, is successively output from first integrating circuit 23 (see FIG. 13I). When reset signal $\phi_{Hreset}$ is in the "ON" state, first integrating circuit 23 closes switch $SW_1$ and initializes capacitor $C_1$.

Thus from first integrating circuit 23, a voltage, corresponding to the charges accumulated in the first groups of the photosensitive portions $12_{mn}$ that are electrically connected across the pluralities of pixels $11_{11}$ to $11_{1N}$, $11_{21}$ to $11_{2N}$, . . . , $11_{M1}$ to $11_{MN}$ aligned in the first direction, is output successively as time series data in accordance with the corresponding first groups of the photosensitive portions $12_{mn}$. This time series data indicates the luminance profile (analog data) in the second direction.

Figure 12:
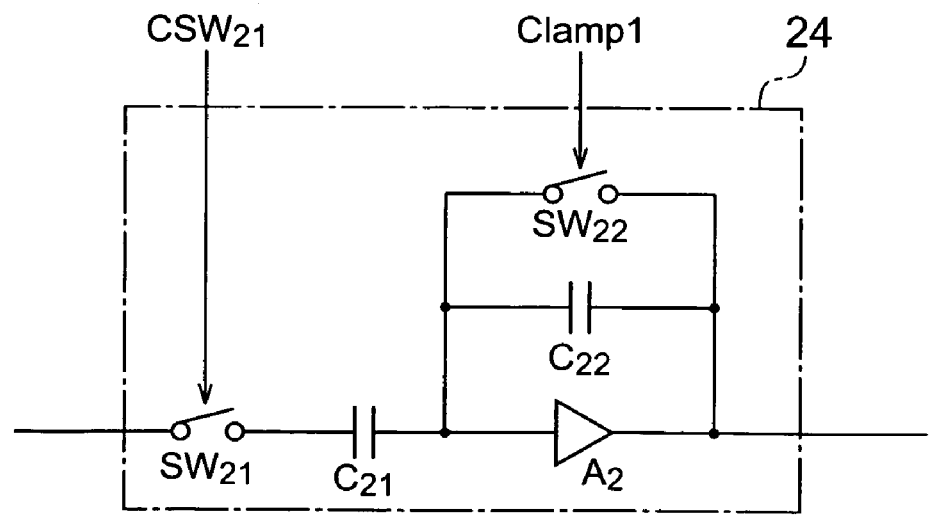
FIG. 12 is a circuit diagram of a first CDS circuit included in the first signal processing circuit.

Referring again to FIG. 9, first CDS circuit 24 outputs a voltage that is in accordance with the variation amount of the voltage from first integrating circuit 23. As shown in FIG. 12, first CDS circuit 24 has a switch $SW_{21}$, a coupling capacitor $C_{21}$, and an amp $A_2$, disposed in that order between an input terminal and an output terminal. Also, a switch $SW_{22}$ and an integrating capacitor $C_{22}$ are connected in parallel to each other between the input and the output of amp $A_2$. Switches $SW_{22}$ and $SW_{21}$ function as switching element for accumulating charges in integrating capacitor $C_{22}$. When switch $SW_{22}$ is closed, first CDS circuit 24 discharges and initializes integrating capacitor $C_{22}$. When switch $SW_{22}$ is opened and switch $SW_{21}$ is closed, charges that are input from the input terminal and via coupling capacitor $C_{21}$ are accumulated in integrating capacitor $C_{22}$, and a voltage that is in accordance with the accumulated charges is output from the output terminal. Switch $SW_{21}$ opens and closes based on a CSW21 signal output from timing control circuit 50. Also, switch $SW_{22}$ opens and closes based on a Clamp 1 signal output from timing control circuit 50.

First A/D conversion circuit 25 successively inputs the voltage (analog values) from first CDS circuit 24, converts this voltage into digital values, and outputs the digital values. A clock pulse signal (not shown) and a start signal $\phi_{Hst1}$ are input from timing control circuit 50 into first A/D conversion circuit 25, which operates based on these signals. The digital values output from first A/D conversion circuit 25 become outputs that express the luminance profile (digital data) in the second direction.

First digital memory 26 stores digital values, which, among the digital values output from first A/D conversion circuit 25, correspond to the first period (the values resulting from the A/D conversion of the voltage (analog values) converted from the electric currents corresponding to the charges accumulated in the first groups of the photosensitive portions $12_{mn}$ during the above-mentioned first period), likewise stores digital values corresponding to the second period (the values resulting from the A/D conversion of the voltage (analog values) converted from the electric currents corresponding to the charges accumulated in the first groups of the photosensitive portions $12_{mn}$ during the above-mentioned second period), and outputs the stored digital values to first difference operational circuit 27. Start signals $\phi_{Hst1}$ and $\phi_{Hst2}$ (not shown) are input from timing control circuit 50 into first digital memory 26, which operates based on these signals.

During the above-mentioned first period, light source 3 is lit. That is, this is the period during which switch 7 is closed based on the control signal from timing control circuit 50 and spot light is illuminated from light emitting element 5. Thus of the digital values output from first A/D conversion circuit 25, the digital values corresponding to the first period are outputs that express the luminance profile in the second direction that includes spot light components (signal light components) from light emitting element 5 and background light components (for example, light from a fluorescent lamp, sun, etc.).

During the above-mentioned second period, light source 3 is not lit. That is, this is the period during which switch 7 is opened based on the control signal from timing control circuit 50 and spot light is not illuminated from light emitting element 5. Thus of the digital values output from first A/D conversion circuit 25, the digital values corresponding to the second period are outputs that express the luminance profile in the second direction that contains just the background light components (for example, light from a fluorescent lamp, sun, etc.).

First difference operational circuit 27 determines the differences between the digital values corresponding to the first period and the digital values corresponding to the second period that are output from first digital memory 26 and outputs digital values corresponding to these differences. The digital values output from first difference operational circuit 27 are thus outputs that express the luminance profile in the second direction, from which the background light components have been eliminated and which contain just the spot light components.

The operations of first difference operational circuit 27 shall now be described based on FIG. 15A to FIG. 15E. FIG.

15A to FIG. 15E are timing charts for describing the operations of the first difference operational circuit in the first signal processing circuit. In FIG. 15D and FIG. 15E, the digital outputs of the first A/D conversion circuit and the first difference operational circuit are shown in the form of analog outputs for the sake of description.

When switch 7 is closed for a predetermined period during which control signal LED from timing control circuit 50 is "High" (see FIG. 15C), spot light is illuminated from light emitting element 5 just for a duration corresponding to the predetermined period. Then in synchronization with start signal $\phi_{Hst1}$, a voltage is output from first integrating circuit 23 and digital values are output successively from first A/D conversion circuit 25 as described above (see FIG. 15A and FIG. 15D). The digital values output from first A/D conversion circuit 25 are stored in first digital memory 26 according to the above-mentioned digital values corresponding to the first period and the digital values corresponding to the second period. In synchronization with start signal $\phi_{Hst2}$, output from timing control circuit 50, first difference operational circuit 27 reads out the digital values corresponding to the first period and the digital values corresponding to the second period that are stored in first digital memory 26, determines the differences between the two, and outputs digital values that are in accordance with the differences (see FIG. 15B and FIG. 15E).

Second signal processing circuit 30 detects a luminance profile in the first direction based on the differences between outputs, corresponding to charges accumulated in the second groups of the photosensitive portions $13_{mn}$ that are electrically connected across the pluralities of pixels $11_{11}$ to $11_{M1}$, $11_{12}$ to $11_{M2}$, . . . , $11_{1N}$ to $11_{MN}$ aligned in the second direction (the N rows of long photosensitive units that extend in the second direction and comprise the second conductive type semiconductor regions 42) during a first period in which spot light is illuminated by light source 3 onto the object, and outputs, corresponding to charges accumulated in the second groups of the photosensitive portions $13_{mn}$ during a second period in which spot light is not illuminated by light source 3 onto the object. As shown in FIG. 10, second signal processing circuit 30 comprises second switches 31, disposed in correspondence to the second groups of the photosensitive portions $13_{mn}$ that are electrically connected across the pluralities of pixels $11_{11}$ to $11_{M1}$, $11_{12}$ to $11_{M2}$, . . . , $11_{1N}$ to $11_{MN}$ aligned in the second direction, a second shift register 32 for successively reading, in the first direction, the electric currents from the second groups of the photosensitive portions $13_{mn}$ that are electrically connected across the pluralities of pixels $11_{11}$ to $11_{M1}$, $11_{12}$ to $11_{M2}$, . . . , $11_{1N}$ to $11_{MN}$ aligned in the second direction, and a second integrating circuit 33, successively inputting the electric currents from the respective second groups of the photosensitive portions $13_{mn}$ that are read successively by second shift register 32 and converting and outputting these electric currents as a voltage. Second signal processing circuit 30 also has a second CDS circuit 34, a second A/D conversion circuit 35, a second digital memory 36, and a second difference operational circuit 37.

Second switches 31 are closed successively by being controlled by signals shift($V_n$), which are output from second shift register 32. By closing second switches 31, the charges that are accumulated in the second groups of the photosensitive portions $13_{mn}$ that are electrically connected across the pluralities of pixels $11_{11}$ to $11_{M1}$, $11_{12}$ to $11_{M2}$, . . . , $11_{1N}$ to $11_{MN}$ aligned in the second direction become electric currents that are output via second wirings 47 and second switches 31 to second integrating circuit 33. Second shift register 32 is controlled in operation and closes second switches 31 successively in accordance with signals $\phi_{V1}$, $\phi_{V2}$, and $\phi_{Vst1}$, which are output from timing control circuit 50.

Second integrating circuit 33 has an composition equivalent to first integrating circuit 23 shown in FIG. 11 and comprises an amplifier, inputting the electric currents from the second groups of the photosensitive portions $13_{mn}$, which are electrically connected across the pluralities of pixels $11_{11}$ to $11_{M1}$, $11_{12}$ to $11_{M2}$, . . . , $11_{1N}$ to $11_{MN}$ aligned in the second direction, and amplifying the charges of the input electric currents, a capacitor, having one terminal connected to the input terminal of the amplifier and having the other terminal connected to the output terminal of the amplifier, and a switch, having one terminal connected to the input terminal of the amp, having the other terminal connected to the output terminal of the amplifier, being put in the "ON" state when a reset signal $\phi_{Vreset}$ (not shown), output from timing control circuit 50 is High, and being put in the "OFF" state when reset signal $\phi_{Vreset}$ is Low.

When the switch is in the "ON" state, second integrating circuit 33 discharges and initializes the capacitor. On the other hand, when the switch is in the "OFF" state, second integrating circuit 33 accumulates, in the capacitor, the charges input in the input terminal from the second groups of the photosensitive portions $13_{mn}$ that are electrically connected across the pluralities of pixels $11_{11}$ to $11_{M1}$, $11_{12}$ to $11_{M2}$, . . . , $11_{1N}$ to $11_{MN}$ aligned in the second direction and outputs, from the output terminal, a voltage that is in accordance with the accumulated charges.

The operations of second switch 31, second shift register 32, and second integrating circuit 33 shall now be described based on FIG. 14A to FIG. 14I. FIG. 14A to FIG. 14I are timing charts for describing the operations of the second switch, the second shift register, and the second integrating circuit in the second signal processing circuit.

When start signal $\phi_{Vst1}$ is input from timing control circuit 50 into second shift register 32 (see FIG. 14A), signals shift($V_n$), each having a pulse width corresponding to the period between the rising edge of signal $\phi_{V2}$ to the trailing edge of signal $\phi_{V1}$, are output successively (see FIGS. 14B, 14C, and 14E to 14H). When a signal shift($V_n$) is output from second shift register 32 to a corresponding second switch 31, the corresponding second switch 31 closes successively and the charges accumulated in the corresponding second group of the photosensitive portions $13_{mn}$ become output successively as electric currents to second integrating circuit 33.

Reset signal $\phi_{Vreset}$ from timing control circuit 50 is input into second integrating circuit 33 (see FIG. 14D). During the period in which reset signal $\phi_{Vreset}$ is in the "OFF" state, the charges accumulated in the corresponding second group of the photosensitive portions $13_{mn}$ are accumulated in the capacitor and a voltage, which is in accordance with the amount of the accumulated charges, is successively output from second integrating circuit 33 (see FIG. 14I). When reset signal $\phi_{Vreset}$ is in the "ON" state, second integrating circuit 33 closes the switch and initializes the capacitor.

Thus from second integrating circuit 33, a voltage, corresponding to the charges (electric currents) accumulated in the second groups of the photosensitive portions $13_{mn}$ that are electrically connected across the pluralities of pixels $11_{11}$ to $11_{M1}$, $11_{12}$ to $11_{M2}$, . . . , $11_{1N}$ to $11_{MN}$ aligned in the second direction, is output successively as time series data in accordance with the corresponding second groups of the photosensitive portions $13_{mn}$. This time series data indicates the luminance profile (analog data) in the first direction.

Referring again to FIG. 10, second CDS circuit 34 outputs a voltage that is in accordance with the variation amount of the voltage from second integrating circuit 33. Second CDS circuit 34 has an composition equivalent to first CDS circuit 24, shown in FIG. 12, and has a switch, a coupling capacitor, and an amplifier, disposed in that order between an input terminal and an output terminal. Also, a switch and an integrating capacitor are connected in parallel to each other between the input and output of the amplifier.

Second A/D conversion circuit 35 successively inputs the voltage (analog values) from second CDS circuit 34, converts this voltage into digital values, and outputs the digital values. A clock pulse signal (not shown) and a start signal $\phi_{Vst1}$ are input from timing control circuit 50 into second A/D conversion circuit 35, which operates based on these signals. The digital values output from second A/D conversion circuit 35 become outputs that express the luminance profile (digital data) in the first direction.

Second digital memory 36 stores digital values, which, among the digital values output from second A/D conversion circuit 35, correspond to the first period (the values resulting from the A/D conversion of the voltage (analog values) converted from the electric currents corresponding to the charges accumulated in the second groups of the photosensitive portions $13_{mn}$ during the above-mentioned first period), likewise stores digital values corresponding to the second period (the values resulting from the A/D conversion of the voltage (analog values) converted from the electric currents corresponding to the charges accumulated in the second groups of the photosensitive portions $13_{mn}$ during the above-mentioned second period), and outputs the stored digital values to second difference operational circuit 37. Start signals $\phi_{Vst1}$ and $\phi_{Vst2}$ (not shown) are input from timing control circuit 50 into second digital memory 36, which operates based on these signals.

Second difference operational circuit 37 determines the differences between the digital values corresponding to the first period and the digital values corresponding to the second period that are output from second digital memory 36 and outputs digital values corresponding to these differences. The digital values output from second difference operational circuit 37 are thus outputs that express a luminance profile in the first direction, from which the background light components have been eliminated and which contain just the spot light components.

The operations of second difference operational circuit 37 shall now be described based on FIG. 16A to FIG. 16E. FIG. 16A to FIG. 16E are timing charts for describing the operations of the second difference operational circuit in the second signal processing circuit. In FIG. 16D and FIG. 16E, the digital outputs of the second A/D conversion circuit and the second difference operational circuit are shown in the form of analog outputs for the sake of description.

When switch 7 is closed for a predetermined period during which control signal LED from timing control circuit 50 is "High" (see FIG. 16C), spot light is illuminated from light emitting element 5 just during a period corresponding to the predetermined period. Then in synchronization with start signal $\phi_{Vst1}$, a voltage is output from second integrating circuit 33 and digital values are output successively from second A/D conversion circuit 35 as described above (see FIG. 16A and FIG. 16D). The digital values output from second A/D conversion circuit 35 are stored in second digital memory 36 according to the above-mentioned digital value corresponding to the first period and digital value corresponding to the second period. In synchronization with start signal $\phi_{Vst2}$, output from timing control circuit 50, second difference operational circuit 37 reads out the digital values corresponding to the first period and the digital values corresponding to the second period that are stored in second digital memory 36, determines the differences between the two, and outputs digital values that are in accordance with the differences (see FIG. 16B and FIG. 16E).

Thus with photodetector 1 of the present embodiment, light that is made incident on a single pixel $11_{mn}$ is made incident on each of the plurality of photosensitive portions $12_{mn}$ and $13_{mn}$ that make up pixel $11_{mn}$ and currents that are in accordance with light intensity are output according to photosensitive portions $12_{mn}$ and $13_{mn}$. Since the photosensitive portions $12_{mn}$ are electrically connected across each of the pluralities of pixels $11_{11}$ to $11_{1N}$, $11_{21}$ to $11_{2N}$, ..., $11_{M1}$ to $11_{MN}$ aligned in the first direction of the two-dimensional array, the electric currents from the photosensitive portions $12_{mn}$ are sent in the first direction. Also, since the photosensitive portions $13_{mn}$ are electrically connected across each of the pluralities of pixels $11_{11}$ to $11_{M1}$, $11_{12}$ to $11_{M2}$, ..., $11_{1N}$ to $11_{MN}$ aligned in the second direction of the two-dimensional array, the currents output from the photosensitive portions $13_{mn}$ are sent in the second direction. Since the currents output from the photosensitive portions $12_{mn}$ are sent in the first direction and the currents output from the photosensitive portions $13_{mn}$ are sent in the second direction, the luminance profile in the first direction and the luminance profile in the second direction can be obtained independently of the other. As a result, two-dimensional position of the incident light can be detected at high speed by an extremely simple composition of disposing the plurality of photosensitive portions $12_{mn}$ and $13_{mn}$ in a single pixel.

Also with photodetector 1 of the present embodiment, photosensitive portions $12_{mn}$ and $13_{mn}$ comprise semiconductor substrate 40 portions and second conductive type semiconductor regions 41 and 42, and as viewed from the light-incident direction, second conductive type semiconductor regions 41 and 42 have substantially triangular shapes and are formed with one side of each being mutually adjacent in a single pixel. The areas of the respective photosensitive portions $12_{mn}$ and $13_{mn}$ (second conductive type semiconductor regions 41 and 42) can thus be restrained from becoming reduced in disposing the plurality of photosensitive portions $12_{mn}$ and $13_{mn}$ in a single pixel.

Also with photodetector 1 of the present embodiment, second conductive type semiconductor regions 41 and 42 have substantially rectangular shapes as viewed from the light-incident direction and are formed with the long sides of each being mutually adjacent in a single pixel. The areas of the respective photosensitive portions $12_{mn}$ and $13_{mn}$ (second conductive type semiconductor regions 41 and 42) can thus be restrained from becoming reduced in disposing the plurality of photosensitive portions $12_{mn}$ and $13_{mn}$ in a single pixel.

Also with photodetector 1 of the present embodiment, second conductive type semiconductor regions 41 and 42 have polygonal shapes with no less than four sides as viewed from the light-incident direction and are formed with one side of each being mutually adjacent in a single pixel. The areas of the respective photosensitive portions $12_{mn}$ and $13_{mn}$ (second conductive type semiconductor regions 41 and 42) can thus be restrained from becoming reduced in disposing the plurality of photosensitive portions $12_{mn}$ and $13_{mn}$ in a single pixel. Also, the peripheral length of each of the photosensitive portions $12_{mn}$ and $13_{mn}$ becomes reduced with respect to the area, and the dark current per unit area becomes reduced. A rhomboid shape may be employed as a polygonal shape with no less than four sides.

Also with photodetector 1 of the present embodiment, second conductive type semiconductor regions 41 and 42 are aligned along a third direction, which intersects the first direction and the second direction, in a single pixel. Thus in the first groups of the photosensitive portions $12_{mn}$ and the second groups of the photosensitive portions $13_{mn}$, the photosensitive portions 12mn and 13mn corresponding to each group of photosensitive portions 12mn and 13mn are concentrated at the center of the corresponding group of photosensitive portions. Therefore, resolution can be improved.

Also with photodetector 1 of the present embodiment, second conductive type semiconductor regions 41 and 42 are arrayed in honeycomb-like form as viewed from the light-incident direction. The areas of the respective photosensitive portions $12_{mn}$ and $13_{mn}$ (second conductive type semiconductor regions 41 and 42) can thus be further restrained from becoming reduced in disposing the plurality of photosensitive portions $12_{mn}$ and $13_{mn}$ in a single pixel. Also, since the geometrical symmetry is high, non-uniformity due to positional deviation of a mask used for forming second conductive type semiconductor regions 41 and 42 (photosensitive portions $12_{mn}$ and $13_{mn}$) can be restrained.

Also with photodetector 1 of the present embodiment, first wirings 44 are disposed to extend between pixels $11_{mn}$ in the first direction and second wirings 47 are disposed to extend between pixels $11_{mn}$ in the second direction. The incidence of light onto photosensitive portions $12_{mn}$ and $13_{mn}$ (second conductive type semiconductor regions 41 and 42) will thus not be obstructed by the respective wirings 44 and 47 and the lowering of detection sensitivity can be restrained.

Also with photodetector of the first embodiment, by means of first signal processing circuit 20, the luminance profile in the second direction is detected based on differences between the outputs, corresponding to the charges accumulated in the first groups of the photosensitive portions $12_{mn}$ over the first period, and the outputs, corresponding to the charges accumulated in the first groups of the photosensitive portions $12_{mn}$ over the second period. Thus even if background light which is incident to photosensitive region 10, the luminance profile in the second direction can be detected in a state in which the background light components are eliminated. Also, by means of second signal processing circuit 30, the luminance profile in the first direction is detected based on differences between the outputs, corresponding to the charges accumulated in the second groups of the photosensitive portions $13_{mn}$ over the first period, and the outputs, corresponding to the charges accumulated in the second groups of the photosensitive portions $13_{mn}$ over the second period. Thus even if background light which is incident to photosensitive region 10, the luminance profile in the first direction can be detected in a state in which the background light components are eliminated. The two-dimensional position of light made incident on photosensitive region 10 can thus be detected with extremely high precision.

With photodetector 1 of the present embodiment, first signal processing circuit 20 comprises first shift register 22, first integrating circuit 23, first CDS circuit 24, first A/D conversion circuit 25, and first difference operational circuit 27, and second signal processing circuit 30 comprises second shift register 32, second integrating circuit 33, second CDS circuit 34, second A/D conversion circuit 35, and second difference operational circuit 37. Thus even if first integrating circuit 23 and second integrating circuit 33 respectively have noise fluctuations that differ according to integrating operation, the noise errors are eliminated by first CDS circuit 24 and second CDS circuit 34. As a result, the luminance profile in the first direction and the luminance profile in the second direction can be obtained at high precision. Also, since electric currents are read out successively from the groups of the photosensitive portions $12_{mn}$ and $13_{mn}$ respectively by means of first and second shift registers 22 and 23 and are then subject to A/D conversion and difference determination, first and second signal processing circuits 20 and 30 can be made simple in composition and low in cost.

Also with photodetector of the present embodiment, first signal processing circuit 20 further comprises first digital memory 26, disposed between first A/D conversion circuit 25 and first difference operational circuit 27, and second signal processing circuit 30 further comprises second digital memory 36, disposed between second A/D conversion circuit 35 and second difference operational circuit 37. Computation of the differences in the digital values corresponding to the first period and the digital values corresponding to the second period can thus be performed appropriately and definitely in first and second difference operational circuits 27 and 37.

SECOND EMBODIMENT

A photodetector of a second embodiment shall now be described based on FIG. 17 to FIG. 22. The photodetector of the first embodiment and the photodetector of the second embodiment differ in the compositions of first signal processing circuit 20 and second signal processing circuit 30.

Figure 17:
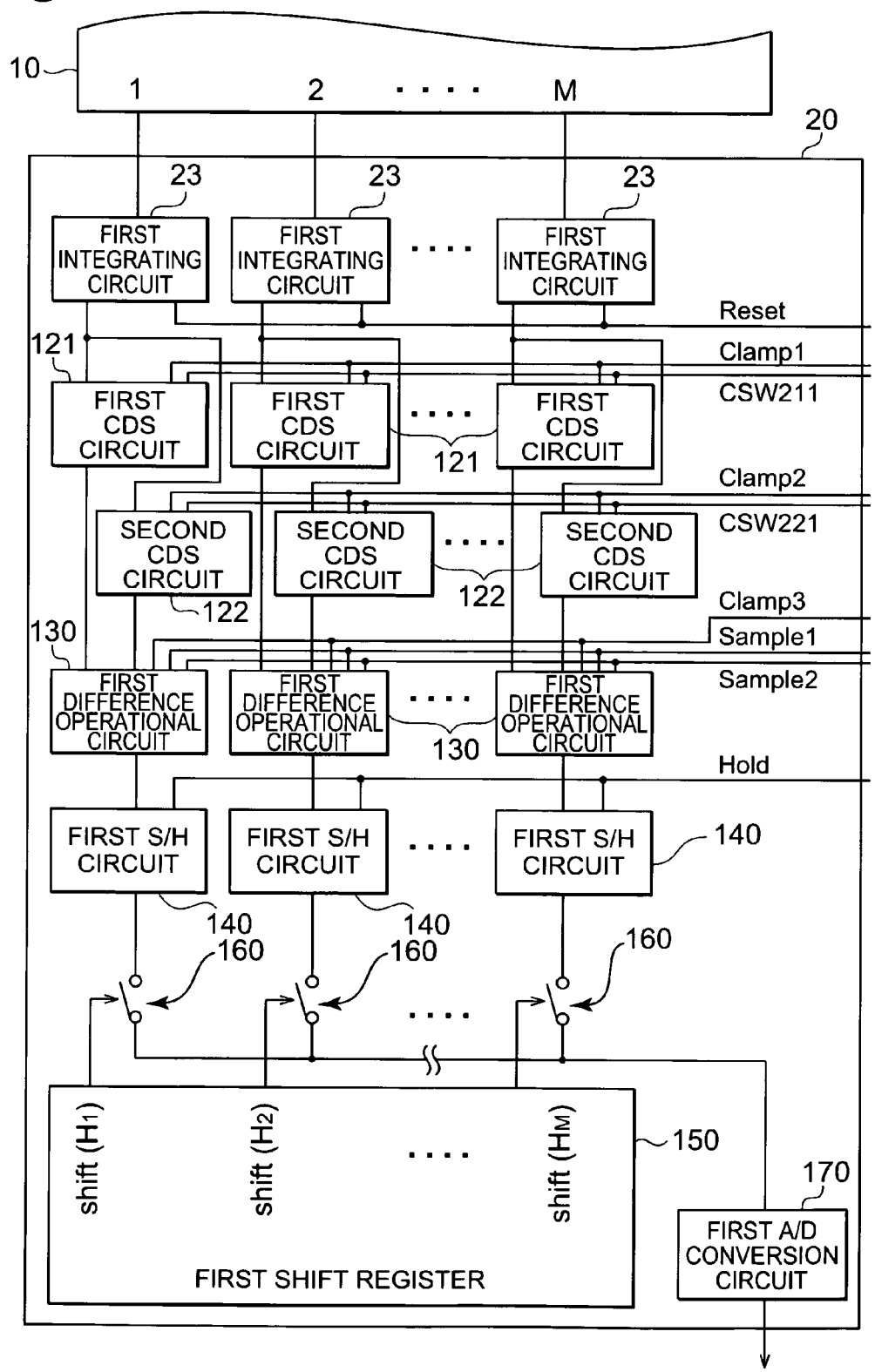
FIG. 17 is a schematic composition diagram of a first signal processing circuit included in a photodetector of a second embodiment.

As shown in FIG. 17, first signal processing circuit 20 of the photodetector of the second embodiment comprises first integrating circuits 23, first CDS circuits 121, second CDS circuits 122, first difference operational circuits 130, first sample-and-hold circuits (referred to hereinafter as "first S/H circuits") 140, a first shift register 150, first switches 160, and a first A/D conversion circuit 170. FIG. 17 is a schematic composition diagram of the first signal processing circuit.

First integrating circuits 23 are provided in correspondence to the first groups of the photosensitive portions $12_{mn}$ and each converts the electric currents from a corresponding first group of the photosensitive portions $12_{mn}$ into a voltage and outputs this voltage.

Figure 19:
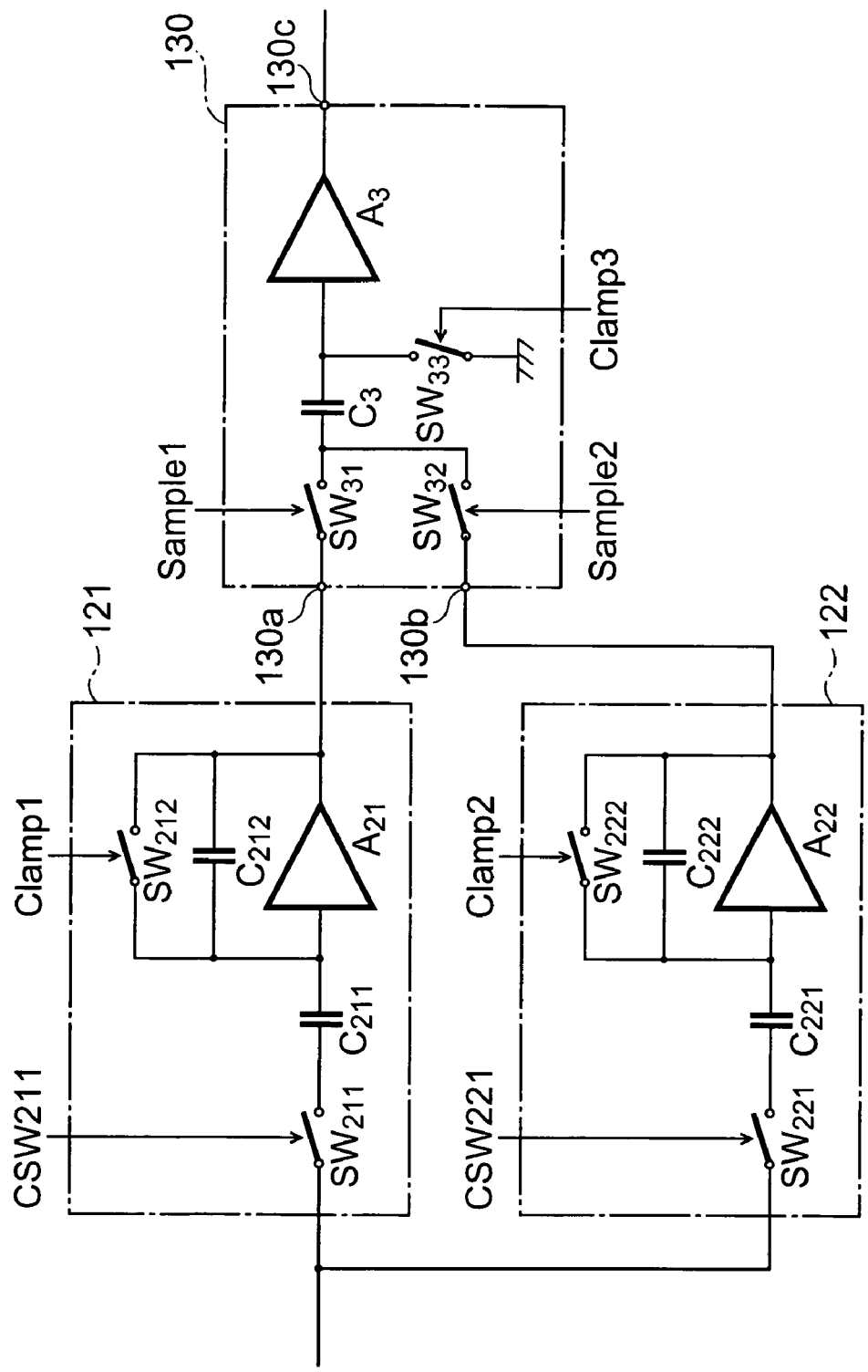
FIG. 19 is a circuit diagram of a first CDS circuit, a second CDS circuit, and a first difference operational circuit included in the first signal processing circuit.

First CDS circuits 121 are provided in correspondence to first integrating circuit 23 and each outputs a voltage that is in correspondence to the variation amount of the voltage from the corresponding first integrating circuit 23. As shown in FIG. 19, each first CDS circuit 121 has a switch $SW_{211}$, a first coupling capacitor $C_{211}$, and a first amp (amplifier) $A_{21}$, disposed in that order between an input terminal and an output terminal. Also, a switch $SW_{212}$ and a first integrating capacitor $C_{212}$ are connected in parallel to each other between the input and output of amp $A_{21}$. Switches $SW_{211}$ and $SW_{212}$ function as first switching element for accumulating charges in first integrating capacitor $C_{212}$. When switch $SW_{212}$ is closed, first CDS circuit 121 discharges and initializes first integrating capacitor $C_{212}$. When switch $SW_{212}$ is opened and switch $SW_{211}$ is closed, first charges, which are input from the input terminal and via first coupling capacitor $C_{211}$, are accumulated in first integrating capacitor $C_{212}$, and a voltage that is in accordance with the accumulated charges is output from the output terminal. Switch $SW_{211}$ opens and closes based on a CSW211 signal output from timing control circuit 50. Also, switch $SW_{212}$ opens and closes based on a Clamp 1 signal output from timing control circuit 50.

Second CDS circuits 122 are provided in correspondence to first integrating circuit 23 and each outputs a voltage that is in correspondence to the variation amount of the voltage from the corresponding first integrating circuit 23. As shown in FIG. 19, each second CDS circuit 122 has a switch $SW_{221}$, a second coupling capacitor $C_{221}$, and a second amp $A_{22}$, disposed in that order between an input terminal and an output terminal. Also, a switch $SW_{222}$ and a second integrating capacitor $C_{222}$ are connected in parallel to each other between the input and output of amp $A_{22}$. Switches $SW_{221}$ and $SW_{222}$ function as second switching element for accumulating charges in second integrating capacitor $C_{222}$. The capacitance value of second integrating capacitor $C_{222}$ of second CDS circuit 122 is equal to the capacitance value of first integrating capacitor $C_{212}$ of first CDS circuit 121. When switch $SW_{222}$ is closed, second CDS circuit 122 discharges and initializes second integrating capacitor $C_{222}$. When switch $SW_{222}$ is opened and switch $SW_{221}$ is closed, second charges, which are input from the input terminal and via second coupling capacitor $C_{221}$, are accumulated in second integrating capacitor $C_{222}$, and a voltage that is in accordance with the accumulated charges is output from the output terminal. Switch $SW_{221}$ opens and closes based on a $CSW_{221}$ signal output from timing control circuit 50. Also, switch $SW_{222}$ opens and closes based on a Clamp 2 signal output from timing control circuit 50.

First difference operational circuits 130 are provided in correspondence to first CDS circuits 121 and second CDS circuits 122 and each determines the difference between the respective amounts of charges accumulated in first integrating capacitor $C_{212}$ of the corresponding first CDS circuit 121 and second integrating capacitor $C_{222}$ of the corresponding second CDS circuit 122 and outputs a voltage corresponding to this difference. As shown in FIG. 19, each first difference operational circuit 130 has two input terminals 130a and 130b and a single output terminal 130c, first input terminal 130a is connected to the output terminal of first CDS circuit 121, and second input terminal 130b is connected to the output terminal of second CDS circuit 122. Each first difference operational circuit 130 is equipped with switches $SW_{31}$ to $SW_{33}$, a capacitor $C_3$, and an amp $A_3$. Switch $SW_{31}$, capacitor $C_3$, and amp $A_3$ are disposed in that order between first input terminal 130a and output terminal 130c and switch $SW_{32}$, capacitor $C_3$, and amp $A_3$ are disposed in that order between second input terminal 130b and output terminal 130c. Also, the connection point of capacitor $C_3$ and amp $A_3$ is grounded via switch $SW_{33}$.

By opening switch $SW_{32}$ and closing switch $SW_{31}$ for just a fixed period while closing switch $SW_{33}$, first difference operational circuit 130 inputs the voltage from first CDS circuit 121 and charges capacitor $C_3$ with just charge Q1. Also, by opening switch $SW_{31}$ and closing switch $SW_{32}$ for just a fixed period while opening switch $SW_{33}$, first difference operational circuit 130 inputs the voltage from second CDS circuit 122 and discharges capacitor $C_3$ by just charge Q2. First difference operational circuit 130 thereby accumulates the difference between charge Q1 and charge Q2, that is, charge (Q1−Q2) in capacitor $C_3$ and outputs a voltage that is in accordance with charge (Q1−Q2) in amp $A_3$. Switch $SW_{31}$ is opened and closed based on a Sample1 signal that is output from timing control circuit 50. Switch $SW_{32}$ is opened and closed based on a Sample2 signal that is output from timing control circuit 50. Switch $SW_{33}$ is opened and closed based on a Clamp 3 signal that is output from timing control circuit 50.

Figure 20:
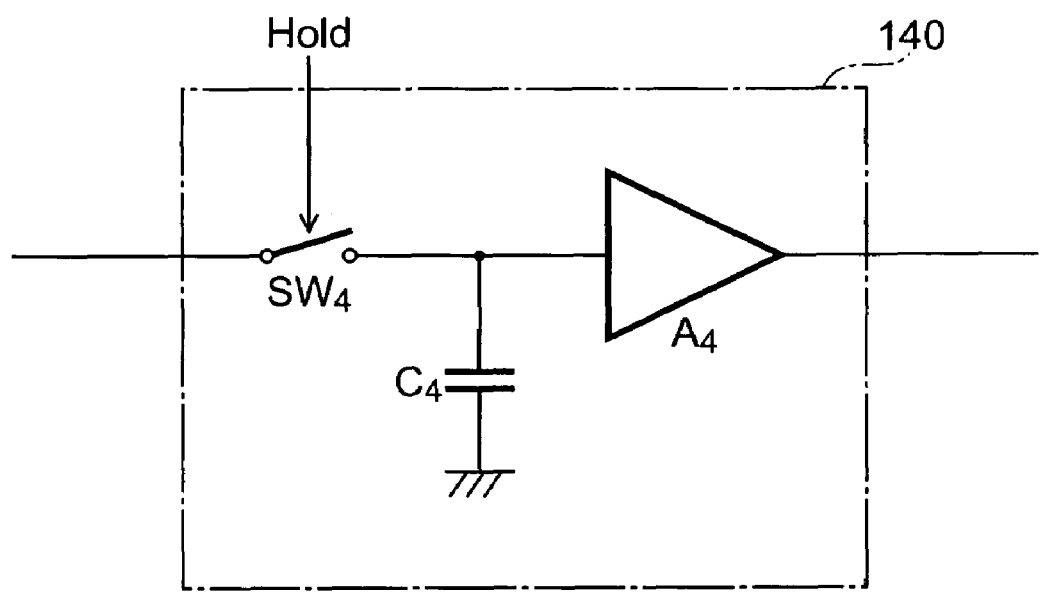
FIG. 20 is a circuit diagram of a first sample-and-hold circuit included in the first signal processing circuit.

First S/H circuits 140 are provided in correspondence to first difference operational circuits 130 and each holds and then outputs the voltage from the corresponding first difference operational circuit 130. As shown in FIG. 20, each first S/H circuit 140 has a switch $SW_4$ and an amp $A_4$ disposed in that order between an input terminal and an output terminal, and the connection point of switch $SW_4$ and amp $A_3$ is grounded via a capacitor $C_4$. When switch $SW_4$ is closed, first S/H circuit 140 stores the voltage from first difference operational circuit 130 in capacitor $C_4$, and even after switch $SW_4$ is opened, holds the voltage of capacitor $C_4$ and outputs this voltage via amp $A_4$. Switch $SW_4$ opens and closes based on a Hold signal output from timing control circuit 50. First switches 160 are opened successively by being controlled by first shift register 150 and successively inputs the voltages from first S/H circuits 140 into first A/D conversion circuit 170.

First A/D conversion circuit 170 successively inputs the voltages (analog values) from the respective first S/H circuits 140, converts these voltages into digital values, and outputs the digital values. The digital values output from first A/D conversion circuit 170 are outputs that express the luminance profile (digital data) in the second direction.

Figure 18:
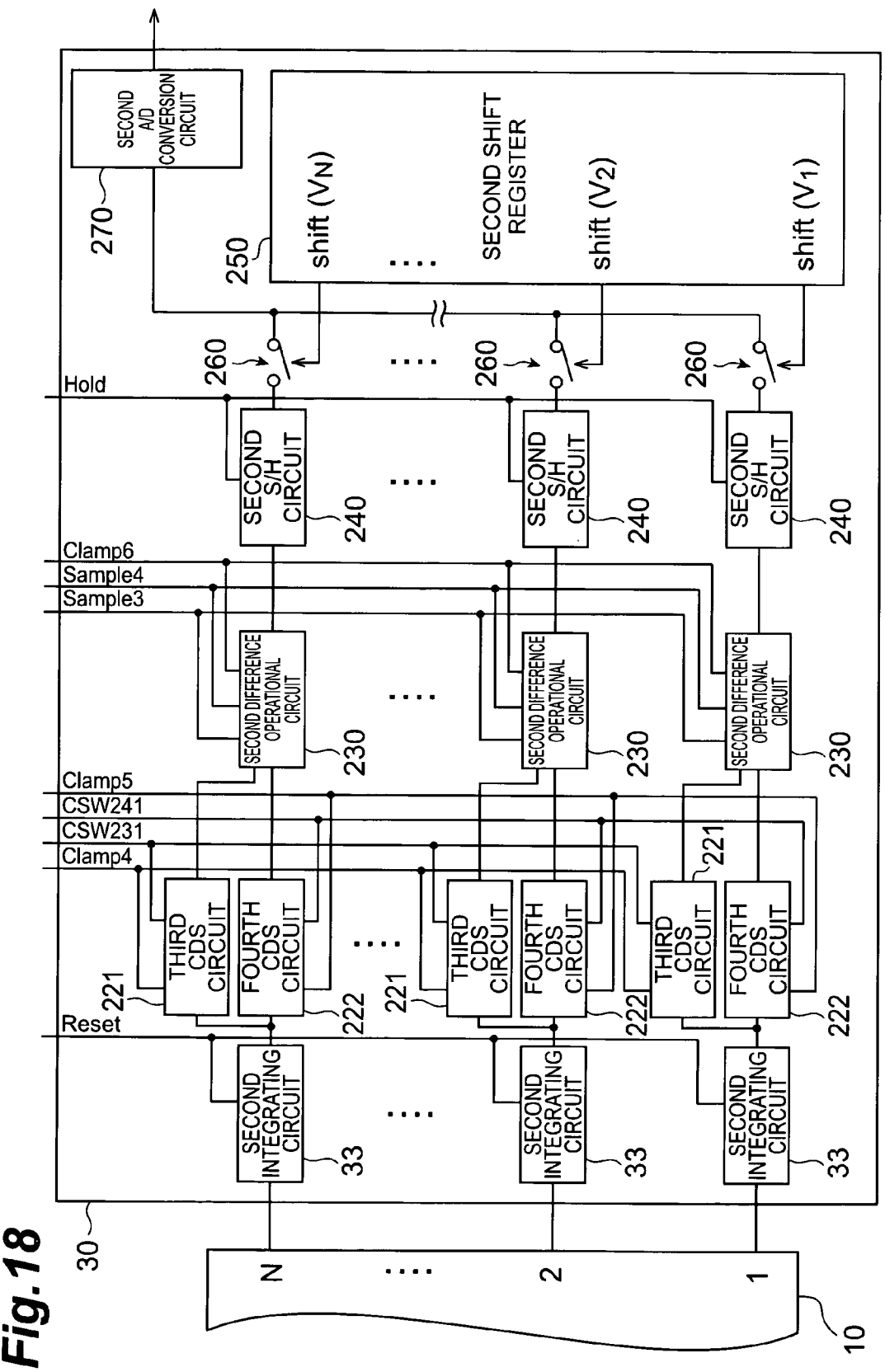
FIG. 18 is a schematic composition diagram of a second signal processing circuit included in the photodetector of the second embodiment.

As shown in FIG. 18, second signal processing circuit 30 of the photodetector of the second embodiment comprises second integrating circuits 33, third CDS circuits 221, fourth CDS circuits 222, second difference operational circuits 230, second sample-and-hold circuits (referred to hereinafter as "second S/H circuits") 240, a second shift register 250, second switches 260, and a second A/D conversion circuit 270. FIG. 18 is a schematic composition diagram of the second signal processing circuit.

Second integrating circuits 33 are provided in correspondence to the second groups of the photosensitive portions $13_{mn}$ and each converts the electric currents from a corresponding second group of the photosensitive portions $13_{mn}$ into a voltage and outputs this voltage.

Third CDS circuits 221 are provided in correspondence to second integrating circuit 33 and each outputs a voltage that is in correspondence to the variation amount of the voltage from the corresponding second integrating circuit 33. Each third CDS circuit 221 has an composition equivalent to that of first CDS circuit 121 shown in FIG. 19 and has a switch, a third coupling capacitor, and a third amp, disposed in that order between an input terminal and an output terminal. Also, a switch and a third integrating capacitor are connected in parallel to each other between the input and output of the third amp. The respective switches function as third switching element for accumulating charges in the third integrating capacitor.

Fourth CDS circuits 222 are provided in correspondence to second integrating circuits 33 and each outputs a voltage that is in correspondence to the variation amount of the voltage from the corresponding second integrating circuit 33. Each fourth CDS circuit 222 has an composition equivalent to that of second CDS circuit 122 shown in FIG. 19 and has a switch, a fourth coupling capacitor, and a fourth amp, disposed in that order between an input terminal and an output terminal. Also, a switch and a fourth integrating capacitor are connected in parallel to each other between the input and output of the fourth amp. The respective switches function as fourth switching element for accumulating charges in the fourth integrating capacitor.

Second difference operational circuits 230 are provided in correspondence to third CDS circuits 221 and fourth CDS circuits 222 and each determines the difference between the respective amounts of charges accumulated in the third integrating capacitor of the corresponding third CDS circuit 221 and the fourth integrating capacitor of the corresponding fourth CDS circuit 222 and outputs a voltage corresponding to this difference. Each second difference operational circuit 230 has a composition equivalent to that of first difference operational circuit 130, shown in FIG. 19, and is equipped with switches, a capacitor, and an amp.

Second S/H circuits 240 are provided in correspondence to second difference operational circuits 230 and each holds and then outputs the voltage from the corresponding second difference operational circuit 230. Each second S/H circuit 240 has a composition equivalent to that of first S/H circuit 140 shown in FIG. 20, has a switch and an amp disposed in that order between an input terminal and an output terminal, and the connection point of the switch and the amp is grounded via a capacitor. Second switches 260 are closed successively by being controlled by second shift register 250 and successively inputs the voltages from second S/H circuits 240 into second A/D conversion circuit 270.

Second A/D conversion circuit 270 successively inputs the voltages (analog values) from the respective second S/H circuits 240, converts these voltages into digital values, and outputs the digital values. The digital values output from second A/D conversion circuit 270 are outputs that express the luminance profile (digital data) in the first direction.

Figure 21:
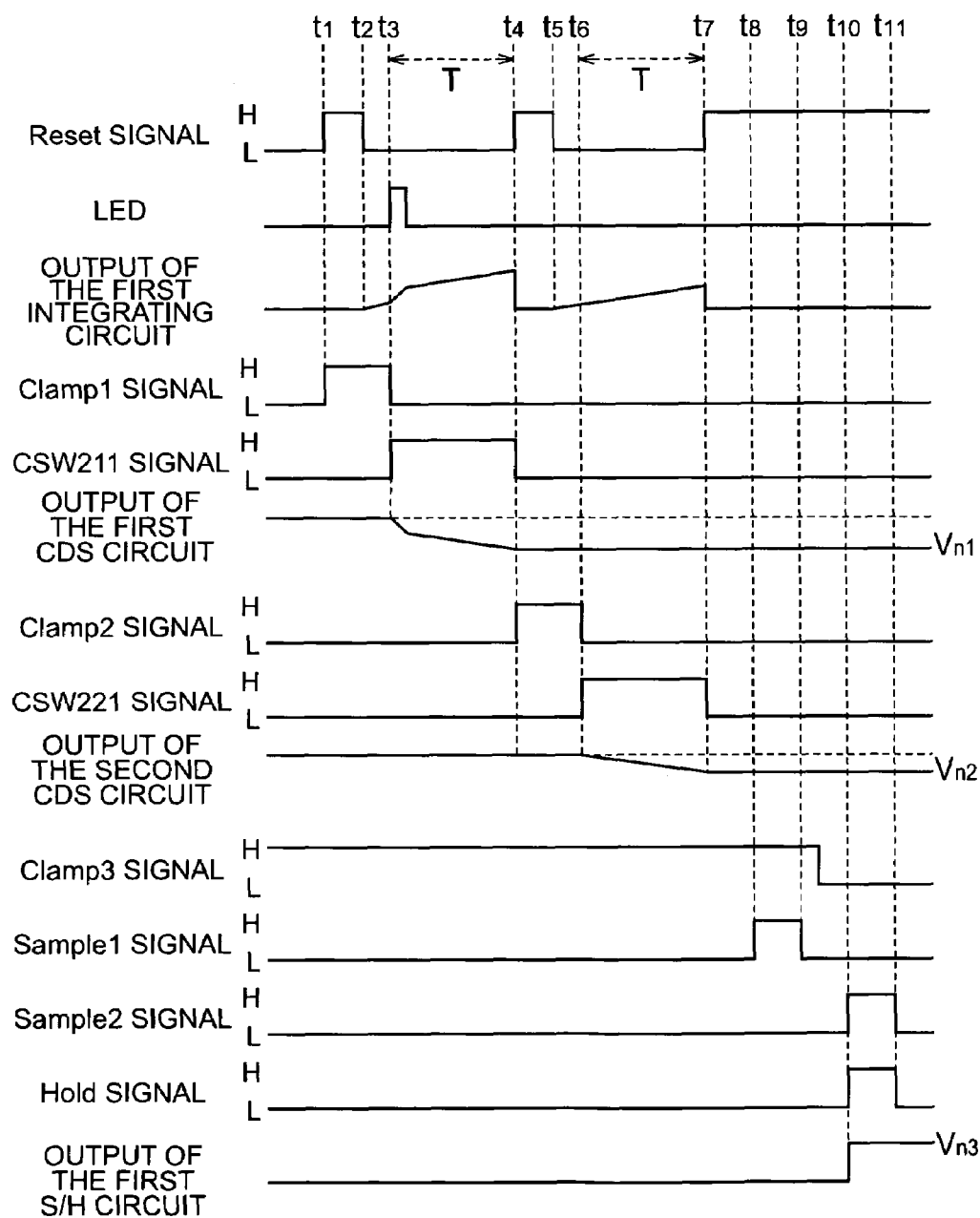
FIG. 21 is a timing chart for describing the operations of the first signal processing circuit.

The operations of first signal processing circuit 20 and second signal processing circuit 30 in the photodetector of the second embodiment shall now be described based on FIG. 21. FIG. 21 is a timing chart for describing the operations of the first signal processing circuit. By the operations described below, background light components are eliminated and the photodetected signals, concerning just the spot light components (signal light components) projected onto an object from light emitting element 5, are output.

By the Reset signal becoming "High" at time $t_1$, switches $SW_1$ of first integrating circuits 23 close and capacitors $C_1$ are discharged and initialized. Also, by the Clamp 1 signal becoming "High," switches $SW_{212}$ of first CDS circuits 121 close and the CDS operations of first CDS circuits 121 stop.

By the Reset signal becoming "Low" at time $t_2$, switches $SW_1$ of first integrating circuits 23 open. Then from time $t_2$ onwards, the charges output from the corresponding first groups of the photosensitive portions 12$_{mn}$ become accumulated in capacitors $C_1$ and the voltages from the output terminals of first integrating circuits 23 increase gradually. At this time $t_2$, the logic of the Clamp 1 signal remains at "High" and switches $SW_{212}$ of first CDS circuits 121 remain closed. Also at time $t_2$, the CSW211 signal is "Low" and switches $SW_{211}$ of first CDS circuits 121 are opened.

By the Clamp 1 signal becoming "Low" at time $t_3$, switches $SW_{212}$ of first CDS circuits 121 open, and by the CSW211 signal becoming "High", switches $SW_{211}$ of first CDS circuits 121 close. Then at time $t_4$, after the elapse of a fixed time T from time $t_3$, the CSW211 signal becomes "Low" and switches $SW_{211}$ of first CDS circuits 121 open.

In the period from time $t_2$ to $t_4$, light emitting element 5 is made to emit light by control signal LED output from timing control circuit 50 and a spot light is illuminated onto the object from light emitting element 5. Thus both the spot light components, which are projected from light emitting element 5 and are reflected by the object, and the background light components become incident on photosensitive region 10 and currents that are thereby generated are output from photosensitive regions 10 (the first groups of the photosensitive portions 12$_{mn}$). At first integrating circuits 23, which input the electric currents, charges are accumulated in capacitors $C_1$ and voltages, corresponding to the amounts of the accumulated charges, are output from first integrating circuits 23. Also, in the period from time $t_3$ to $t_4$ (first period), the voltages from the output terminals of first integrating circuits 23 are input into first CDS circuits 121, the charges corresponding to the variation amounts of the input voltages from time $t_3$ onwards are accumulated in first integrating capacitors $C_{212}$, and voltages that are in accordance with the amounts of the accumulated charges are output from first CDS circuits 121. The voltages from first CDS circuits 121 from time $t_4$ onwards are thus voltage values $V_{n1}$ that correspond to the differences in the voltages from first integrating circuits 23 between time $t_3$ and time $t_4$, respectively, and are thus eliminated of the noise components that arise in first integrating circuits 23.

By the Reset signal becoming "High" at time $t_4$, switches $SW_1$ of first integrating circuits 23 close and capacitors $C_1$ are discharged and initialized. Also, by the Clamp 2 signal becoming "High," switches $SW_{222}$ of second CDS circuits 122 close and the CDS operations of second CDS circuits 122 stop.

By the Reset signal becoming "Low" at time $t_5$, switches $SW_1$ of first integrating circuits 23 open. Then from time $t_5$ onwards, the charges output from the corresponding first groups of the photosensitive portions 12$_{mn}$ become accumulated in capacitors $C_1$ and the voltages from the output terminals of first integrating circuits 23 increase gradually. At this time $t_5$, the logic of the Clamp 2 signal remains "High" and switches $SW_{222}$ of second CDS circuits 122 remain closed. Also at time $t_5$, the CSW221 signal is "Low" and switches $SW_{221}$ of second CDS circuits 122 are opened.

By the Clamp 2 signal becoming "Low" at time $t_6$, switches $SW_{222}$ of second CDS circuits 122 open, and by the CSW221 signal becoming high, switches $SW_{221}$ of second CDS circuits 122 close. Then at time $t_7$, after the elapse of a fixed time T from time $t_6$, the CSW221 signal becomes "Low" and switches $SW_{221}$ of second CDS circuits 122 open.

In the period from time $t_5$ to $t_7$, spot light is not illuminated onto the object from light emitting element 5. Thus only the background light components become incident on photosensitive region 10 and currents that are thereby generated are output from photosensitive regions 10 (the first groups of the photosensitive portions 12$_{mn}$). At first integrating circuits 23, which input the electric currents, charges are accumulated in capacitors $C_1$ and voltages, corresponding to the amounts of the accumulated charges, are output from first integrating circuits 23. Also, in the period from time $t_6$ to $t_7$ (second period), the voltages from the output terminals of first integrating circuits 23 are input into second CDS circuits 122, the charges corresponding to the variation amounts of the input voltages from time $t_6$ onwards are accumulated in second integrating capacitors $C_{222}$, and voltages that are in accordance with the amounts of the accumulated charges are output from second CDS circuits 122. The voltages from second CDS circuits 122 from time $t_7$ onwards are thus voltage values $V_{n2}$ that correspond to the differences in the voltages from first integrating circuits 23 between time $t_6$ and time $t_7$, respectively, and are thus eliminated of the noise components that arise in first integrating circuits 23.

From time $t_7$ onwards, the charges accumulated in first integrating capacitors $C_{212}$ of first CDS circuits 121 correspond to the sum of the spot light components and the background light components, and the charges accumulated in second integrating capacitors $C_{222}$ of second CDS circuits 122 correspond to just the background light components. Also, the period from time $t_3$ to $t_4$ (first period) and the period from time $t_6$ to $t_7$ (second period) are of mutually equal duration T and since first integrating capacitors $C_{212}$ of first CDS circuits 121 and second integrating capacitors $C_{222}$ of second CDS circuits 122 are mutually equal in capacitance, voltage values $V_{n1}$ correspond to the sum of the spot light components and the background light components and voltage values $V_{n2}$ correspond to just the background light components. Voltage differences $\Delta V_n = (V_{n1} - V_{n2})$ thus correspond to just the spot light components. Thus from time $t_8$ onwards, these voltage differences $\Delta V_n$ are determined first difference operational circuits 130 as follows.

From time $t_7$ onwards (third period), the Reset signal is "High" and switches $SW_1$ of first integrating circuits 23 are thus closed and capacitors $C_1$ are discharged and maintained in the initialized states. The Clamp 1 signal is "Low" and switches $SW_{212}$ of first CDS circuits 121 remain open. Also, the Clamp 2 signal is "Low" and switches $SW_{222}$ of second CDS circuits 122 remain open.

In the period from time $t_8$ to $t_9$ within the third period from time $t_7$ onwards, the Sample1 signal is "High" and switches $SW_{31}$ of first difference operational circuits 130 are thus closed. At this time, the Sample2 signal is "Low" so that switches $SW_{32}$ of first difference operational circuits 130 are opened, and the Clamp 3 signal is "High" so that switches $SW_{33}$ of first difference operational circuits 130 are closed. In this period, voltage values $V_{n1}$, output from the output terminals of first CDS circuit 121 are input into capacitors $C_3$ via switches $SW_{31}$ of first difference operational circuits 130 and voltage values $V_{n1}$ are held by capacitors $C_3$.

In the period from time $t_{10}$ to $t_{11}$ within the third period from time $t_7$ onwards, the Sample2 signal is "High" and switches $SW_{32}$ of first difference operational circuits 130 are thus closed. At this time, the Sample1 signal is "Low" so that switches $SW_{31}$ of first difference operational circuits 130 are opened, and the Clamp 3 signal is "Low" so that switches $SW_{33}$ of first difference operational circuits 130 are opened. In this period, voltage values $V_{n2}$, output from the output terminals of second CDS circuit 122 are input into capacitors $C_3$ via switches $SW_{32}$ of first difference operational circuits 130. At this time, since switches $SW_{33}$ of first difference operational circuits 130 are opened, differences $\Delta V_n$ between voltage values $V_{n1}$ and voltage values $V_{n2}$ are held in capacitors $C_3$ of first difference operational circuits 130. These voltage values $\Delta V_n$ correspond to just the spot light components.

Then when the Hold signal becomes "High" at time $t_{10}$ and switches $SW_4$ of first S/H circuits 140 close, voltage values $\Delta V_n$, which are held in capacitors $C_3$ of first difference operational circuits 130 become held by capacitors $C_4$ of first S/H circuits 140 via amps $A_3$ of first difference operational circuits 130 and switches $SW_4$ of first S/H circuits 140. Even after the Hold signal becomes Low at time $t_{11}$ and switches $SW_4$ open, voltage values $\Delta V_n$ are held in capacitors $C_4$ of first S/H circuits 140 and are output as voltages $V_{n3}$ from amps $A_4$. Voltages $V_{n3}$ from the respective first S/H circuits 140 are successively input into first A/D conversion circuit 170, converted into digital values, and output from first A/D conversion circuit 170 as described above.

Second integrating circuits 33, third CDS circuits 221, fourth CDS circuits 222, second difference operational circuits 230, and second S/H circuits 240, included in second signal processing circuit 30 perform operations equivalent to those (see FIG. 21) of first integrating circuits 23, first CDS circuits 121, second CDS circuits 122, first difference operational circuits 130, and first S/H circuits 140, included in first signal processing circuit 20, and voltages having voltage values corresponding to just the spot light component are thus output from second S/H circuits 240. The voltages from the respective second S/H circuits 240 are successively input into second A/D conversion circuit 270, converted into digital values, and output from second A/D conversion circuit 170 as described above.

Thus even with the photodetector of the second embodiment, even when background light is made incident on photosensitive region 10, the luminance profiles in the first and second directions can be detected in states in which the background light components are eliminated. As a result, the two-dimensional position of the light made incident on photosensitive region 10 can be detected at extremely high precision.

Also with the photodetector of the second embodiment, first signal processing circuit 20 includes first integrating circuits 23, first CDS circuits 121, second CDS circuits 122, and first difference operational circuits 130, and second signal processing circuit 30 includes second integrating circuits 33, third CDS circuits 221, fourth CDS circuits 222, and second difference operational circuits 230. Since a first difference operational circuit 130 is thus provided for each first group of the photosensitive portions $12_{mn}$ and a second difference operational circuit 230 is provided for each second group of the photosensitive portions $13_{mn}$, the luminance profiles in the first and second directions can be obtained at high speed. Also, even if the respective first integrating circuits 23 and second integrating circuit 33 have noise fluctuations that differ according to integrating operation, the noise errors are resolved by first to fourth CDS circuits 121, 122, 221, and 222, respectively. Also, since charges, corresponding to the spot light components (signal light components) from light source 3 and the background light components, are accumulated in first and third integrating capacitors $C_{212}$ of first and third CDS circuits 121 and 221 in the first period, charges, corresponding to the background light components, are accumulated in second and fourth integrating capacitors $C_{222}$ of second and fourth CDS circuits 122 and 222 in the second period, and the differences between these charges are determined by first and second difference operational circuits 130 and 230, the voltages from first and second difference operational circuits 130 and 230 correspond to just the spot light components from light source 3. Thus even when the intensity of the light made incident on photosensitive region 10 is low, that is, even if the above-mentioned voltages are small, the S/N ratio of luminance profile detection will be excellent.

Also, with the photodetector of the second embodiment, first signal processing circuit 20 further comprises first S/H circuits 140 and first A/D conversion circuit 170, and second signal processing circuit 30 further comprises second S/H circuits 240 and second A/D conversion circuits 270. The luminance profiles in the first and second directions can thereby be output as digital values.

THIRD EMBODIMENT

A photodetector of a third embodiment shall now be described based on FIG. 22 to FIG. 27. The photodetector of the first embodiment and the photodetector of the third embodiment differ in the compositions of first signal processing circuit 20 and second signal processing circuit 30.

Figure 22:
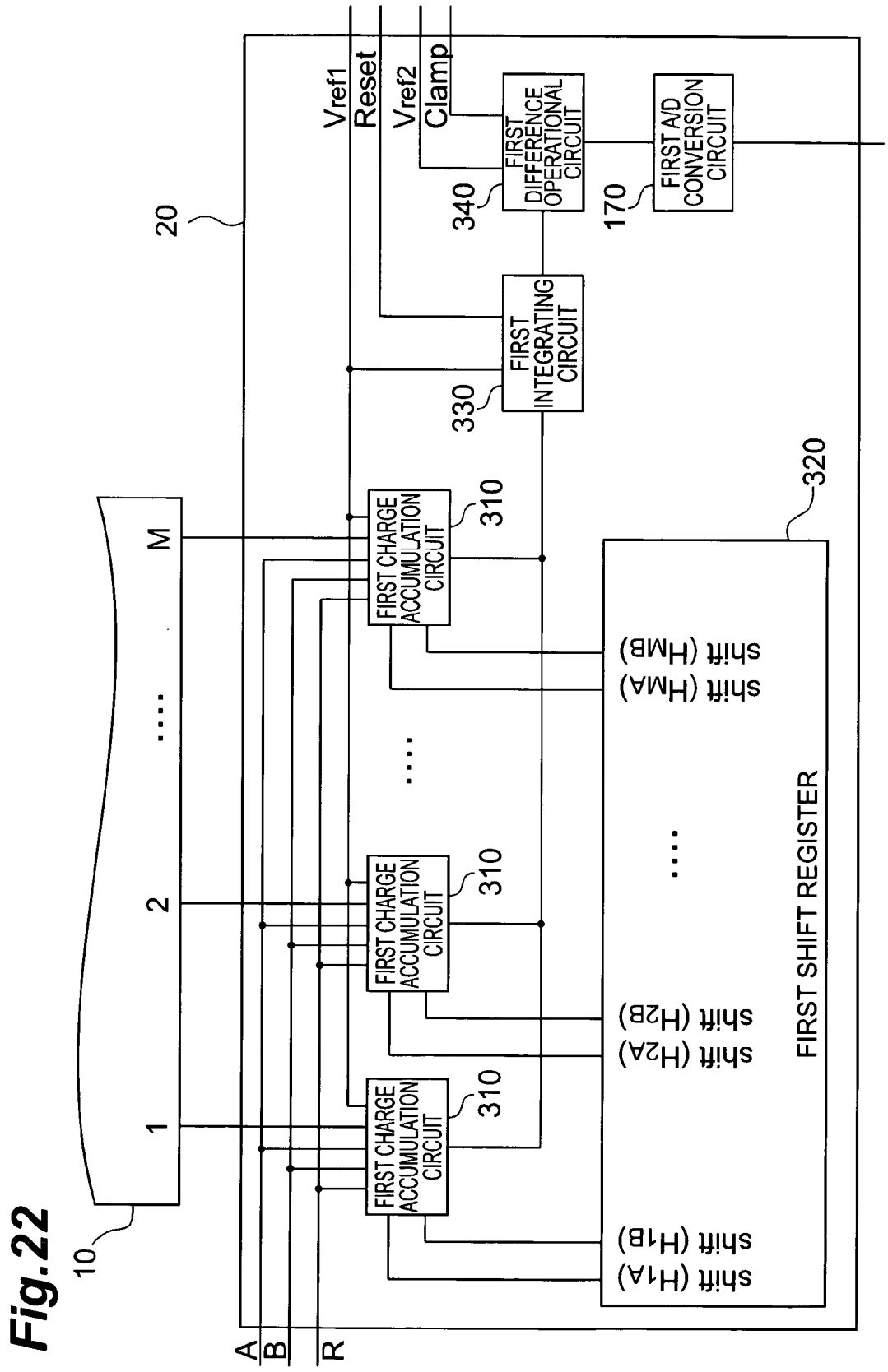
FIG. 22 is a schematic composition diagram of a first signal processing circuit included in a photodetector of a third embodiment.

As shown in FIG. 22, first signal processing circuit 20 of the photodetector of the third embodiment comprises first charge accumulation circuits 310, a first shift register 320, a first integrating circuit 330, a first difference operational circuit 340, and a first A/D conversion circuit 170. FIG. 22 is a general composition diagram of the first signal processing circuit.

Figure 24:
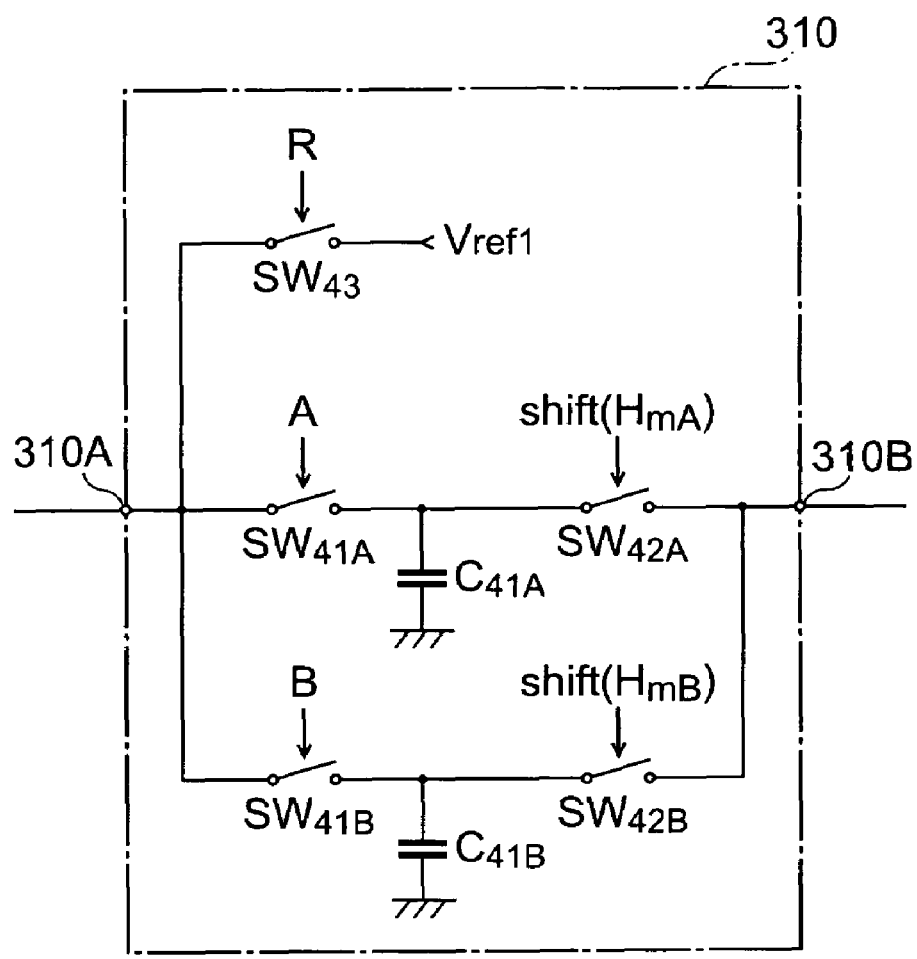
FIG. 24 is a circuit diagram of a first charge accumulation circuit included in the first signal processing circuit.

First charge accumulation circuits 310 are provided in correspondence to the first groups of the photosensitive portions $12_{mn}$ and each has a first capacitor $C_{41A}$ and a second capacitor $C_{41B}$, disposed in parallel between an output terminal 310B and an input terminal 310A, inputting electric currents from the corresponding first group of the photosensitive portions $12_{mn}$, and accumulates charges, which are in accordance with electric currents corresponding to the charges accumulated in the corresponding first group of the photosensitive portions $12_{mn}$ over the above-mentioned first period, in first capacitor $C_{41A}$, and accumulates charges, which are in accordance with electric currents corresponding to the charges accumulated in the corresponding first group of the photosensitive portions $12_{mn}$ over the above-mentioned second period, in second capacitor $C_{41B}$. As shown in FIG. 24, each first charge accumulation circuit 310 has switches $SW_{41A}$, $SW_{42A}$, $SW_{41B}$, and $SW_{42B}$. The pair of switch $SW_{41A}$ and switch $SW_{42A}$, which are connected to each other in cascade, and the pair of switch $SW_{41B}$ and switch $SW_{42B}$, which are connected to each other in cascade, are connected in parallel between input terminal 310A and output terminal 310B. The connection point of switch $SW_{41A}$ and switch $SW_{42A}$, is grounded via first capacitor $C_{41A}$. The connection point of switch $SW_{41B}$ and switch $SW_{42B}$ is grounded via second capacitor $C_{41B}$. Also, the connection point of input terminal 310A and switches $SW_{41A}$ and $SW_{41B}$ is connected to a first reference potential $V_{ref1}$ via a switch $SW_{43}$.

In the state in which switch $SW_{43}$ is opened, each first charge accumulation circuit 310 accumulates charges in first capacitor $C_{41A}$ while switch $SW_{41A}$ is closed and switches $SW_{42A}$, $SW_{41B}$, and $SW_{42B}$ are opened and accumulates charges in second capacitor $C_{41B}$ while switch $SW_{41B}$ is closed and switches $SW_{41A}$, $SW_{42A}$, and $SW_{42B}$ are opened. Switches $SW_{41A}$, $SW_{41B}$, and $SW_{43}$ are opened and closed based on control signals A, B, and R output from timing control circuit 50. Switches $SW_{42A}$ and $SW_{42B}$ are controlled and successively closed by signals shift($H_{mA}$) and shift ($H_{mB}$), which are output from first shift register 320. By closing switch $SW_{42A}$, the charges accumulated in first capacitor $C_{41A}$ become a current that is output to first integrating circuit 330. Also, by closing switch $SW_{42B}$, the charges accumulated in second capacitor $C_{41B}$ become a current that is output to first integrating circuit 330. First shift register 320 is controlled in its operation by a signal output from timing control circuit 50 and successively closes switches $SW_{42A}$ and $SW_{42B}$.

Figure 25:
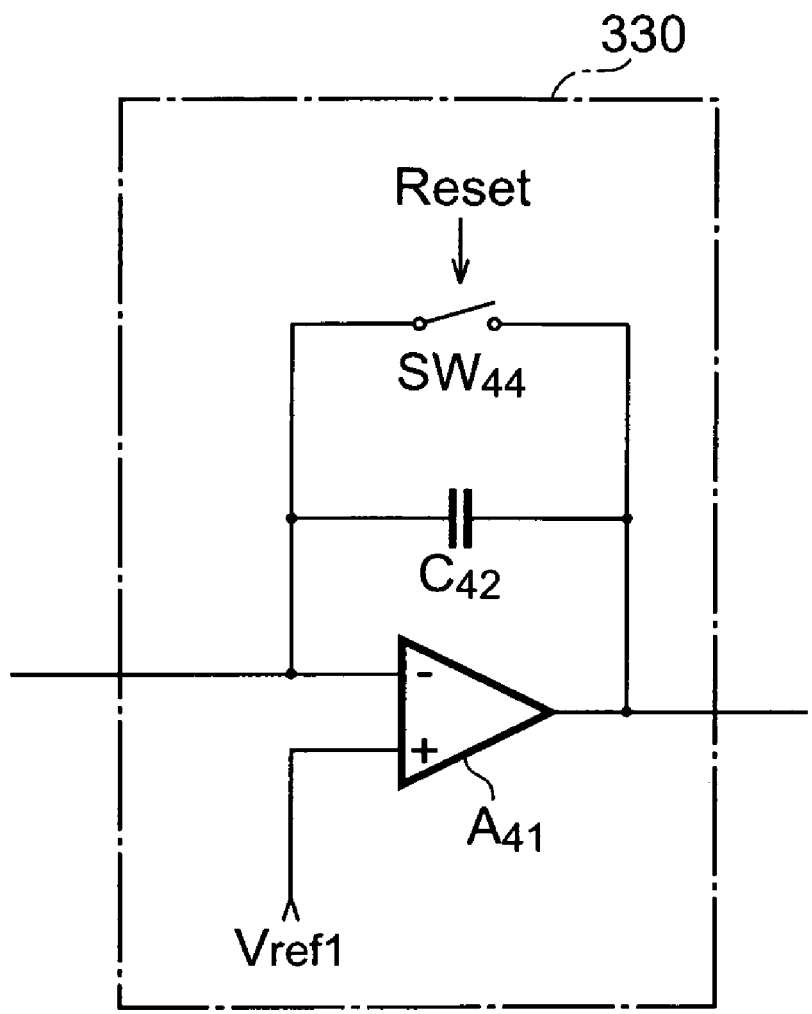
FIG. 25 is a circuit diagram of a first integrating circuit included in the first signal processing circuit.

First integrating circuit 330 successively inputs, from first capacitors $C_{41A}$ and second capacitors $C_{41B}$, electric currents corresponding to the charges accumulated in first capacitors $C_{41A}$ and second capacitors $C_{41B}$, converts these electric currents into a voltage, and outputs the voltage to first difference operational circuit 340. As shown in FIG. 25, first integrating circuit 330 has an amp $A_{41}$, an integrating capacitors $C_{42}$, and a switch $SW_{44}$ connected in parallel to each other between an input terminal and an output terminal. Amp $A_{41}$ has its inverted input terminal connected to output terminals 310B of first charge accumulation circuits 310, has its non-inverted input terminal set at first reference potential $V_{ref1}$, and has its output terminal connected to first difference operational circuit 340. Integrating capacitors $C_{42}$ and switch $SW_{44}$ are disposed between the inverted input terminal and the output terminal of amp $A_{41}$. When switch $SW_{44}$ is closed, first integrating circuit 330 discharges and initializes integrating capacitors $C_{42}$. Meanwhile, when switch $SW_{44}$ is opened, first integrating circuit 330 accumulates the charges, input into the input terminal, in integrating capacitor $C_{42}$ and outputs a voltage of a value that is in accordance with the amount of accumulated charge from the output terminal.

Figure 26:
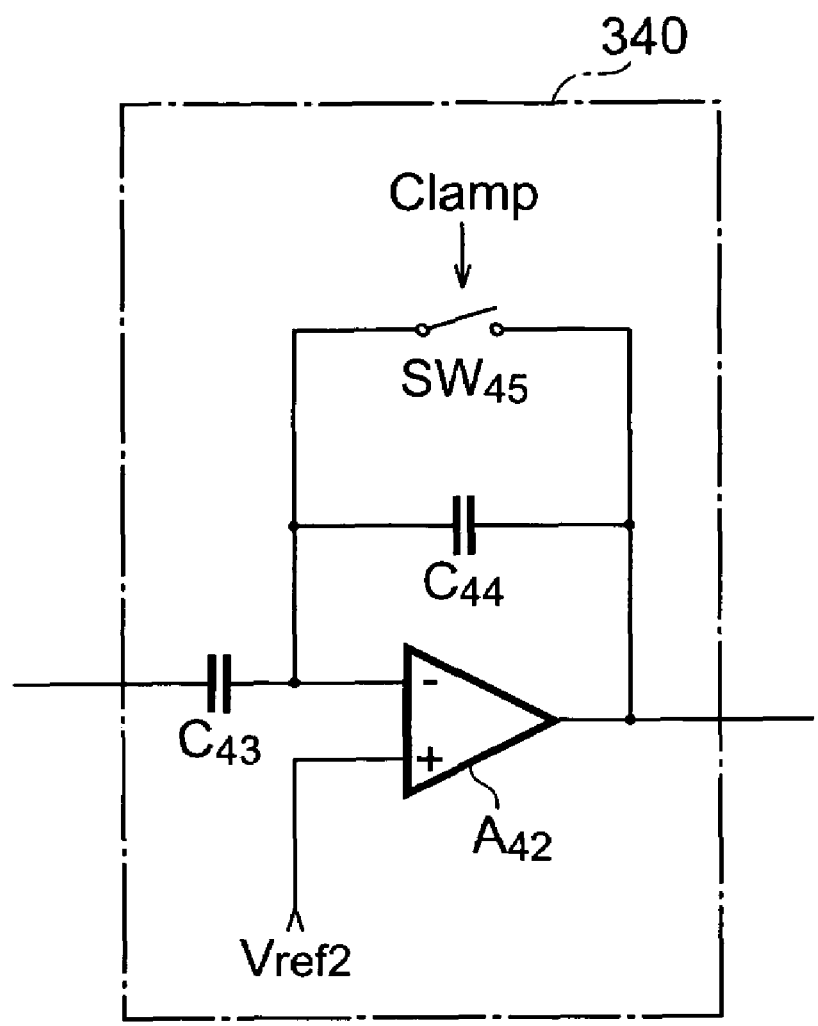
FIG. 26 is a circuit diagram of a first difference operational circuit included in the first signal processing circuit.

First difference operational circuit 340 determines the differences of the amounts of the charges accumulated respectively in first capacitors $C_{41A}$ and second capacitors $C_{41B}$ of first charge accumulation circuits 310 and outputs a voltage that is in accordance with the differences. As shown in FIG. 26, first difference operational circuit 340 has a capacitor $C_{43}$ and an amp $A_{42}$ disposed in that order between an input terminal and an output terminal and has a switch $SW_{45}$ and a capacitor $C_{44}$ connected in parallel to each other between the input and output of amp $A_{42}$. Amp $A_{42}$ has its inverted input terminal connected to the output terminal of first integrating circuit 330 and has its non-inverted input terminal set at a second reference potential $V_{ref2}$. The output terminal of first difference operational circuit 340 is connected to an input terminal of first A/D conversion circuit 170. First difference operational circuit 340 charges capacitor $C_{43}$ with just charge Q1 from first integrating circuit 330 when switch $SW_{45}$ is closed, and discharges capacitor $C_{44}$ by just charge Q2 that flows in via capacitor $C_{43}$ from first integrating circuit 330 when switch $SW_{45}$ is opened. The difference between charge Q1 and charge Q2, that is, charge (Q1−Q2) is thus accumulated in capacitor $C_{44}$ and a voltage that is in accordance with the accumulated charge (Q1−Q2) is output from amp $A_{42}$. Switch $SW_{45}$ is opened and closed based on a Clamp signal output from timing control circuit 50.

First A/D conversion circuit 170 successively inputs the voltages (analog values) from first difference operational circuit 340, converts these voltages into digital values, and outputs these digital values. The digital values output from first A/D conversion circuit 170 are outputs that express the luminance profile (digital data) in the second direction.

Figure 23:
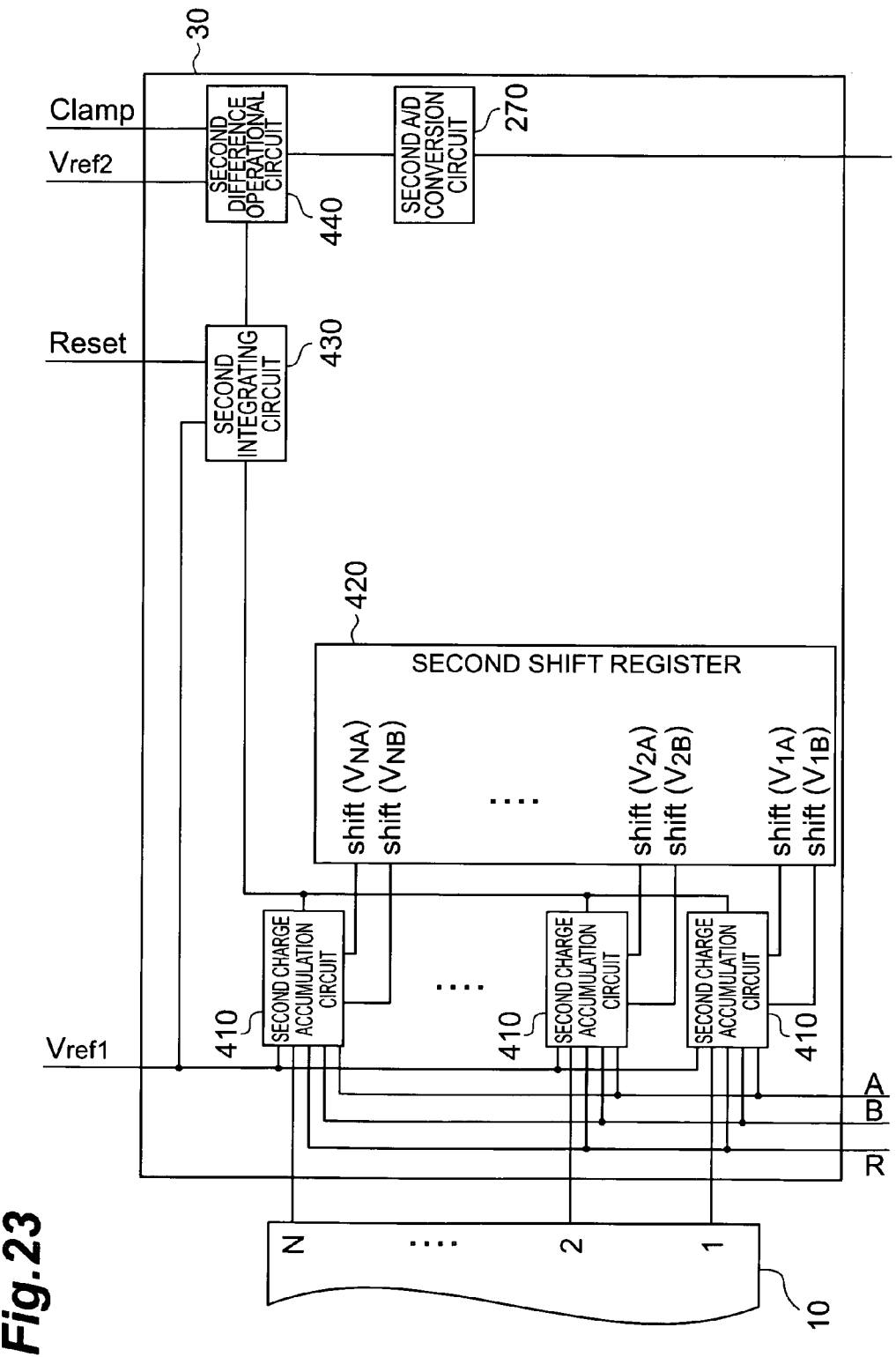
FIG. 23 is a schematic composition diagram of a second signal processing circuit included in the photodetector of the third embodiment.

As shown in FIG. 23, second signal processing circuit 30 of the photodetector of the third embodiment comprises second charge accumulation circuits 410, a second shift register 420, a second integrating circuit 430, a second difference operational circuit 440, and a second A/D conversion circuit 270. FIG. 23 is a general composition diagram of the second signal processing circuit.

Second charge accumulation circuits 410 are provided in correspondence to the second groups of the photosensitive portions $13_{mn}$ and each has a third capacitor and a fourth capacitor, disposed in parallel between an output terminal and an input terminal that inputs electric currents from the corresponding second group of the photosensitive portions $13_{mn}$, and accumulates charges, which are in accordance with electric currents corresponding to the charges accumulated in the corresponding second group of the photosensitive portions $13_{mn}$ over the above-mentioned first period, in the third capacitor, and accumulates charges, which are in accordance with electric currents corresponding to the charges accumulated in the corresponding group of photosensitive portions $13_{mn}$ over the above-mentioned second period, in the fourth capacitor. Each second charge accumulation circuit 410 has a composition equivalent to that of first charge accumulation circuit 310 shown in FIG. 24 and comprises the above-mentioned third capacitor, fourth capacitor, and five switches. As with switches $SW_{41A}$ and $SW_{41B}$, the two switches, disposed between the input terminal and the third and fourth capacitors, open and close based on control signals A and B output from timing control circuit 50. As with switch $SW_{43}$, the switch, disposed between the input terminal and the first reference potential $V_{ref1}$, open and close based on control signal R output from timing control circuit 50. As with switch $SW_{42A}$ and $SW_{42B}$, the two switches, disposed between the output terminal and the third and fourth capacitors, are controlled and successively closed by signals shift($V_{nA}$) and shift($V_{nB}$), which are output from second shift register 420. As with first shift register 320, second shift register 420 is controlled in its operation by a signal output from timing control circuit 50 and successively closes the respective switches mentioned above.

Second integrating circuit 430 successively inputs, from the third capacitors and the fourth capacitors, electric currents corresponding to the charges accumulated in the third capacitors and the fourth capacitors, converts these electric currents into a voltage, and outputs the voltage to second difference operational circuit 440. Second integrating circuit 430 has a composition equivalent to that of first integrating circuit 330 shown in FIG. 25 and has an amp, an integrating capacitor, and a switch connected in parallel to each other between an input terminal and an output terminal. When the switch is closed, second integrating circuit 430 discharges and initializes the integrating capacitor. Meanwhile, when the switch is opened, second integrating circuit 430 accumulates the charges, input into the input terminal, in the integrating capacitor and outputs, from the output terminal, a voltage of a value that is in accordance with the amount of accumulated charge.

Second difference operational circuit 440 determines the differences of the amounts of the charges accumulated respectively in the third capacitors and fourth capacitors of second charge accumulation circuits 410 and outputs a voltage that is in accordance with the differences. Second difference operational circuit 440 has a composition equivalent to that of first difference operational circuit 340 shown in FIG. 26 and has a capacitor and an amp disposed in that order between an input terminal and an output terminal and has a switch and a capacitor connected in parallel to each other between the input and output of the amp. Second difference operational circuit 440 charges the capacitor, which is cascade-connected with the amp, with just charge Q3 from second integrating circuit 430 when the switch is closed, and discharges the capacitor, connected in parallel to the amp, by just charge Q4 that flows in via the capacitor, cascade-connected with the amp, from second integrating circuit 430 when the switch is opened. The difference between charge Q3 and charge Q4, that is, charge (Q3−Q4) is thus accumulated in the capacitor connected in parallel to the amp and a voltage that is in accordance with the accumulated charge (Q3−Q4) is output from the amp. As with the above-described switch $SW_{45}$, the present switch is opened and closed based on the Clamp signal output from timing control circuit 50.

Second A/D conversion circuit 270 successively inputs the voltages (analog values) from second difference operational circuit 440, converts these voltages into digital values, and outputs these digital values. The digital values output from second A/D conversion circuit 270 are outputs that express the luminance profile (digital data) in the first direction.

Figure 27:
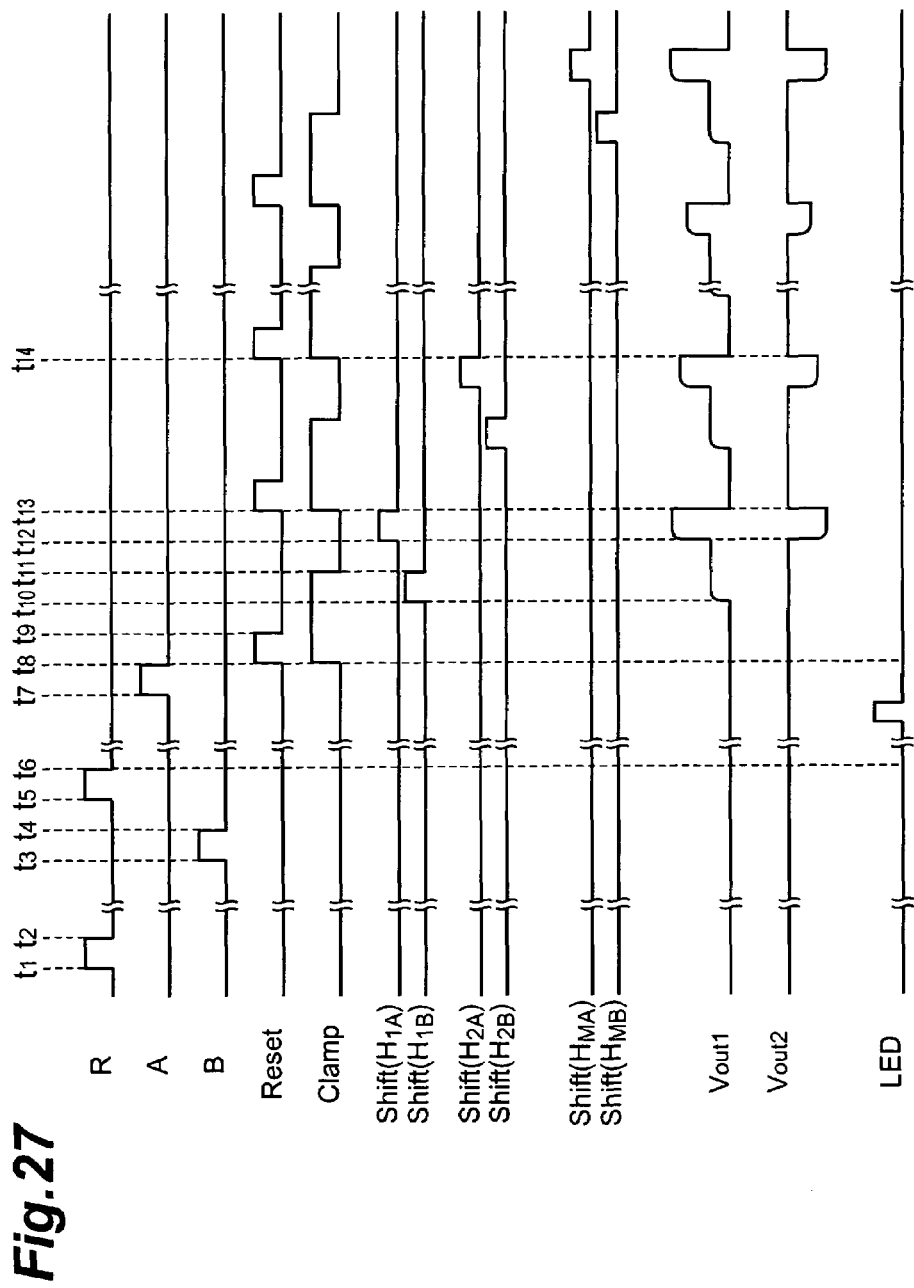
FIG. 27 is a timing chart for describing the operations of the first signal processing circuit.

The operations of first signal processing circuit 20 and second signal processing circuit 30 of the photodetector of the third embodiment shall now be described based on FIG. 27. FIG. 27 is a timing chart for describing the operations of the first signal processing circuit.

At time $t_1$, by control signal R becoming "High," switches $SW_{43}$ of the respective first charge accumulation circuits 310 close and input terminal 310A is initialized by being set at first reference potential $V_{ref1}$. At time $t_2$, by control signal R becoming "Low," switches $SW_{43}$ open.

After time $t_3$, at which point switches $SW_{41B}$ of the respective first charge accumulation circuits 310 are closed by control signal B becoming "High," currents, corresponding to the charges accumulated in the first groups of the photosensitive portions $12_{mn}$ during the period from time $t_2$ to $t_4$ (second period), are output until switches $SW_{41B}$ open at time $t_4$, and charges corresponding to the electric currents are accumulated in second capacitors $C_{41B}$ of the respective first charge accumulation circuits 310. At this time, spot light is not illuminated from light emitting element 5 and the charges accumulated in second capacitors $C_{41B}$ are charges corresponding to just the background light components.

At time $t_5$, by control signal R becoming "High" again, switches $SW_{43}$ of the respective first charge accumulation circuits 310 close and input terminal 310A is initialized by being set at first reference potential $V_{ref1}$. At time $t_6$, by control signal R becoming "Low," switches $SW_{43}$ open.

After time $t_7$, at which point switches $SW_{41A}$ of the respective first charge accumulation circuits 310 are closed by control signal A becoming "High," currents, corresponding to the charges accumulated in the first groups of the photosensitive portions $12_{mn}$ during the period from time $t_6$ to $t_8$ (first period), are output until switches $SW_{41A}$ open at time $t_8$, and charges corresponding to the electric currents are accumulated in first capacitors $C_{41A}$ of the respective first charge accumulation circuits 310. At this time, in the period from $t_6$ to $t_7$, spot light is illuminated from light emitting element 5 onto an object and since both the spot light components reflected from the object and the background light components are made incident on photosensitive region 10, the charges accumulated in first capacitors $C_{41A}$ are charges corresponding to the background light components and the spot light components.

At time $t_8$, by the Reset signal becoming "High," switch $SW_{44}$ of first integrating circuits 330 closes and capacitor $C_{42}$ is discharged and thereby initialized. Also, by the Clamp signal becoming "High" as well, switch $SW_{45}$ of first difference operational circuit 340 closes and accumulation of charge in (charging of) capacitor $C_{43}$ is enabled.

At time $t_9$, by the Reset signal becoming "Low," switch $SW_{44}$ of first integrating circuit 330 opens. Than at time $t_{10}$, by signal shift($H_{1B}$) becoming "High," switch $SW_{42B}$ of first charge accumulation circuit 310 corresponding to the first group of the photosensitive portions $12_{1n}$ closes and the charges accumulated in second capacitor $C_{41B}$ of this first charge accumulation circuit 310 are output as a current. At first integrating circuit 330, into which this electric current is input, charges are accumulated in capacitor $C_{42}$ and a voltage $V_{out1}$ that is in accordance with the amount of the accumulated charges is output from first integrating circuit 330. This voltage $V_{out1}$ from first integrating circuit 330 is held in capacitor $C_{43}$ of first difference operational circuit 340. Voltage $V_{out1}$, which is output from first integrating circuit 330 at this time, corresponds to just the background light component.

At time $t_{11}$, by signal shift($H_{1B}$) becoming "Low," switch $SW_{42B}$ of first charge accumulation circuit 310 corresponding to the first group of the photosensitive portions $12_{1n}$ opens. Also, by the Clamp signal becoming "Low," switch SW$_{45}$ of first difference operational circuit 340 opens and discharge by just the amount of charges flowing into capacitor C$_{44}$ is enabled.

At time t$_{12}$, by signal shift(H$_{1A}$) becoming "High," switch SW$_{42A}$ of first charge accumulation circuit 310 corresponding to the first group of the photosensitive portions 12$_{1n}$ closes and the charges accumulated in first capacitor C$_{41A}$ of this first charge accumulation circuit 310 are output as a current. At first integrating circuit 330, into which this electric current is input, charges are accumulated in capacitor C$_{42}$ and a voltage V$_{out1}$ that is in accordance with the amount of the accumulated charges is output from first integrating circuit 330. This voltage V$_{out1}$ from first integrating circuit 330 at this time corresponds to the background light component and a spot light component.

Also by switch SW$_{45}$ of first difference operational circuit 340 being opened, the difference, between the voltage corresponding to the charges accumulated in second capacitor C$_{41B}$ and the voltage corresponding to the charges accumulated in first capacitor C$_{41A}$, is held in capacitor C$_{44}$ of first difference operational circuit 340. The voltage that is held in capacitor C$_{44}$ of first difference operational circuit 340 is output via amp A$_{42}$. This voltage V$_{out2}$ from amp A$_{42}$ corresponds to just the spot light component.

At time t$_{13}$, by signal shift(H$_{1A}$) becoming "Low," switch SW$_{42A}$ of first charge accumulation circuit 310 corresponding to the first group of the photosensitive portions 12$_{1n}$ opens. Also, by the Reset signal becoming "High," switch SW$_{44}$ of first integrating circuit 330 closes and by the Clamp signal also becoming "High," switch SW$_{45}$ of first difference operational circuit 340 closes.

Subsequently in the period from time t$_{13}$ to t$_{14}$, the same processes as those of the period from time t$_8$ to t$_{13}$ are carried out and a voltage V$_{out2}$, corresponding to the first group of the photosensitive portions 12$_{2n}$, is output from first difference operational circuit 340. Hereinafter, the processes of the period from time t$_8$ to t$_{13}$ are carried out repeatedly so that voltages V$_{out2}$, respectively corresponding to the respective first groups of the photosensitive portions 12$_{mn}$, are output successively from first difference operational circuit 340. As mentioned above, voltages V$_{out2}$ from first difference operational circuit 340 are successively input into first A/D conversion circuit 170, converted into digital values, and output from first A/D conversion circuit 170.

Second charge accumulation circuits 410, second shift register 420, second integrating circuit 430, second difference operational circuit 440, and second A/D conversion circuit 270, included in second signal processing circuit 30 perform operations equivalent to those (see FIG. 27) of first charge accumulation circuits 310, first shift register 320, first integrating circuit 330, first difference operational circuit 340, and first A/D conversion circuit 170 of first signal processing circuit 20 and a voltage, of voltage values corresponding to just the spot light components, is output from second difference operational circuit 440. As mentioned above, the voltage from first difference operational circuit 340 is successively input into second A/D conversion circuit 270 and converted into digital values that are output from second A/D conversion circuit 270.

Thus even with the photodetector of the third embodiment, even when background light is made incident on photosensitive region 10, the luminance profiles in the first and second directions can be detected in states in which the background light components are eliminated. As a result, the two-dimensional position of the light made incident on photosensitive region 10 can be detected at extremely high precision.

Also with the photodetector of the third embodiment, first signal processing circuit 20 includes first charge accumulation circuits 310, each having first capacitor C$_{41A}$ and second capacitor C$_{41B}$, and first difference operational circuit 340, and second signal processing circuit 30 includes second charge accumulation circuits 410, each having the third capacitor and the fourth capacitor, and second difference operational circuit 440. Thus in each first charge accumulation circuit 310, charges are accumulated in first capacitor C$_{41A}$ in accordance with electric currents corresponding to charges accumulated in the corresponding first group of the photosensitive portions 12$_{mn}$ over the first period and charges are accumulated in second capacitor C$_{41B}$ in accordance with electric currents corresponding to charges accumulated in the corresponding first group of the photosensitive portions 12$_{mn}$ over the second period, and in first difference operational circuit 340, differences in the amounts of charges accumulated respectively in first capacitors C$_{41A}$ and second capacitors C$_{41B}$ are determined and a voltage V$_{out2}$ that is in accordance with these differences is output. Also, in each second charge accumulation circuit 410, charges are accumulated in the third capacitor in accordance with electric currents corresponding to charges accumulated in the corresponding second group of the photosensitive portions 13$_{mn}$ over the first period and charges are accumulated in the fourth capacitor in accordance with electric currents corresponding to charges accumulated in the corresponding second group of the photosensitive portions 13$_{mn}$ over the second period, and in the second difference operational circuit, differences in the amounts of the charges accumulated respectively in the third capacitors and the fourth capacitors are determined and a voltage that is in accordance with these differences is output. The first and second signal processing circuits 20 and 30 can thus be simplified in composition and made low in cost.

First signal processing circuit 20 furthermore comprises first integrating circuit 330 and first A/D conversion circuit 170 and second signal processing circuit 30 furthermore comprises second integrating circuit 430 and second A/D conversion circuit 270. Luminance profiles in the first and second directions can thereby be output as digital values.

FOURTH EMBODIMENT

A photodetector of a fourth embodiment shall now be described based on FIG. 28 to FIG. 31. The photodetector of the first embodiment and the photodetector of the fourth embodiment differ in the compositions of first signal processing circuit 20 and second signal processing circuit 30.

Figure 28:
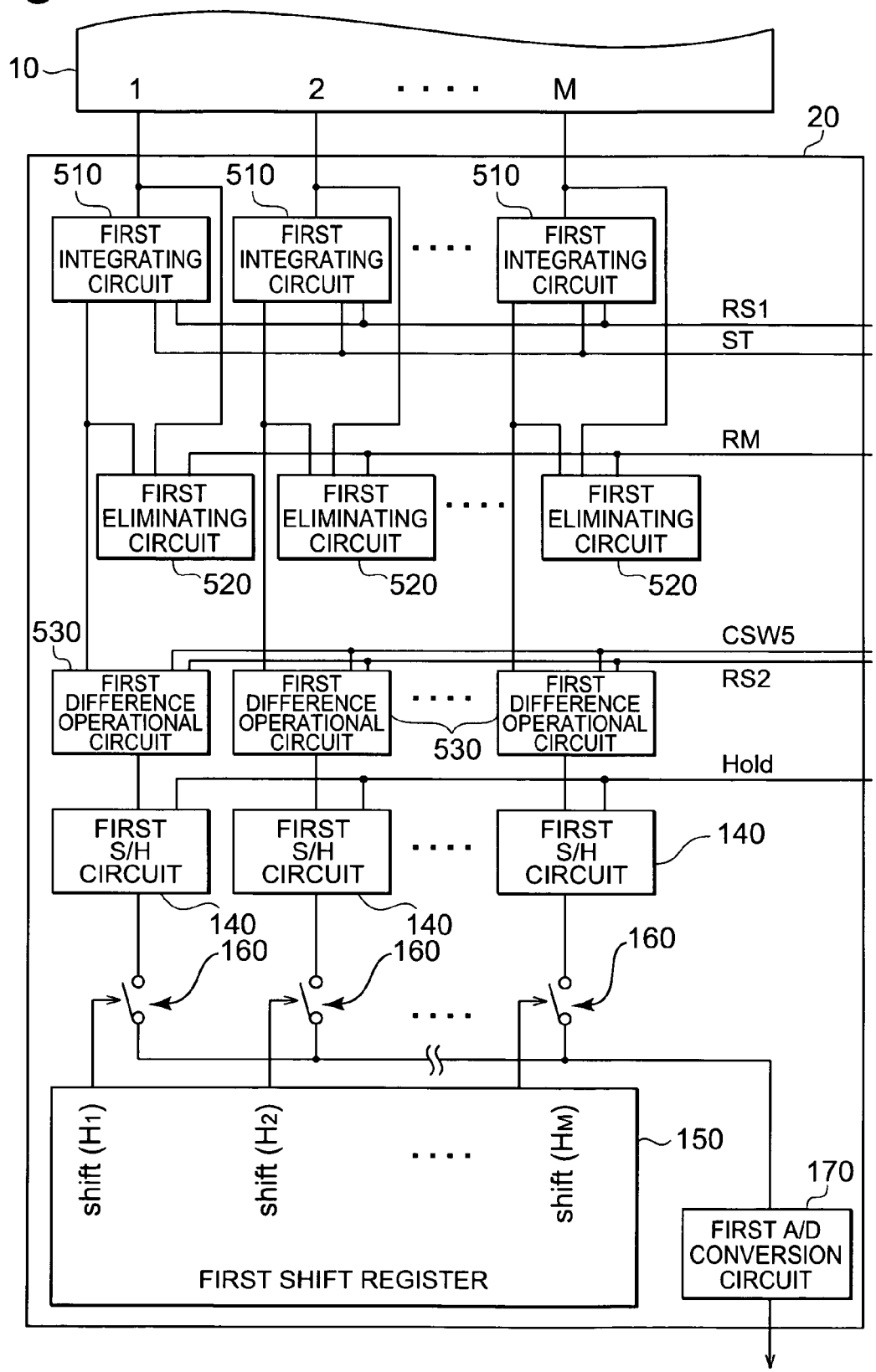
FIG. 28 is a schematic composition diagram of a first signal processing circuit included in a photodetector of a fourth embodiment.

As shown in FIG. 28, first signal processing circuit 20 of the photodetector of the fourth embodiment comprises first integrating circuits 510, first eliminating circuits 520, first difference operational circuits 530, first S/H circuits 140, a first shift register 150, first switches 160, and a first A/D conversion circuit 170. FIG. 28 is a schematic composition diagram of the first signal processing circuit.

Figure 30:
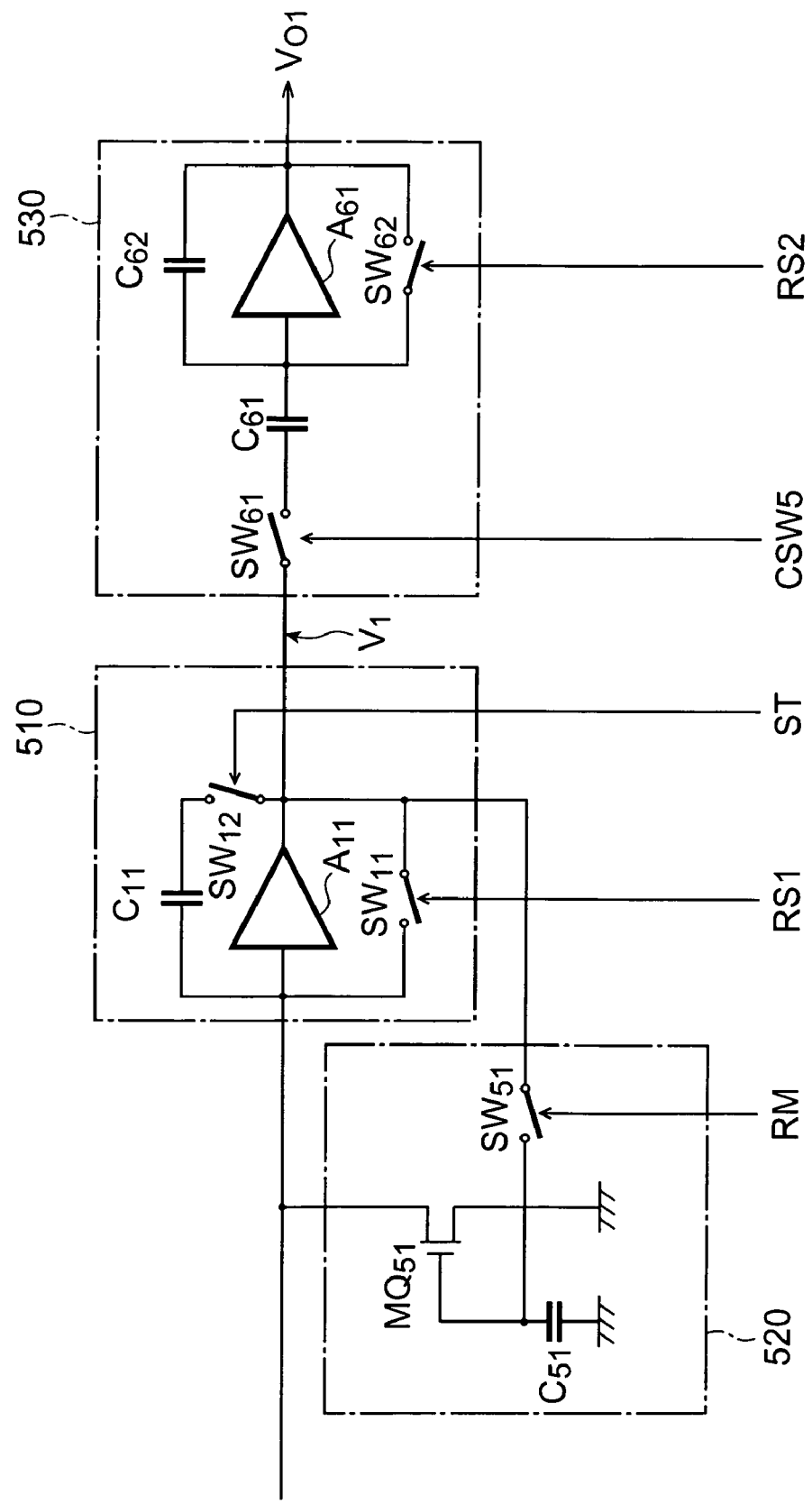
FIG. 30 is a circuit diagram of a first integrating circuit, a first eliminating circuit, and a first difference operational circuit included in the first signal processing circuit.

First integrating circuits 510 are provided in correspondence to the first groups of the photosensitive portions 12$_{mn}$ and each converts the electric currents from a corresponding first group of the photosensitive portions 12$_{mn}$ into a voltage and outputs this voltage. As shown in FIG. 30, each first integrating circuit 510 is arranged with an amp A$_{11}$, which amplifies a photocurrent I1 that is input from the corresponding first group of the photosensitive portions 12$_{mn}$, and a capacitor C$_{11}$ and a switch SW$_{11}$, which are connected in parallel between the input and output contacts of amp A$_{11}$. Thus when switch SW$_{11}$ is put in an OFF state by means of a reset signal RS1, capacitor $C_{11}$ is charged by photocurrent I1, and when switch $SW_{11}$ is put in an ON state by means of reset signal RS1, the charges in capacitor $C_{11}$ are discharged. Here in order to set the integrating operation time of first integrating circuit 510 to a few μsec, the capacitance of capacitor $C_{11}$ is set to a few pF. Connection of capacitor $C_{11}$ to the interval between the input and output terminals of amp $A_{11}$ is controlled by an "ON/OFF" signal (ST) of a switch $SW_{12}$.

First eliminating circuits 520 are provided in correspondence to the first groups of the photosensitive portions $12_{mn}$ and eliminate the electric currents from the first groups of the photosensitive portions $12_{mn}$ in the above-mentioned second period from the electric currents from the first groups of the photosensitive portions $12_{mn}$ in the above-mentioned first period and output the elimination results. As also shown in FIG. 30, first eliminating circuits 520 are connected to the input terminals of first integrating circuits 510. Each first eliminating circuit 520 is equipped with a first MOS transistor $MQ_{51}$, the source terminal of which is connected to the input terminal of the corresponding first integrating circuit 510 and the drain terminal of which is connected to GND (ground level), and the gate terminal of first MOS transistor $MQ_{51}$ is grounded via a first capacitor $C_{51}$. To the gate terminal of first MOS transistor $MQ_{51}$, the output of the corresponding first integrating circuit 510 is connected via a first switch $SW_{51}$, the "ON/OFF" of which is controlled by a control signal RM, issued from timing control circuit 50.

First difference operational circuits 530 are provided in correspondence to first integrating circuits 510 and each holds the voltage, among the voltages from the corresponding first integrating circuit 510, that corresponds to the above-mentioned second period (the voltage (analog value) that is in accordance with the electric currents corresponding to the charges accumulated in corresponding first group of the photosensitive portions $12_{mn}$ over the above-mentioned second period) and outputs a voltage that is in accordance with the difference with respect to the voltage, among the voltages from the corresponding first integrating circuit 510, that corresponds to the above-mentioned first period (the voltage (analog value) that is in accordance with the electric currents corresponding to the charges accumulated in corresponding first group of the photosensitive portions $12_{mn}$ over the above-mentioned first period). As also shown in FIG. 30, each first difference operational circuit 530 is connected to the output contact of the corresponding first integrating circuit 510 (that is, the output contact of amp $A_{11}$). First difference operational circuit 530 is composed with a switch $SW_{61}$, a capacitor $C_{61}$, an amp $A_{61}$, and a capacitor $C_{62}$ and a switch $SW_{62}$, which are connected in parallel between the input and output contacts of the amp. The output contact of amp $A_{61}$ is connected to an output terminal. Due to the relationships between the operation speed margin and noise margin of the entire circuit, capacitors of equal capacitance value of approximately 1 pF are used as capacitor $C_{61}$ and capacitor $C_{62}$. Furthermore, switch $SW_{61}$ is switched between the ON state and the OFF state by a switching signal CSW5 output from timing control circuit 50. Also, first difference operational circuit 530 performs an accumulation operation when switch $SW_{62}$ is put in the OFF state by a reset signal RS2 output from timing control circuit 50 and stops the accumulation operation when switch $SW_{62}$ is put in the ON state by reset signal RS2.

Figure 29:
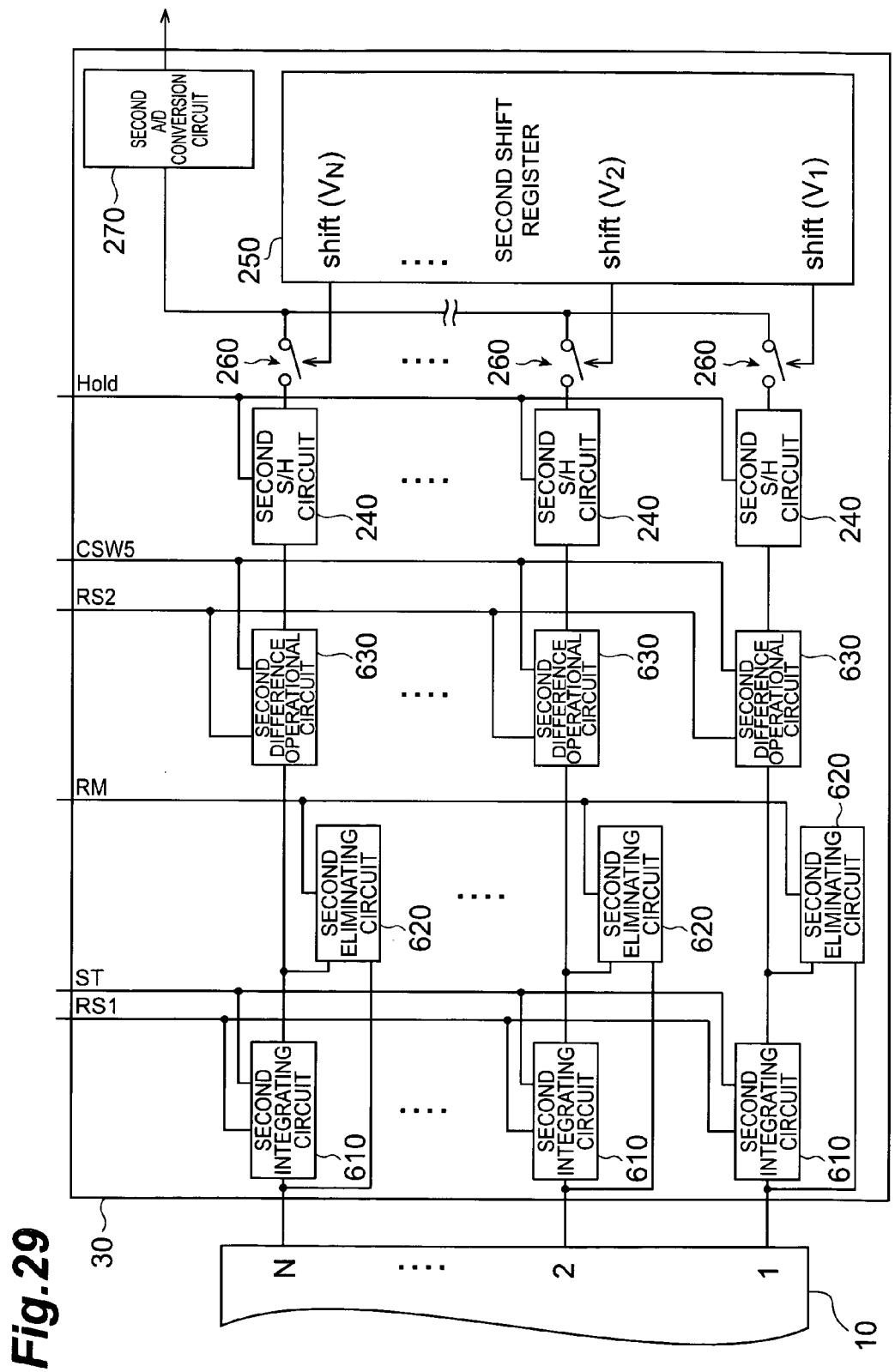
FIG. 29 is a schematic composition diagram of a second signal processing circuit included in the photodetector of the fourth embodiment.

As shown in FIG. 29, second signal processing circuit 30 of the photodetector of the fourth embodiment comprises second integrating circuits 610, second eliminating circuits 620, second difference operational circuits 630, second S/H circuits 240, a second shift register 250, second switches 260, and a second A/D conversion circuit 270. FIG. 29 is a schematic composition diagram of the second signal processing circuit.

Second integrating circuits 610 are provided in correspondence to the second groups of the photosensitive portions $13_{mn}$ and each converts the electric currents from a corresponding second group of the photosensitive portions $13_{mn}$ into a voltage and outputs this voltage. Each second integrating circuit 610 has an composition equivalent to first integrating circuit 510 shown in FIG. 30 and is arranged with an amp, which amplifies a photocurrent that is input from the corresponding second group of the photosensitive portions $13_{mn}$, and a capacitor and a switch, which are connected in parallel between the input and output contacts of the amp.

Second eliminating circuits 620 are provided in correspondence to the second groups of the photosensitive portions $13_{mn}$ and eliminate the electric currents from the second groups of the photosensitive portions $13_{mn}$ in the above-mentioned second period from the electric currents from the second groups of the photosensitive portions $13_{mn}$ in the above-mentioned first period and output the elimination results. Each second eliminating circuit 620 has an composition equivalent to that of first eliminating circuit 520 shown in FIG. 30, and is equipped with a second MOS transistor, the source terminal of which is connected to the input terminal of the corresponding second integrating circuit 610 and the drain terminal of which is connected to GND (ground level), and the gate terminal of the second MOS transistor is grounded via a second capacitor. To the gate terminal of the second MOS transistor, the output of the corresponding second integrating circuit 610 is connected via a second switch, the "ON/OFF" of which is controlled by control signal RM, issued from timing control circuit 50.

Second difference operational circuits 630 are provided in correspondence to second integrating circuits 610 and each holds the voltage, among the voltages from the corresponding second integrating circuit 610, that corresponds to the above-mentioned second period (the voltage (analog value) that is in accordance with the electric currents corresponding to the charges accumulated in corresponding second group of the photosensitive portions $13_{mn}$ over the above-mentioned second period) and outputs a voltage that is in accordance with the difference with respect to the voltage, among the voltages from the corresponding second integrating circuit 610, that corresponds to the above-mentioned first period (the voltage (analog value) that is in accordance with the electric currents corresponding to the charges accumulated in corresponding second group of the photosensitive portions $13_{mn}$ over the above-mentioned first period). Each second difference operational circuit 630 has a composition that is equivalent to that of first difference operational circuit 530 shown in FIG. 30, and is arranged with a switch, a capacitor, an amp, and a capacitor and a switch, which are connected in parallel between the input and output contacts of the amp.

Figure 31:
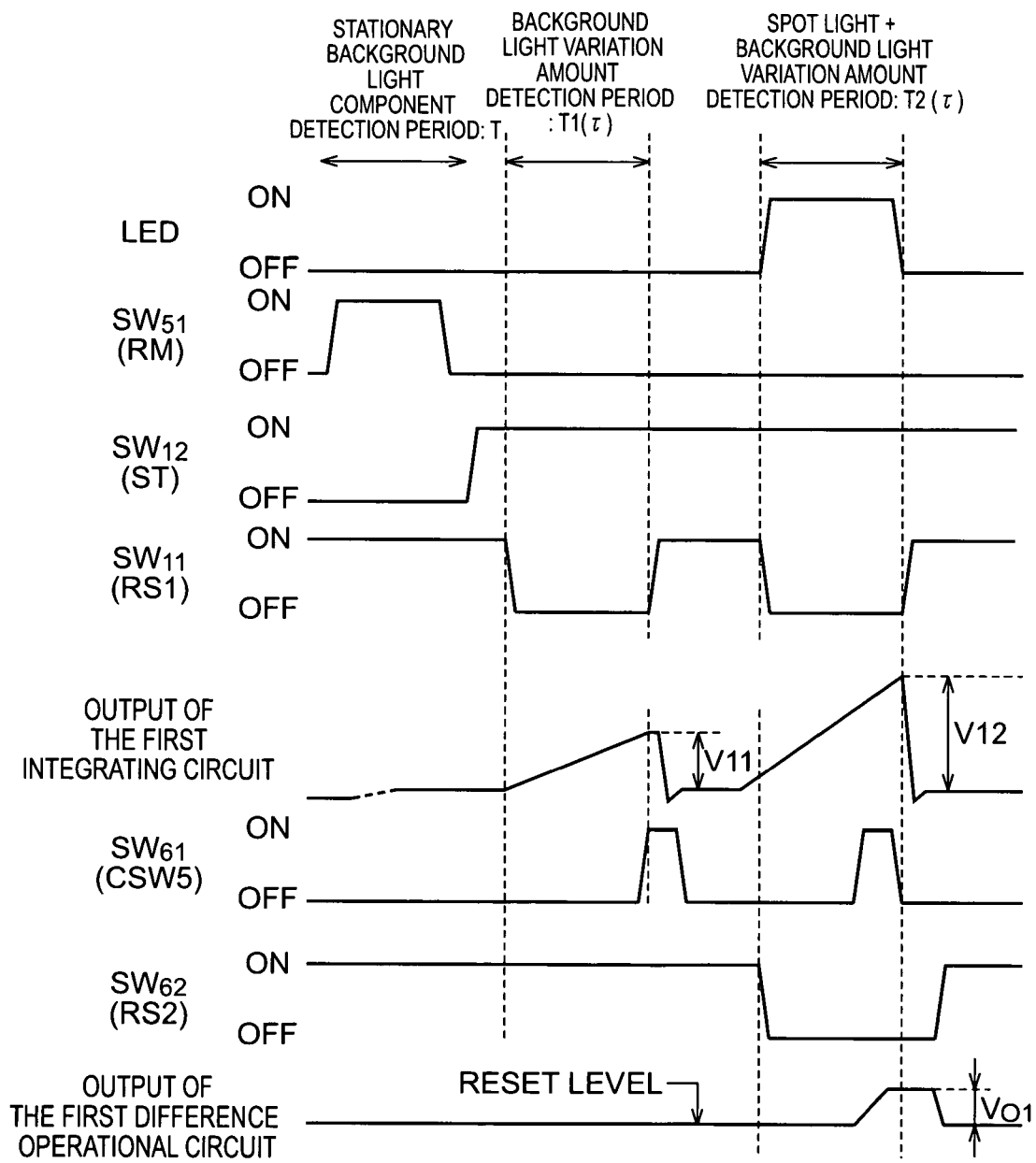
FIG. 31 is a timing chart for describing the operations of the first signal processing circuit.

The operations of first signal processing circuit 20 and second signal processing circuit 30 of the photodetector of the fourth embodiment shall now be described based on FIG. 31. FIG. 31 is a timing chart for describing the operations of the first signal processing circuit.

First, in a stationary background light component detection period T, light emitting element 5 is set to a state of not outputting spot light and first switches $SW_{51}$ are turned ON to detect the background light. At the same time, each first integrating circuit 510 is set to the non-integrating operation state by switch $SW_{11}$ being set to "ON" by reset signal RS1, which is output from timing control circuit 50, and switch $SW_{12}$ being set to "OFF" by control signal ST, which is output from timing control circuit 50. In this state, electric currents from the first groups of the photosensitive portions $12_{mn}$ corresponding to the respective first integrating circuits 510 are input into the input terminals of the respective first integrating circuits 510. Then by the voltages from first integrating circuits 510 in the non-integrating operation state being supplied to the gate terminals of first MOS transistors $MQ_{51}$, the currents are eliminated entirely by first MOS transistors $MQ_{51}$ of first eliminating circuits 520. In this state, the gate-source voltage Vgs of each first MOS transistor $MQ_{51}$ is expressed as follows:

$$Vgs = (2 \times I_\tau/\beta)^{1/2} + Vth \tag{1}$$

$I_\tau$: current value
$\beta$: constant determined by the size of first MOS transistor $MQ_{51}$
Vth: threshold value of first MOS transistor $MQ_{51}$ After the elapse of time T, first switch $SW_{51}$ is set to "OFF." As a result, only the current value that was supplied to the input terminal of each first integrating circuit 510 at the point at which first switch $SW_{51}$ is set to "OFF" continues to flow through first MOS transistor $MQ_{51}$. That is, gate-source voltage Vgs of first MOS transistor $MQ_{51}$ is held and the average contribution of the background light, which is the main noise component in subsequent measurement, is thus eliminated.

Then after setting each switch $SW_{12}$ to "ON" and setting each first integrating circuit 510 to the integrating operation state, switch $SW_{11}$ is set to "OFF" for a background light variation amount detection period T1 (time width: τ). When this state is set, a electric current, corresponding to the variation amount of the background light, flows into each first integrating circuit 510 and charges capacitor $C_{11}$.

Thus in period T1, since just the background light is made incident and a photocurrent variation amount I1, resulting from the variation of the background light, is charged in capacitor $C_{11}$ of each first integrating circuit 510, integrating output V1 increases gradually. Then if V11 is the voltage of the integrating output of a first integrating circuit 510 after the elapse of time τ and $I_d$ is the current input, according to the variation amount of the background light, from the corresponding first group of the photosensitive portions $12_{mn}$, since $I1 = I_d$, $$V11 = I_d \cdot \tau / C11 \tag{2}$$

C11: capacitance of capacitor $C_{11}$

After the elapse of time τ, the corresponding switch $SW_{61}$ is set to "ON" momentarily, thereby connecting the corresponding first difference operational circuit 530 and voltage V11 is held in capacitor $C_{61}$. Also after the elapse of time τ, switches $SW_{11}$ are switched to "ON" and first integrating circuits 510 are reset.

Light emitting element 5 is then lit for a (spot light+ background light variation amount) detection period T2 (time width: τ). At the same time as this lighting, switches $SW_{11}$ and $SW_{62}$ are set to "OFF." As a result of these switching operations, each integrating circuit 510 charges capacitor $C_{11}$ with photocurrent I1, which corresponds to the sum of the background light variation amount and the spot light component.

Here, if V12 is the voltage of the integrating output of a first integrating circuit 510 at the point of elapse of time τ, $I_{sh}$ is the current due to the reflected spot light component, and, due to the light intensity of the variation amount of the background light not changing from that of period T1, $I_d$ is the current corresponding to the background light variation amount, since $I1 = I_d + I_{sh}$, the following relationship holds:

$$V12 = (I_{sh} + I_d) \cdot \tau / C11 \tag{3}$$

After the elapse of the period T2, switch $SW_{61}$ is set to "ON" momentarily and voltage V12 of the integration output of first integrating circuit 510 is transmitted to the corresponding first difference operational circuit 530. Since first difference operational circuit 530 is in the reset state in period T1 and performs a subtraction operation in period T2, by the principle of charge conservation, charges that are in accordance with the following are held in capacitors $C_{61}$ and $C_{62}$.

$$(V12 - V11) \cdot C12 = V_{ol} \cdot C13 \tag{4}$$

C12: capacitance of capacitor $C_{61}$
C13: capacitance of capacitor $C_{62}$

Then by substituting Equations (2) and (3) in Equation (4) above, the voltage of output $V_{ol}$ that is generated at the output terminal of first difference operational circuit 530 is expressed as follows:

$$V_{ol} = I_{sh} \cdot \tau \cdot C12 / C11 \cdot C13 \tag{5}$$

Also, if capacitor $C_{61}$ and capacitor $C_{62}$ are equal in capacitance:

$$V_{ol} = I_{sh} \cdot \tau / C11 \tag{6}$$

When switch $SW_4$ of a first S/H circuit 140 closes, output $V_{ol}$ that is generated at the output terminal of the corresponding difference operational circuit 530 is held by capacitor $C_4$ of first S/H circuit 140 and is output. The voltages from the respective first S/H circuits 140 are successively input into first A/D conversion circuit 170 as described above, converted into digital values, and output from first A/D conversion circuit 170.

Second integrating circuits 610, second eliminating circuits 620, second difference operational circuits 630, second S/H circuits 240, second shift register 250, second switches 260, and second A/D conversion circuit 270, included in second signal processing circuit 30, perform operations equivalent to those (see FIG. 31) of first integrating circuits 510, first eliminating circuits 520, first difference operational circuits 530, first S/H circuits 140, first shift register 150, first switches 160, and first A/D conversion circuit 170, included in first signal processing circuit 20, and voltages, having voltage values corresponding to just the spot light components, are output from second S/H circuits 240. The voltages from the respective second S/H circuits 240 are successively input into second A/D conversion circuit 270 as described above, converted into digital values, and output from second A/D conversion circuit 270.

Thus even with the photodetector of the fourth embodiment, even when background light is made incident on photosensitive region 10, the luminance profiles in the first and second directions can be detected in states in which the background light components are eliminated. As a result, the two-dimensional position of the light made incident on photosensitive region 10 can be detected at extremely high precision.

Also with the photodetector of the fourth embodiment, by means of first eliminating circuits 520, the electric currents from the first groups of the photosensitive portions $12_{mn}$ in the above-mentioned second period are eliminated from the electric currents from the first groups of the photosensitive portions $12_{mn}$ in the above-mentioned first period. Thus even if background light is made incident on photosensitive region 10, the luminance profile in the second direction can be detected with the background light components being eliminated. Also by means of second eliminating circuits 620, the electric currents from the second groups of the photosensitive portions $13_{mn}$ in the above-mentioned second period are eliminated from the electric currents from the second groups of the photosensitive portions $13_{mn}$ in the above-mentioned first period. Thus even if background light is made incident on photosensitive region 10, the luminance profile in the first direction can be detected with the background light components being eliminated. As a result, the two-dimensional position of the incident light can be detected at extremely high precision.

Also with the photodetector of the fourth embodiment, each first eliminating circuit 520 is equipped with first MOS transistor $MQ_{51}$, the source terminal of which is connected to the corresponding photosensitive portions $12_{mn}$ and the drain terminal of which is grounded, first capacitor $C_{51}$, one terminal of which is connected to the gate terminal of first MOS transistor $MQ_{51}$ and the other terminal of which is grounded, and first switch $SW_{51}$, one terminal of which is connected to the gate terminal of first MOS transistor $MQ_{51}$ and the other terminal of which is connected to the output of the corresponding first integrating circuit 510, and each second eliminating circuit 620 is equipped with the second MOS transistor, the source terminal of which is connected to the corresponding photosensitive portions and the drain terminal of which is grounded, the second capacitor, one terminal of which is connected to the gate terminal of the second MOS transistor and the other terminal of which is grounded, and the second switch, one terminal of which is connected to the gate terminal of the second MOS transistor and the other terminal of which is connected to the output of the corresponding second integrating circuit. The above-described first and second eliminating circuits 520 and 620 can thus be arranged simply and at low cost.

Also the photodetector of the fourth embodiment further comprises first difference operational circuits 530, first S/H circuits 140, first A/D conversion circuit 170, second difference operational circuits 630, second S/H circuits 240, and second A/D conversion circuit 270. Background light components can thereby be eliminated definitely to enable the luminance profile in the first direction and the luminance profile in the second direction to be obtained at even higher precision. Also, the luminance profiles in the first and second directions can be output as digital values.

The present invention is not limited to the above-described embodiments. For example, in place of using shift registers, the respective photosensitive portions $12_{mn}$ and $13_{mn}$ (second conductive type semiconductor regions 41 and 42) may be connected to wires of uniform resistance, the charges generated in accompaniment with the incidence of light may be taken out from ends of the resistance wires upon dividing the resistance so as to be inversely proportional to the distance between the position at which charges flow into a resistance wire and the end of the same resistance wire, and the light incidence positions may be determined based on the electric currents of the ends of the resistance wires.

Figure 32:
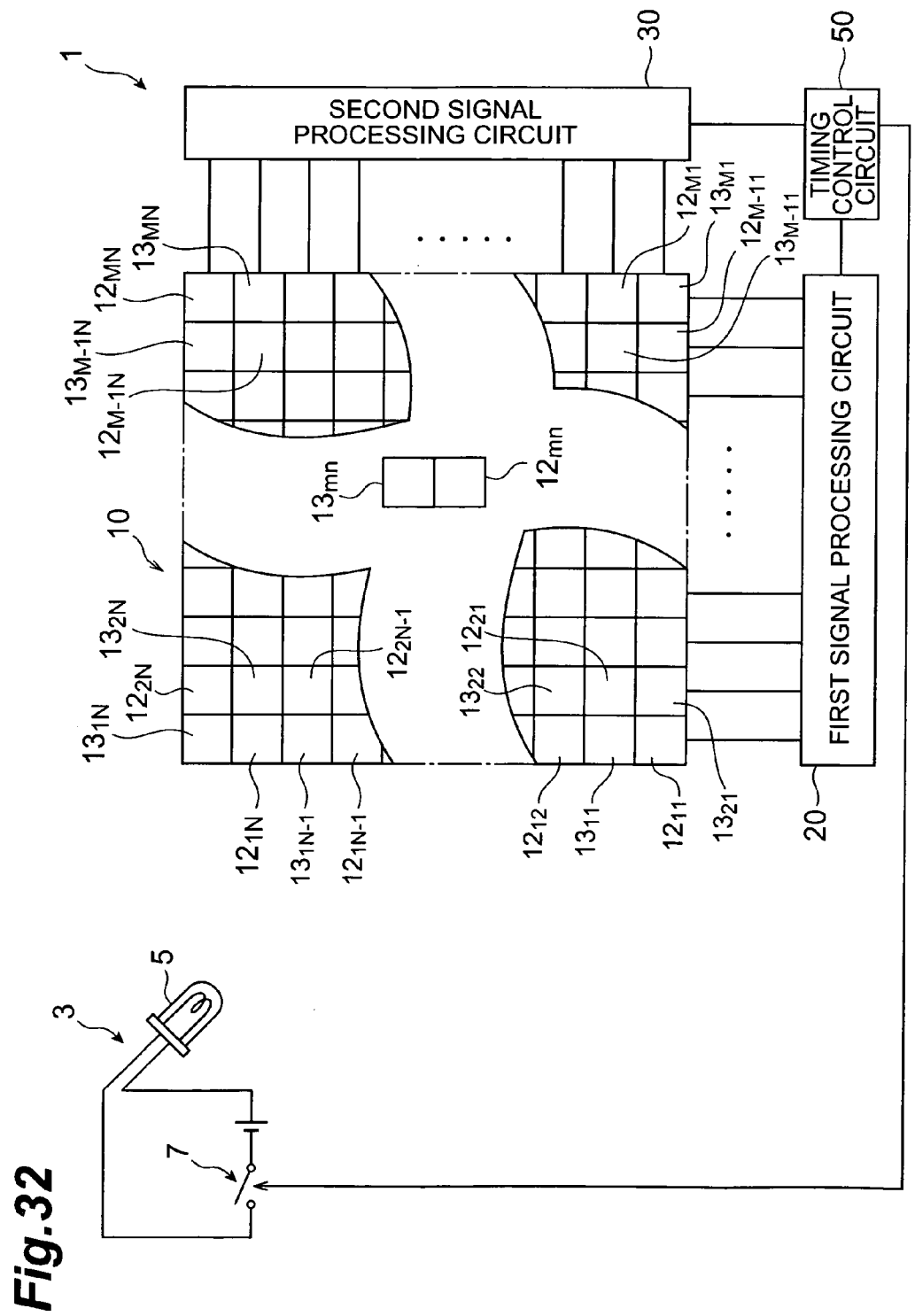
FIG. 32 is a conceptual composition diagram showing a modification example of the embodiment's photodetector.

Also though with the above-described embodiment, a single pixel is arranged from a plurality of photosensitive portions, a single pixel may be arranged from a single photosensitive portion instead. For example as shown in FIG. 32, photosensitive region 10 may be made to comprise a plurality of first photosensitive portions $12_{mn}$, which are electrically connected to each other across the first direction, and a plurality of second photosensitive portions $13_{mn}$, which are electrically connected to each other across the second direction and the plurality of first photosensitive portions $12_{mn}$ and the plurality of second photosensitive portions $13_{mn}$ may be arrayed in a two-dimensionally mixed state on the same plane. In this case, first photosensitive portions $12_{mn}$ and second photosensitive portions $13_{mn}$ are arrayed in a checkered pattern, and first photosensitive portions $12_{mn}$ and second photosensitive portions $13_{mn}$ are aligned alternately in the first direction and the second direction. Also, instead of arraying in a checkered pattern, the photosensitive portions may be arrayed in a honeycomb-like manner as shown in FIG. 8.

Also, first signal processing circuit 20 and second signal processing circuit 30 may be made to operate at the same timing or operate independently in the order of a time sequence.

INDUSTRIAL APPLICABILITY

The present invention's photodetector can be used in a reflected light or direct light incidence position detection system.

The invention claimed is:

1. A photodetector, having a photosensitive region, in which pixels are arrayed two-dimensionally, and being used with a light source that illuminates light onto an object, wherein a single pixel is arranged by adjacently positioning on the same plane a plurality of photosensitive portions, each outputting a current that is in accordance with an intensity of light incident thereon and, in each plurality of pixels that are aligned in a first direction of the two-dimensional array, one photosensitive portion among the plurality of photosensitive portions making up each corresponding pixel is electrically connected to the same photosensitive portion of each of the other corresponding pixels and, in each plurality of pixels that are aligned in a second direction of the two-dimensional array, another photosensitive portion among the plurality of photosensitive portions making up each corresponding pixel is electrically connected to the same photosensitive portion of each of the other corresponding pixels, the photodetector comprising: a first signal processing circuit, detecting a luminance profile in the second direction based on differences between outputs, corresponding to charges accumulated in first groups of the photosensitive portions that are electrically connected across the pluralities of pixels aligned in the first direction over a first period wherein the light is illuminated onto the object by the light source, and outputs, corresponding to charges accumulated in the first groups of the photosensitive portions over a second period wherein the light is not illuminated onto the object by the light source; and a second signal processing circuit, detecting a luminance profile in the first direction based on differences between outputs, corresponding to charges accumulated in second groups of the photosensitive portions that are electrically connected across the pluralities of pixels aligned in the second direction over the first period, and outputs, corresponding to charges accumulated in the second groups of the photosensitive portions over the second period.

2. The photodetector according to claim 1, wherein the first signal processing circuit comprises:
a first shift register for successively reading, in the second direction, the electric currents from the first groups of the photosensitive portions
a first integrating circuit, successively inputting the electric currents from the respective first groups of the photosensitive portions that are read successively by the first shift register and converting and outputting the electric currents into and as a voltage;
a first CDS circuit, outputting a voltage corresponding to the variation amount of the voltage from the first integrating circuit;
a first A/D conversion circuit, converting the voltage from the first CDS circuit into digital values and outputting the digital values; and
a first difference operational circuit, determining, based on the digital values output from the first A/D conversion circuit, differences between digital values corresponding to the first period and digital values corresponding to the second period; and the second signal processing circuit comprises:
a second shift register for successively reading, in the first direction, the electric currents from the second groups of the photosensitive portions;
a second integrating circuit, successively inputting the electric currents from the respective second groups of the photosensitive portions that are read successively by the second shift register and converting and outputting the electric currents into and as a voltage;
a second CDS circuit, outputting a voltage corresponding to the variation amount of the voltage from the second integrating circuit;
a second A/D conversion circuit, converting the voltage from the second CDS circuit into digital values and outputting the digital values; and
a second difference operational circuit, determining, based on the digital values output from the second A/D conversion circuit, differences between digital values corresponding to the first period and digital values corresponding to the second period.

3. The photodetector according to claim 2, wherein the first signal processing circuit further comprises: a first digital memory, disposed between the first A/D conversion circuit and the first difference operational circuit and storing the digital values corresponding to the first period and the digital values corresponding to the second period and outputting the stored digital values to the first difference operational circuit; and
the second signal processing circuit further comprises: a second digital memory, disposed between the second A/D conversion circuit and the second difference operational circuit and storing the digital values corresponding to the first period and the digital values corresponding to the second period and outputting the stored digital values to the second difference operational circuit.

4. The photodetector according to claim 1, wherein the first signal processing circuit comprises:
first integration circuits, provided in correspondence to the first groups of the photosensitive portions and each converting and outputting the electric currents from the corresponding first group of the photosensitive portions into and as a voltage;
first CDS circuits, disposed in correspondence to the first integration circuits and each in turn comprising a first coupling capacitance element and a first amplifier, disposed in that order between an output terminal and an input terminal that inputs the voltage from the corresponding first integration circuit, a first integrating capacitance element, disposed in parallel between the input and the output of the first amplifier, and a first switching element, making charges of an amount corresponding to the variation amount of the voltage be accumulated in the first integrating capacitance element;
second CDS circuits, disposed in correspondence to the first integration circuits and each in turn comprising a second coupling capacitance element and a second amplifier, disposed in that order between an output terminal and an input terminal that inputs the voltage from the corresponding first integration circuit, a second integrating capacitance element, having a capacitance value equal to the capacitance value of the first integrating capacitance element and disposed in parallel between the input and the output of the second amplifier, and a second switching element, making charges of an amount corresponding to the variation amount of the voltage be accumulated in the second integrating capacitance element; and
first difference operational circuits, disposed in correspondence to the first CDS circuits and the second CDS circuits and each determining a difference in the amounts of charges respectively accumulated in the first integrating capacitance element of the corresponding first CDS circuit and the second integrating capacitance element of the corresponding second CDS circuit and outputting a voltage that is in accordance with the difference; and the second signal processing circuit comprises:
second integration circuits, provided in correspondence to the second groups of the photosensitive portions and each converting and outputting the electric currents from the second corresponding group of the photosensitive portions as a voltage;
third CDS circuits, disposed in correspondence to the second integration circuits and each in turn comprising a third coupling capacitance element and a third amplifier, disposed in that order between an output terminal and an input terminal that inputs the voltage from the corresponding second integration circuit, a third integrating capacitance element, disposed in parallel between the input and the output of the third amplifier, and a third switching element, making charges of an amount corresponding to the variation amount of the voltage be accumulated in the third integrating capacitance element;
fourth CDS circuits, disposed in correspondence to the second integration circuit and each in turn comprising a fourth coupling capacitance element and a fourth amplifier, disposed in that order between an output terminal and an input terminal that inputs the voltage from the corresponding second integration circuit, a fourth integrating capacitance element, having a capacitance value equal to the capacitance value of the third integrating capacitance element and disposed in parallel between the input and the output of the fourth amplifier, and a fourth switching element, making charges of an amount corresponding to the variation amount of the voltage be accumulated in the fourth integrating capacitance element; and
second difference operational circuits, disposed in correspondence to the third CDS circuits and the fourth CDS circuits and each determining a difference in the amounts of charges respectively accumulated in the third integrating capacitance element of the corresponding third CDS circuit and the fourth integrating capacitance element of the corresponding fourth CDS circuit and outputting a voltage that is in accordance with the difference.

5. The photodetector according to claim 4, wherein the first signal processing circuit further comprises:
first sample-and-hold circuits, provided in correspondence to the first difference operational circuits and each holding and then outputting the voltage from the corresponding first difference operational circuit; and
a first A/D conversion circuit, successively inputting the voltages from the respective first sample-and-hold circuits, converting the voltages into digital values, and outputting the digital values; and
the second signal processing circuit further comprises:
second sample-and-hold circuits, provided in correspondence to the second difference operational circuits and each holding and then outputting the voltage from the corresponding second difference operational circuit; and
a second A/D conversion circuit, successively inputting the voltage from the respective second sample-and-hold circuits, converting the voltage into digital values, and outputting the digital values.

6. The photodetector according to claim 1, wherein the first signal processing circuit comprises:
first charge accumulation circuits, provided in correspondence to the respective first groups of the photosensitive portions and each comprising a first capacitance element and a second capacitance element, disposed in parallel between an output terminal and an input terminal that inputs the electric currents from the corresponding first group of the photosensitive portions, and accumulating charges in the first capacitance element in accordance with the electric currents corresponding to the charges accumulated during the first period in the corresponding first group of the photosensitive portions and accumulating charges in the second capacitance element in accordance with the electric currents corresponding to the charges accumulated during the second period in the corresponding first group of the photosensitive portions; and
a first difference operational circuit, determining the differences between the charge amounts accumulated respectively in the first capacitance elements and the second capacitance elements of the first charge accumulation circuits and outputting a voltage that is in accordance with the differences; and
the second signal processing circuit comprises: second charge accumulation circuits, provided in correspondence to the respective second groups of the photosensitive portions and each comprising a third capacitance element and a fourth capacitance element, disposed in parallel between an output terminal and an input terminal that inputs the electric currents from the corresponding second group of the photosensitive portions, and accumulating charges in the third capacitance element in accordance with the electric currents corresponding to the charges accumulated during the first period in the corresponding second group of the photosensitive portions and accumulating charges in the fourth capacitance element in accordance with the electric currents corresponding to the charges accumulated during the second period in the corresponding second group of the photosensitive portions; and
a second difference operational circuit, determining the differences between the charge amounts accumulated respectively in the third capacitance elements and the fourth capacitance elements of the second charge accumulation circuits and outputting a voltage that is in accordance with the differences.

7. The photodetector according to claim 6, wherein the first signal processing circuit furthermore comprises:
a first integrating circuit, successively inputting, from the first capacitance elements and the second capacitance elements, electric currents corresponding to the charges accumulated in the corresponding first capacitance elements and second capacitance elements and converting the electric currents into a voltage and outputting the voltage to the first difference operational circuit; and
a first A/D conversion circuit, successively inputting the voltage from the first difference operational circuit, converting the voltage into digital values, and outputting the digital values; and
the second signal processing circuit furthermore comprises:
a second integrating circuit, successively inputting, from the third capacitance elements and the fourth capacitance elements, electric currents corresponding to the charges accumulated in the corresponding third capacitance elements and fourth capacitance elements and converting the electric currents into a voltage and outputting the voltage to the second difference operational circuit; and
a second A/D conversion circuit, successively inputting the voltage from the second difference operational circuit, converting the voltage into digital values, and outputting the digital values.

* * * * *